(12) United States Patent
Sano

(10) Patent No.: US 12,368,348 B2
(45) Date of Patent: Jul. 22, 2025

(54) ROTARY ELECTRIC MACHINE UNIT

(71) Applicant: DENSO CORPORATION, Kariya (JP)

(72) Inventor: Tomohisa Sano, Kariya (JP)

(73) Assignee: DENSO CORPORATION, Kariya (JP)

( * ) Notice: Subject to any disclaimer, the term of this patent is extended or adjusted under 35 U.S.C. 154(b) by 280 days.

(21) Appl. No.: 18/167,671

(22) Filed: Feb. 10, 2023

(65) Prior Publication Data

US 2023/0188008 A1 Jun. 15, 2023

Related U.S. Application Data

(63) Continuation of application No. PCT/JP2021/030714, filed on Aug. 23, 2021.

(30) Foreign Application Priority Data

Sep. 17, 2020 (JP) .................................. 2020-156642

(51) Int. Cl.
*H02K 9/16* (2006.01)
*H02K 5/20* (2006.01)
(Continued)

(52) U.S. Cl.
CPC .............. *H02K 9/16* (2013.01); *H02K 5/203* (2021.01); *H02K 9/00* (2013.01); *H02K 11/30* (2016.01);
(Continued)

(58) Field of Classification Search
CPC .......... H02K 11/33; H02K 11/30; H02K 5/20; H02K 5/203; H02K 9/19; H02K 9/193;
(Continued)

(56) References Cited

U.S. PATENT DOCUMENTS

2001/0014029 A1* 8/2001 Suzuki ............... H05K 7/20927
363/141
2014/0202781 A1* 7/2014 Soma ..................... H02K 11/33
310/68 D
(Continued)

FOREIGN PATENT DOCUMENTS

JP  H02-79452 A  3/1990
JP  2005-12991 A  1/2005
(Continued)

OTHER PUBLICATIONS

Tanabe et al, Dynamo-Electric Machine Unit, Jan. 30, 2020, WO 2020021865 (English Machine Translation) (Year: 2020).*
(Continued)

*Primary Examiner* — Alexander A Singh
(74) *Attorney, Agent, or Firm* — Oliff PLC

(57) ABSTRACT

In a motor unit, a power converter is provided to an outer circumferential surface of a motor case at a position distant from an outer top portion in a circumferential direction. In a power converter, a power module and a control board are accommodated in an internal space of a device case. A power converter is provided with a device cooler. A device cooler has a device cooling passage extending along a power module. In the device cooling passage, a device inlet, into which coolant flows, and a device outlet, from which coolant flows out, are provided side by side in a circumferential direction. The device inlet is located a position lower than the device outlet in the Y direction.

11 Claims, 23 Drawing Sheets

(51) Int. Cl.
*H02K 9/00* (2006.01)
*H02K 11/30* (2016.01)
*H02M 1/32* (2007.01)
*H02M 7/00* (2006.01)
*H02K 9/19* (2006.01)
*H02K 11/00* (2016.01)

(52) U.S. Cl.
CPC ........... *H02M 1/327* (2021.05); *H02M 7/003* (2013.01); *H02K 9/19* (2013.01); *H02K 11/0094* (2013.01)

(58) Field of Classification Search
CPC ...... H02K 9/197; H02K 11/0094; H02K 9/00; H02K 9/02; H02K 9/04; H02K 9/06; H02K 9/08; H02K 9/10; H02K 9/12; H02K 9/14; H02K 9/16; H02K 9/18; H02K 1/20; Y02T 10/64; H02M 7/003; H02M 7/5387; H02M 1/327
USPC ........... 310/52, 53, 54, 55, 57, 58, 59, 60 R, 310/60 A, 64
See application file for complete search history.

(56) References Cited

U.S. PATENT DOCUMENTS

2016/0105084 A1* 4/2016 Ishimaru ................ H02K 5/203
310/54
2018/0159403 A1 6/2018 Yokoyama et al.
2019/0229584 A1 7/2019 Shinozaki et al.

FOREIGN PATENT DOCUMENTS

JP 2012-64724 A 3/2012
WO WO-2020021865 A1 * 1/2020 ............. H02K 11/33

OTHER PUBLICATIONS

U.S. Appl. No. 18/167,375, filed Feb. 10, 2023 on behalf of Tomohisa Sano.
U.S. Appl. No. 18/167,293, filed Feb. 10, 2023 on behalf of Tomohisa Sano.

* cited by examiner

ROTARY ELECTRIC MACHINE UNIT

CROSS REFERENCE TO RELATED APPLICATION

The present application is a continuation application of International Patent Application No. PCT/JP2021/030714 filed on Aug. 23, 2021, which designated the U.S. and claims the benefit of priority from Japanese Patent Application No. 2020-156642 filed on Sep. 17, 2020. The entire disclosures of all of the above applications are incorporated herein by reference.

TECHNICAL FIELD

The present disclosure relates to a rotary electric machine unit.

BACKGROUND

Conventionally, a cooling device is provided to a power converter and a rotary electric machine to cool the power converter and the rotary electric machine with coolant flowing inside the cooling device.

SUMMARY

According to an aspect of the present disclosure, a rotary electric machine unit comprises: a rotary electric machine, in which a rotor is configured to rotate relative to a stator; and a power converter provided outside the rotary electric machine and configured to convert an electric power, which is in a form of a direct current and supplied to the rotary electric machine, into an alternating current.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
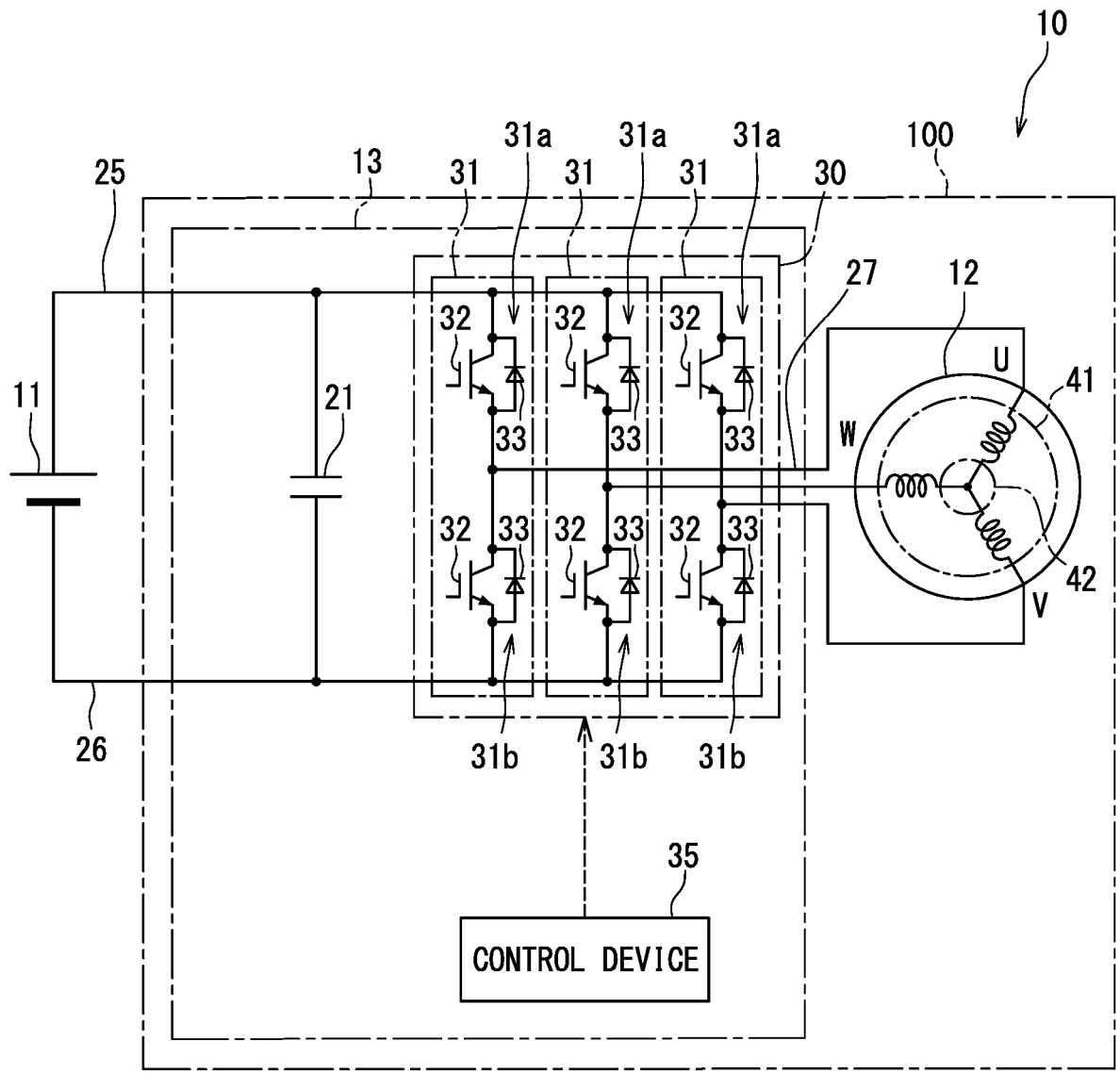
FIG. 1 is a view showing a configuration of a drive system according to a first embodiment.

Hereinafter, examples of the present description will be described.

According to an example of the present disclosure, a rotary electric machine unit includes a rotary electric machine and a power converter. In this rotary electric machine unit, the power converter and the rotary electric machine are cooled with coolant flowing inside a cooling device. The cooling device is formed in a tubular shape so as to extend along an outer surface of the rotary electric machine. In the power converter, electric components are accommodated in a housing. This housing is attached to an outer surface of the cooling device. The cooling device exerts a cooling effect from the outside on each of the rotary electric machine and the power converter.

However, in this configuration, in which the coolant cools the power converter from the outside of the housing, a concern arises that the cooling effect from the outside may be reduced inside the housing.

According to an example of the present disclosure, a rotary electric machine unit comprises a rotary electric machine in which a rotor is configured to rotate relative to a stator. The rotary electric machine unit further comprises a power converter provided outside the rotary electric machine and configured to convert an electric power, which is in a form of a direct current and to be supplied to the rotary electric machine, into an alternating current. The rotary electric machine is provided such that a rotary shaft of the rotor extends in a direction orthogonal to a vertical direction. The power converter includes an electric component configured to convert the electric power, a device housing accommodating the electric component, and a device cooling portion defining a device cooling passage inside the device housing to cause coolant to flow therethrough to cool the electric component with the coolant. The device housing is provided at a position distant from a top portion of the rotary electric machine in a circumferential direction of the rotary shaft. The device housing is inclined relative to a vertical direction, such that one end and an other end of the device cooling passage in the circumferential direction are an upper end and a lower end. The device cooling passage includes a device inlet, which is to cause coolant to flow therethrough into the device cooling passage, and a device outlet, which is to cause coolant to flow therethrough from the device cooling passage. The device inlet is at a position lower than the device outlet.

According to the above, the device housing is provided at a position distant from the top portion of the rotary electric machine in the circumferential direction. Therefore, even when heat accumulates in the vicinity of the top portion inside the rotary electric machine, this heat is less likely to be imparted to the device housing. Moreover, in the device cooling passage, the coolant, which flows into the device inlet, flows upward and flows out from the device outlet. Therefore, even when air bubbles are generated inside the device cooling passage due to, for example, a temperature rise of the coolant, the air bubbles tend to flow upward together with the coolant and flow out of the device outlet. In this way, the air bubbles hardly stays in the device cooling passage. Therefore, in the device cooling passage, the configuration enables to prevent the cooling effect of the coolant exerted on the internal space of the device housing and the electric components from being lowered due to the air bubbles. As described above, the cooling effect of the power converter can be enhanced.

As described above, the cooling effect of the power converter can be enhanced.

The following will describe embodiments for carrying out the present disclosure with reference to the drawings. In each of the embodiments, the same reference numerals are assigned to portions corresponding to the items described in the preceding embodiments, and a repetitive description of the corresponding portions may be omitted. In each embodiment, when only a part of the configuration is described, another embodiment previously described can be employed for other parts of the configuration. It may be possible not only to combine parts the combination of which is explicitly described in an embodiment, but also to combine parts of respective embodiments the combination of which is not explicitly described if any obstacle does not especially occur in combining the parts of the respective embodiments.

First Embodiment

A drive system 10 shown in FIG. 1 is adapted to a vehicle such as an electric vehicle (EV), a hybrid vehicle (HV) and a fuel battery. The drive system 10 includes a battery 11, a motor 12 and a power converter 13. The drive system 10 is a system to drive the motor 12 for driving the drive wheels of the vehicle.

The battery 11 corresponds to a DC voltage supply including a rechargeable secondary battery, and corresponds to a power supply for supplying electric power to the motor 12 through the power converter 13. The secondary battery is, for example, a lithium ion battery or a nickel hydride battery. The battery 11 applies a high voltage of, for example, several hundreds of volts, to an inverter 30.

The motor 12 is a three-phase AC rotary electric machine. The motor 12 has a U phase, a V phase, and a W phase as three phases. The motor 12 functions as an electric machine that is a travel driving source of the vehicle. The motor 12 functions as an electric generator during regeneration. The motor 12 includes a stator 41 and a rotor 42. In this motor 12, the stator 41 includes windings, and these windings form an armature. Further, the rotor 42 includes a permanent magnet. The permanent magnet form a magnetic field. The rotor 42 is provided radially inside the stator 41 and rotates with respect to the stator 41. The motor 12 may also be referred to as a motor generator or an electric motor.

The power converter 13 performs power conversion between the battery 11 and the motor 12. Herein, a circuit configuration of the power converter 13 will be described with reference to FIG. 1. The power converter 13 includes a smoothing capacitor 21, the inverter 30, and a control device 35.

The smoothing capacitor 21 is a capacitor that smoothes the DC voltage applied by the battery 11. The smoothing capacitor 21 is connected between a P line 25 which is a power line on a high potential side and an N line 26 which is a power line on a low potential side. The P line 25 is connected to a positive electrode of the battery 11, and the N line 26 is connected to a negative electrode of the battery 11. The positive electrode of the smoothing capacitor 21 is connected to the P line 25 between the battery 11 and the inverter 30. The negative electrode of the smoothing capacitor 21 is connected to the N line 26 between the battery 11 and the inverter 30. The smoothing capacitor 21 is connected to the battery 11 in parallel.

The inverter 30 is a DC-AC conversion circuit. The inverter 30 includes arm circuits 31 for three phases. The arm circuit 31 may be referred to as a leg. The arm circuit 31 includes an upper arm 31a and a lower arm 31b. The upper arm 31a and the lower arm 31b are connected in series between the P line 25 and the N line 26. The upper arm 31a is on the side of to the P line 25. The connection node between the upper arm 31a and the lower arm 31b is connected to the winding of the corresponding phase in the motor 12 through an output line 27. The arm circuit 31 and the output line 27 are provided for each of the U phase, the V phase and the W phase of the motor 12. The inverter 30 includes three upper arms 31a and three lower arms 31b.

The arms 31a and 31b include arm switches 32 and diodes 33. The arm switch 32 is formed of a switching element such as a semiconductor element. This switching element is, for example, an n-channel insulated gate bipolar transistor IGBT. Each of the arms 31a and 31b has one arm switch 32 and one diode 33. In each of the arms 31a and 31b, the diode 33 is connected in anti-parallel to the arm switch 32 for freewheeling. A collector of the arm switch 32 is connected to the P line 25 in the upper arm 31a. An emitter of the arm switch 32 is connected to the N line 26 in the lower arm 31b. The emitter of the arm switch 32 in the upper arm 31a and the collector of the arm switch 32 in the lower arm 31b are connected to each other. An anode of the diode 33 is connected to the emitter of the corresponding arm switch 32. A cathode of the diode 33 is connected to the collector of the corresponding arm switch 32. The arm switch 32 may also be referred to as a semiconductor switch.

The inverter 30 converts the DC voltage into AC voltage according to a switching control by the control device 35 and outputs the AC voltage to the motor 12. In this way, the motor 12 operates to generate a predetermined rotational torque. The inverter 30 converts the DC power from the battery 11 into three-phase AC power. The inverter 30 corresponds to a power converter. The inverter 30 converts, during regenerative braking of the vehicle, the AC voltage, which is generated by the motor 12 upon receiving the rotational force from the drive wheels, into the DC voltage according to the switching control of the control device 35, and outputs the DC voltage to the P line 25. In this way, the inverter 30 performs bidirectional power conversion between the battery 11 and the motor 12. The arm switch 32 corresponds to a switching element for the power conversion.

The control device 35 is, for example, an ECU and controls driving of the inverter 30. "ECU" is an abbreviation of "Electronic Control Unit". The control device 35 mainly includes, for example, a microcomputer (hereinafter, a microcomputer) with a processor, a memory, an I/O, and a bus connecting therebetween. The control device 35 executes a control program stored in the memory to perform various processes regarding drive of the inverter 30.

The control device 35 generates a drive command using a signal input from a host ECU such as an integrated ECU mounted on the vehicle or a signal input from various sensors such as a current sensor. The control device 35 causes the arm switch (IGBT) 32 to perform on drive and off drive according to this drive command.

Figure 2:
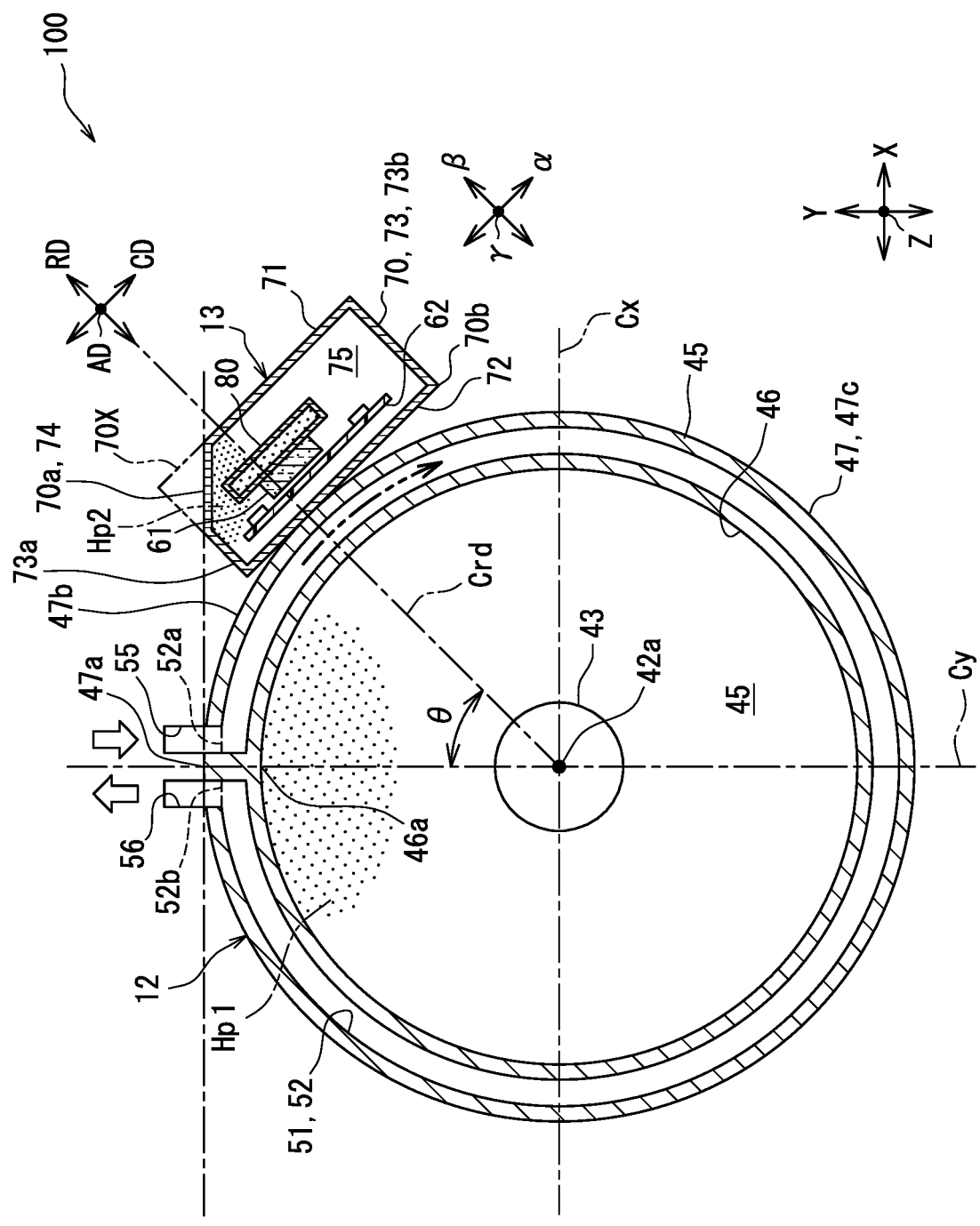
FIG. 2 is a schematic longitudinal sectional view showing a configuration of a motor unit.

Next, the structure of the motor 12 will be described with reference to FIG. 2. In FIG. 2, illustration of the stator 41 and the rotor 42 is omitted.

The motor 12 shown in FIG. 2 includes a motor case 45 and a motor shaft portion 43 in addition to the stator 41 and the rotor 42. The motor case 45 accommodates the stator 41 and the rotor 42. The motor case 45 corresponds to an electric machine case. The stator 41 and the rotor 42 are provided at an internal space 45a of the motor case 45. The stator 41 is fixed to the motor case 45. The motor case 45 is made of a metal material such as aluminum. The motor case 45 is a molded body of, for example, an aluminum die-casting and has a thermal conductivity. The motor case 45 is formed in a cylindrical shape as a whole. The inner surface of the motor case 45 includes an inner circumferential surface 46, and the outer surface of the motor case 45 includes an outer circumferential surface 47. Both the inner circumferential surface 46 and the outer circumferential surface 47 annularly extend along a circumferential direction CD of a rotary shaft 42a of the rotor 42. The inner circumferential surface 46 of the motor case 45 faces the outer circumferential surface of the stator 41 in the radial direction RD of the rotary shaft 42a. The rotary shaft 42a coincides with a center line of the rotor 42.

The rotary shaft 42a of the rotor 42 extends in an axial direction AD. In the rotary shaft 42a, the circumferential direction CD, the axial direction AD, and the radial direction RD are orthogonal to each other. An X direction, a Y direction, and a Z direction are orthogonal to each other. The rotary shaft 42a extends in the Z direction, and the axial direction AD and the Z direction coincide with each other. The X direction, Y direction, and Z direction may be referred to as a width direction, a vertical direction, and a depth direction of the motor 12. The motor 12 is provided so that the rotary shaft 42a extends in a direction orthogonal to the Y direction. In this case, the rotary shaft 42a extends horizontally and intersects with the vertical direction. The Z direction corresponds to this direction intersecting with the vertical direction. Note that the rotary shaft 42a may be tilted with respect to the horizontal direction. In both the configuration in which the rotary shaft 42a extends in the horizontal direction and the configuration in which the rotary shaft 42a is tilted with respect to the horizontal direction, the rotary shaft 42a intersects with the vertical direction.

The motor shaft portion 43 is fixed to the rotor 42 and rotates together with the rotor 42. The motor shaft portion 43 is provided coaxially with respect to the rotor 42. The center line of the motor shaft portion 43 coincides with the rotary shaft 42a of the rotor 42. The motor shaft portion 43 protrudes outside the motor case 45 in the axial direction AD.

The motor case 45 includes a tubular portion and a pair of opposed portions. The tubular portion has the inner circumferential surface 46 and the outer circumferential surface 47. The pair of opposed portions are opposed to each other and are arranged in the axial direction AD via the tubular portion. The motor shaft portion 43 penetrates at least one of the pair of opposed portions in the axial direction AD. The motor case 45 is formed by assembling a plurality of members together. These members include, for example, a case body forming the cylindrical portion, covers forming the opposed portions and covering openings of the case body, and a piping member attached to the case body.

The motor case 45 has a function of cooling the stator 41 and the rotor 42 with a coolant, such as water, and serves as a cooler for the motor 12. The motor case 45 may also be referred to as a motor cooler or an electric machine cooling portion. The motor case 45 has a motor passage 51 as a passage through which coolant flows. The motor case 45 forms the motor passage 51 and serves as a passage forming portion of the motor 12. In the motor passage 51, the coolant as a whole flows in the circumferential direction CD. The motor passage 51 is provided on the outside of the stator 41 and the rotor 42 in the radial direction RD. The motor case 45 may also be referred to as an electric current passage portion.

The motor passage 51 has a motor cooling passage 52, a motor upstream passage 55 and a motor downstream passage 56. The motor cooling passage 52 is provided between the inner circumferential surface 46 and the outer circumferential surface 47 in the motor case 45. The motor cooling passage 52 has a substantially annular shape and extends in the radial direction RD along the inner circumferential surface 46 and the outer circumferential surface 47. The motor cooling passage 52 has a pair of ends aligned in the circumferential direction CD. Coolant flows along the outer circumferential surface of the stator 41 in the motor cooling passage 52. In the motor passage 51, the stator 41 and the rotor 42 are cooled by coolant flowing through the motor cooling passage 52. The motor cooling passage 52 corresponds to an electric machine cooling passage.

The motor cooling passage 52 is provided with a motor inlet 52a and a motor outlet 52b. In the motor cooling passage 52, one of the pair of ends is provided with the motor inlet 52a, and the other of the pair of ends is provided with the motor outlet 52b. The motor upstream passage 55 is provided on the upstream side of the motor cooling passage 52 in the motor passage 51 and is connected to the motor inlet 52a. The motor downstream passage 56 is provided on the downstream of the motor cooling passage 52 in the motor passage 51 and is connected to the motor outlet 52b. In the motor cooling passage 52, the coolant that has flowed from the motor upstream passage 55 through the motor inlet 52a flows in the circumferential direction CD and flows out to the motor downstream passage 56 through the motor outlet 52b. The motor inlet 52a corresponds to an electric machine inlet, and the motor outlet 52b corresponds to an electric machine outlet.

Both the motor upstream passage 55 and the motor downstream passage 56 extend from the motor cooling passage 52 in the radial direction RD. Specifically, both the motor upstream passage 55 and the motor downstream passage 56 extend upward from the motor cooling passage 52. The motor upstream passage 55 forms an upstream end of the motor passage 51. The motor downstream passage 56 forms a downstream end of the motor passage 51. In the motor case 45, the portion forming the motor cooling passage 52 is a tubular member as a whole. Further, the portion forming each of the motor upstream passage 55 and the motor downstream passage 56 is a pipe-shaped portion extending in the radial direction RD.

In the motor cooling passage 52, the motor inlet 52a and the motor outlet 52b are provided side by side in the X direction. Regarding the motor 12, a virtual line extending in the X direction through the rotary shaft 42a is referred to as a motor horizontal line Cx, and a virtual line extending in the Y direction through the rotary shaft 42a is referred to as a motor vertical line Cy. In this case, the motor inlet 52a is provided on the side opposite of the motor vertical line Cy from the motor outlet 52b in the X direction. Both the motor inlet 52a and the motor outlet 52b are provided on the upper side of the horizontal motor line Cx in the Y direction.

The motor inlet 52a and the motor outlet 52b are arranged side by side in the X direction through an inner top portion 46a and an outer top portion 47a, and are provided between the inner top portion 46a and the outer top portion 47a in the Y direction. The inner top portion 46a is an upper portion of a pair of upper and lower portions of the inner circumferential surface 46 of the motor case 45. The upper and lower portions of the inner circumferential surface 46 intersect with the motor vertical line Cy. The outer top portion 47a is an upper portion of a pair of upper and lower portions of the outer circumferential surface 47 of the motor case 45. The upper and lower portions of the outer circumferential surface 47 intersect with the motor vertical line Cy. The motor upstream passage 55 and the motor downstream passage 56 protrude upward from the outer top portion 47a in the Y direction. The outer top portion 47a corresponds to a top portion of the motor 12.

The outer circumferential surface 47 of the motor case 45 includes an upper side surface 47b and a lower side surface 47c. The upper side surface 47b is a portion of the outer circumferential surface 47 on the upper side of the horizontal motor line Cx and faces upward. The outer top portion 47a is a part of the upper side surface 47b. The lower side surface 47c is a portion of the outer circumferential surface 47 on the lower side of the motor horizontal line Cx and faces downward.

Next, the structure of the power converter 13 will be described with reference to FIGS. 2 to 5.

The power converter 13 shown in FIGS. 2 to 5 includes a power module 61, a control board 62, and a device case 70. The device case 70 accommodates the power module 61 and the control board 62. The device case 70 corresponds to a device housing. The power module 61 and the control board 62 are fixed to the device case 70. The device case 70 is formed in a box shape and has a rectangular parallelepiped shape as a whole. The device case 70 is made of a metal material such as aluminum. The device case 70 is a molded body of, for example, an aluminum die-casting and has a thermal conductivity.

The device case 70 is flat and thin as a whole. An α direction, a β direction, and a γ direction are mutually orthogonal directions with respect to the device case 70. The thickness direction of the device case 70 is the γ direction. Of the outer surface of the device case 70, a surface extending in a direction orthogonal to the thickness direction is a flat surface. This flat surface extends in the directions α and β orthogonal to the γ direction. The α direction, β direction, and γ direction may be referred to as a width direction, a vertical direction, and a depth direction of the inverter 30.

The device case 70 includes a ceiling portion 71, a floor portion 72, an outer wall 73, and an inclined portion 74. The ceiling portion 71 and the floor portion 72 are aligned in the β direction and face each other through an internal space 75 of the device case 70 interposed therebetween. The ceiling portion 71 and the floor portion 72 extend in directions orthogonal to the β drection. The inner surface of the device case 70 includes a ceiling surface formed by the ceiling portion 71 and a floor surface formed by the floor portion 72. The outer surface of the device case 70 includes an upper surface formed by the ceiling portion 71 and a lower surface formed by the floor portion 72. In the device case 70, the flat upper surface and the lower surface are flat surfaces. Note that the ceiling portion 71 and the floor portion 72 may intersect with the β direction are not necessarily orthogonal to the β direction.

Figure 4:
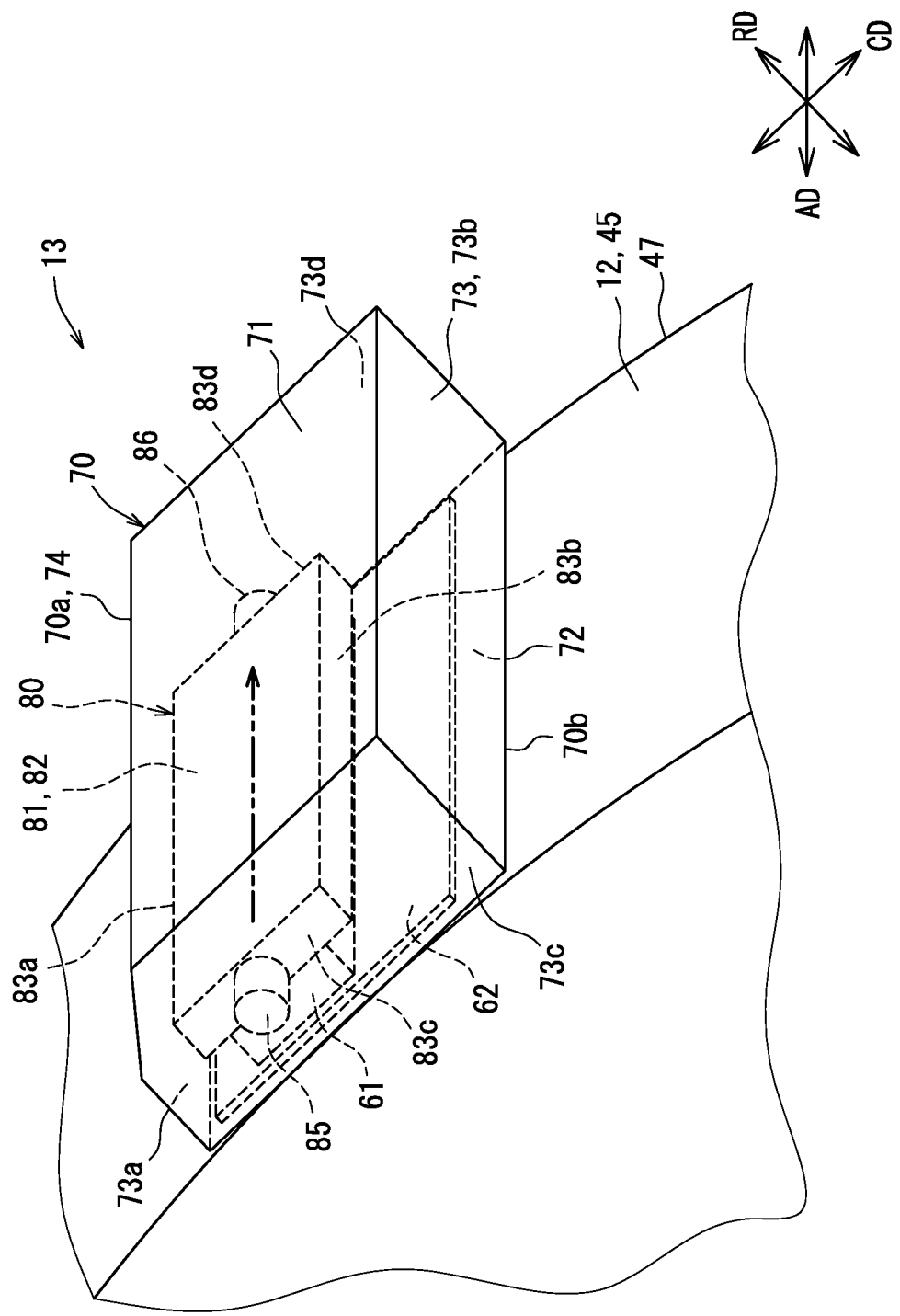
FIG. 4 is a perspective view showing the power converter.
Figure 5:
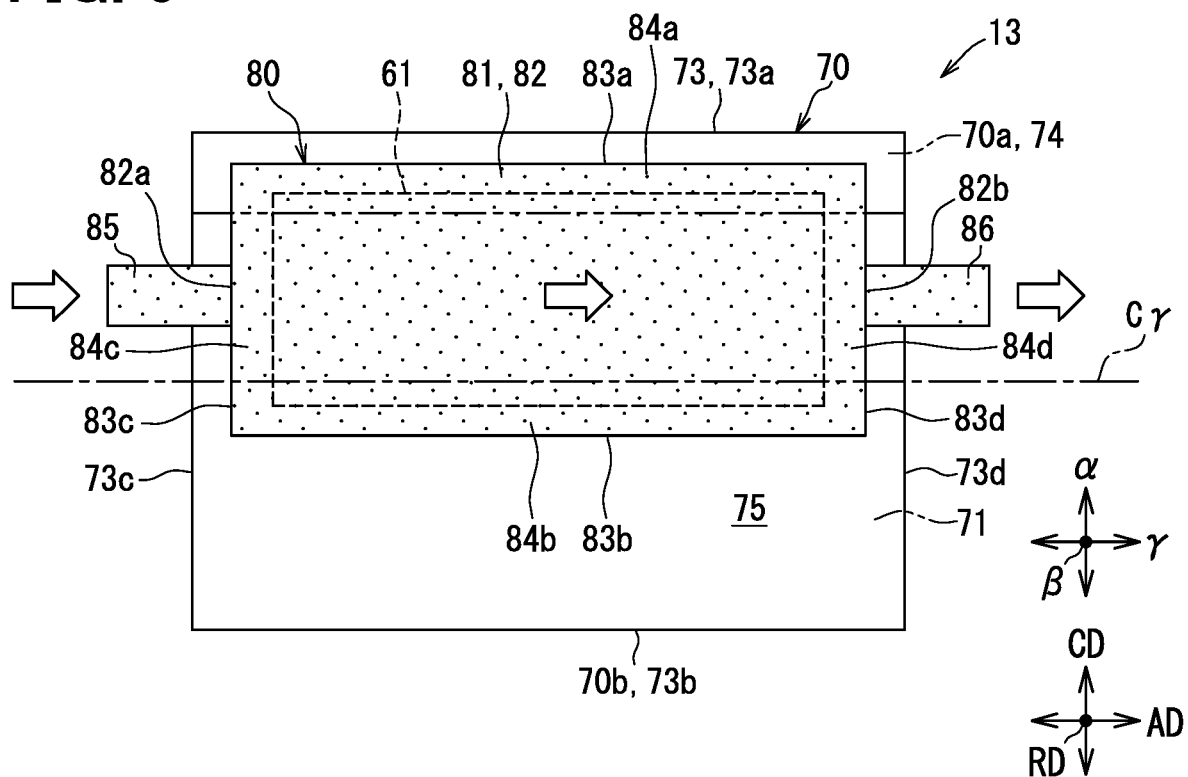
FIG. 5 is a diagram showing an internal structure of the power converter.

As shown in FIGS. 4 and 5, the outer wall 73 is formed in a rectangular tubular shape. The outer wall 73 is provided between the ceiling portion 71 and the floor portion 72 and connects the ceiling portion 71 with the floor portion 72. The outer wall 73 extends in the β direction. The outer wall 73 includes a first wall portion 73a, a second wall portion 73b, and side wall portions 73c and 73d as a plurality of wall portions. These wall portions 73a to 73d are arranged along outer peripheral edges of the ceiling portion 71 and the floor portion 72. The first wall portion 73a and the second wall portion 73b are aligned in the α direction and face each other through the internal space 75 interposed therebetween. The first wall portion 73a and the second wall portion 73b extend in a direction orthogonal to the α direction. The side wall portions 73c and 73d are arranged in the γ direction and face each other through the first wall portion 73a, the second wall portion 73b, and the internal space 75 interposed therebetween. The side wall portions 73c and 73d connect the first wall portion 73a and the second wall portion 73b with each other and extend in a direction orthogonal to the γ direction. Note that the first wall portion 73a and the second wall portion 73b may intersect with the α-direction and are not necessarily orthogonal to the α-direction. The side wall portions 73c and 73d may intersect with the γ-direction and are not necessarily orthogonal to the γ-direction.

Figure 3:
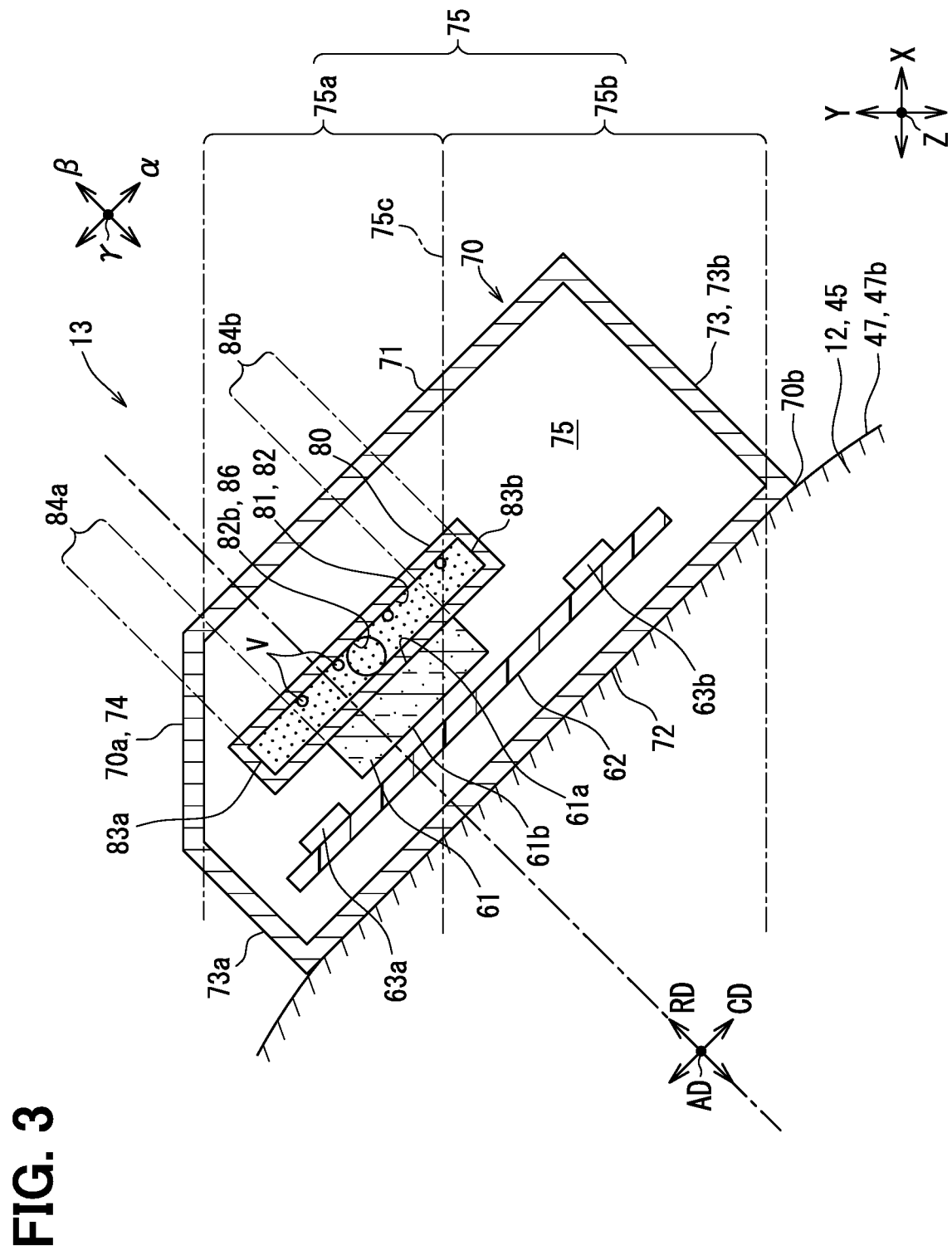
FIG. 3 is a vertical cross-sectional view showing a power converter.

As shown in FIGS. 3 and 4, the inclined portion 74 spans the ceiling portion 71 and the first wall portion 73a. The inclined portion 74 is inclined with respect to both the ceiling portion 71 and the first wall portion 73a. The inclined portion 74 connects an end portion of the ceiling portion 71 on the side of the first wall portion 73a with an end portion of the first wall portion 73a on the side of the ceiling portion 71. The inclined portion 74 is formed such that a corner between the ceiling portion 71 and the first wall portion 73a is chamfered. Both an outer surface and an inner surface of the inclined portion 74 extend straight in a direction orthogonal to the thickness direction of the inclined portion 74. The inclined portion 74 spans over the side wall portions 73c and 73d together with the ceiling portion 71 and the first wall portion 73a. The inclined portion 74 connects the side wall portions 73c and 73d. The inclined portion 74 extends in the γ direction. In the β direction, the height dimension of the first wall portion 73a is smaller than the height dimension of the second wall portion 73b by the height dimension of the inclined portion 74. In the α direction, the length dimension of the ceiling portion 71 is smaller than the length dimension of the floor portion 72 by the length dimension of the inclined portion 74. Therefore, the area of the ceiling surface is smaller than the area of the floor surface.

The device case 70 is formed by assembling a plurality of members together. These members include, for example, a case body forming the outer wall 73, a cover that forms at least one of the ceiling portion 71 and the floor portion 72 and covers the opening of the case body, and a piping member attached to the case body.

As shown in FIGS. 3 to 5, the power module 61 is provided at the internal space 75 of the device case 70. In the present embodiment, one power module 61 is housed in the device case 70. The power module 61 is formed flat as a whole and extends in directions orthogonal to the β drection. The power module 61 extends along the ceiling portion 71 and the floor portion 72 of the device case 70. Among the outer surfaces of the power module 61, an upper surface 61a facing the ceiling portion 71 and a lower surface 61b facing the floor portion 72 are both flat surfaces orthogonal to the thickness direction of the power module 61, and extend in in directions orthogonal to the β drection.

As shown in FIG. 5, the power module 61 has a horizontally elongated shape extending in the γ direction. In the power module 61, the length dimension in the γ direction is larger than the length dimension in the α direction. In the power module 61, the long side extends in the γ direction, and the short side extends in the α direction. The power module 61 is provided at a position closer to the first wall portion 73a than the second wall portion 73b of the device case 70 in the α direction. An imaginary line passing through the center of the device case 70 and extending in the γ direction is a device horizontal line Cγ. The power module 61 is positioned across the device horizontal line Cγ in the α direction. The power module 61 is positioned substantially at the center between the first side wall portion 73c and the second side wall portion 73d of the device case 70 in the γ direction.

The power module 61 constitutes at least a part of the inverter 30. For example, the power module 61 constitutes the arm circuit 31 of three phases. The power module 61 is a component for converting electric power. The power module 61 corresponds to an electric component. The power module 61 may also be referred to as a semiconductor module.

The power module 61 includes a switching element that constitutes the arm switch 32 of three phases, and a module main body that protects the switching element. The module main body includes a sealing resin body that seals the switching element. The module main body is provided with a plurality of terminals electrically connected to the switching element. These terminals include a power terminal and a signal terminal. The power terminal includes a P terminal connected to the P line 25, an N terminal connected to the N line 26, and an output terminal connected to the output line 27. The signal terminal is connected to the control board 62 by insertion mounting or the like.

As shown in FIGS. 3 and 4, the control board 62 is formed in a rectangular plate shape as a whole and constitutes the control device 35. The control board 62 is installed in the internal space 75 of the device case 70 so as to extend in directions orthogonal to the β drection. The control board 62 is provided between the power module 61 and the floor portion 72 in the β direction. The control board 62 is positioned closer to the floor potion 72 than the ceiling portion 71 in the β drection. The control board 62 extends along the power module 61 and the floor portion 72. The board surface of the control board 62 extends in directions orthogonal to the β direction.

As shown in FIG. 3, the control board 62 is mounted with a first mounted component 63a and a second mounted component 63b. These mounted components 63a and 63b are electronic components and connectors. The second mounted component 63b has at least one of a characteristic that the second mounted component 63b likely generates heat when energized more than the first mounted component 63a, and a characteristic that the second mounted component 63b has a lower heat resistance than the first mounted component 63a. For example, as the second mounted component 63b, a heat-generating component, which generates a larger amount of heat when energized than the first mounted component 63a, a low heat-resistant component, whose heat resistance is lower than that of the first mounted component 63a, or a specific component, which has the characteristics of both the heat-generating component and the low heat-resistant component, is mounted on the control board 62. The second mounted component 63b is provided on the opposite side of the first mounted component 63a from the first wall portion 73a in the α direction. The second mounted component 63b is provided at a position closer to the second wall portion 73b than to the first wall portion 73a in the α direction. The first mounted component 63a may be, for example, a chip resistor or a chip capacitor. The second mounted component 63b may be a heat-generating component such as a transformers, a microcomputer chip, or a driver IC, and a low heat-resistant component, such as a photocoupler.

The control board 62 includes a board portion as a base material and a plurality of mounted components mounted on the board portion. In the control board 62, a control circuit that constitutes the control device 35 is formed by a wiring provided on the board portion and the mounted component electrically connected to the wiring. The plurality of mounted components includes the mounted components 63a and 63b.

As shown in FIGS. 2 to 5, the power converter 13 is provided with a device cooler 80. The device cooler 80 has a function of cooling the inside of the device case 70 with a coolant such as water. The device cooler 80 corresponds to a device cooling portion. The device cooler 80 includes a device passage 81 through which a coolant such as water flows. The device cooler 80 forms the device passage 81 and serves as a passage forming portion in the power converter 13. The device cooler 80 is formed of a member such as the device case 70 and a piping member attached to the device case 70 in the power converter 13. In the device passage 81 as a whole, the coolant flows in the γ direction.

In FIGS. 2, 4, and 5, the control board 62, the device case 70, and the device cooler 80 are illustrated in a simplified manner, by ignoring their thickness. For example, the device cooler 80 shows the outline of a device cooling passage 82. In FIG. 5, illustration of the control board 62 is omitted, and the ceiling portion 71 and the inclined portion 74 are illustrated by imaginary lines.

As shown in FIGS. 3 to 5, the device passage 81 includes the device cooling passage 82, a device upstream passage 85, and a device downstream passage 86. The device cooling passage 82 is provided at the internal space 75 of the device case 70. In other words, the device cooler 80 is formed by providing the device cooling passage 82 inside the device case 70. The device cooling passage 82 is formed flat as a whole and extends in directions orthogonal to the β drection.

As shown in FIG. 3, the device cooling passage 82 is provided between the ceiling portion 71 and the power module 61 in the β direction. The device cooling passage 82 is provided on the opposite side of the power module 61 from the control board 62 in the β direction. The device cooling passage 82 is positioned closer to the ceiling portion 71 than to the floor portion 72 in the β direction. The motor cooling passage 52 overlaps the upper surface 61a of the power module 61 and extends along the upper surface 61a. In the device cooling passage 82, the coolant flows along the upper surface 61a of the power module 61. In the device passage 81, the power module 61 is cooled by the coolant flowing through the device cooling passage 82.

As shown in FIG. 5, the ends of the device cooling passage 82 include a first end 83a, a second end 83b, and side ends 83c and 83d. These ends 83a to 83d are arranged along the outer peripheral edge of the device cooling passage 82. The first end 83a and the second end 83b are aligned in the α direction in the device cooling passage 82. Both the first end 83a and the second end 83b extend in the γ direction. The first end 83a is an end portion of the device cooling passage 82 on the side of the first wall portion 73a of the device case 70, and extends along the first wall portion 73a. The second end 83b is an end portion of the device cooling passage 82 on the side of the second wall portion 73b of the device case 70, and extends along the second wall portion 73b.

The side ends 83c and 83d are aligned in the γ direction in the device cooling passage 82. Both the side ends 83c and 83d extend in the α direction. The side ends 83c and 83d span the first end 83a and the second end 83b. The side ends 83c and 83d extend along the side wall portions 73c and 73d of the device case 70. Of the side ends 83c and 83d, the first side end 83c is provided on the side of the first side wall portion 73c of the side wall portions 73c and 73d. The second side end 83d is provided on the side of the second side wall portion 73d.

The device cooling passage 82 is provided with a device inlet 82a and a device outlet 82b. The device inlet 82a is provided at the first side end 83c of the device cooling passage 82. The device outlet 82b is provided at the second side end 83d of the device cooling passage 82. In the device cooling passage 82, the device inlet 82a is provided at the upstream end, and the device outlet 82b is provided at the downstream end. The device inlet 82a and the device outlet 82b are arranged in the γ direction. The device inlet 82a and the device outlet 82b are opposed to each other. The device cooling passage 82 opens at the device inlet 82a and the device outlet 82b in directions opposite to each other in the γ direction.

In the device cooling passage 82, as long as at least a part of the device inlet 82a is formed in the first side end 83c, the device inlet 82a is supposed to be provided at the first side end 83c. The similar is applied to the device outlet 82b. As long as at least a part of the device outlet 82b is formed in the second side end 83d, the device outlet 82b is supposed to be provided at the second side end 83d. In the present embodiment, the entirety of the device inlet 82a is formed in the first side end 83c, and the entirety of the device outlet 82b is formed in the second side end 83d.

The device upstream passage 85 is provided on the upstream side of the device cooling passage 82 in the device passage 81 and is connected to the device inlet 82a. The device downstream passage 86 is provided on the downstream side of the device cooling passage 82 in the device passage 81 and is connected to the device outlet 82b. In the device cooling passage 82, the coolant that has flowed from the device upstream passage 85 through the device inlet 82a flows in the γ direction and flows out to the device downstream passage 86 through the device outlet 82b. This coolant flows along the first end 83a and the second end 83b in the device cooling passage 82 in the γ direction.

The device upstream passage 85 extends from the device inlet 82a toward the side opposite to the device outlet 82b in the γ direction. The device downstream passage 86 extends from the device outlet 82b toward the side opposite to the device inlet 82a in the γ direction. The device upstream passage 85 and the device downstream passage 86 are provided horizontally side by side through the device cooling passage 82 interposed therebetween in the γ direction. The device upstream passage 85 forms an upstream end of the device passage 81. The device downstream passage 86 forms a downstream end of the device passage 81.

In the device cooler 80, the portion forming the device cooling passage 82 is flat as a whole. For example, the device case 70 includes a flat case partition that partitions the internal space 75 in the β direction, and at least a part of the case partition forms the device cooling passage 82. The case partition is provided between the ceiling portion 71 and the floor portion 72 in the device case 70, and extends along the ceiling portion 71 and the floor portion 72. Portions forming the device upstream passage 85 and the device downstream passage 86 are pipe-shaped extending in the γ direction. For example, at least a part of the pipe-shaped portions is formed of a piping member included in the device case 70 and/or a piping member attached to the device case 70 in the power converter 13. Portions forming the device upstream passage 85 and the device downstream passage 86 protrude from the side wall portions 73c and 73d of the device case 70 to the outside of the case.

The device cooling passage 82 has a horizontally elongated shape extending in the γ direction. In the device cooling passage 82, the length dimensions of the first end 83a and the second end 83b are larger than the length dimensions of the side ends 83c and 83d. The first end 83a and the second end 83b are longer sides than the side ends 83c and 83d. The side ends 83c and 83d are short sides. The device cooling passage 82 is provided at a substantially center position between the first wall portion 73a and the second wall portion 73b of the device case 70 in the γ direction.

The device cooling passage 82 is provided at a position closer to the first wall portion 73a than the second wall portion 73b of the device case 70 in the a direction. The device inlet 82a and the device outlet 82b are provided at a substantially center position between the first end 83a and the second end 83b of the device cooling passage 82 in the α direction. Accordingly, the device inlet 82a and the device outlet 82b are positioned closer to the first wall portion 73a of the device case 70 than to the second wall portion 73b in the α direction. As shown in FIG. 5, the device cooling passage 82 is positioned across the device horizontal line Cγ in the α direction. On the other hand, the device inlet 82a and the device outlet 82b are positioned on the side of the first wall portion 73a relative to the device horizontal line Cγ of the device case 70. That is, the device inlet 82a and the device outlet 82b are located between the device horizontal line Cγ and the first wall portion 73a.

The device cooling passage 82 overlaps the entirety of the upper surface 61a of the power module 61. The device cooling passage 82 extends outside the power module 61 in a direction orthogonal to the β direction. The extending portion includes a first extending portion 84a, a second extending portion 84b, a first side extending portion 84c, and a second side extending portion 84*d*. The first extending portion 84*a* is a portion extending toward the first wall portion 73*a* beyond the power module 61 in the device cooling passage 82, and forms at least a portion of the first end 83*a*. The second extending portion 84*b* is a portion of the device cooling passage 82 that extends toward the second wall portion 73*b* beyond the power module 61, and forms at least a portion of the second end 83*b*.

The first side extending portion 84*c* is a portion of the device cooling passage 82 that extends toward the first side wall portion 73*c* beyond the power module 61, and forms at least a portion of the first side end 83*c*. The device inlet 82*a* is provided to the first side extending portion 84*c*. The second side extending portion 84*d* is a portion of the device cooling passage 82 that extends toward the second side wall portion 73*d* beyond the power module 61, and forms at least a portion of the second side end 83*d*. The device outlet 82*b* is provided to the second side extending portion 84*d*.

The drive system 10 shown in FIG. 1 includes a motor unit 100. As shown in FIG. 2, the motor unit 100 includes the motor 12 and the power converter 13. In the motor unit 100, the power converter 13 is attached to the motor 12. Specifically, the device case 70 is attached to the motor case 45. The motor unit 100 is a unit in which the motor 12 and the power converter 13 are integrated with each other. Note that the motor unit 100 corresponds to a rotary electric machine unit.

In the description of the power converter 13 so far, the α direction, β direction, and γ direction for the power converter 13 are used as references. Herein, the power converter 13 will be described with reference to the X direction, the Y direction, the Z direction, the axial direction AD, the circumferential direction CD, and the radial direction RD for the motor 12, with reference to FIGS. 2 to 4.

As shown in FIGS. 2 to 4, the power converter 13 is fixed to the outer circumferential surface 47 of the motor case 45. The power converter 13 is provided on the upper side surface 47*b* of the outer circumferential surface 47, and is placed on the upper side surface 47*b*. The power converter 13 is arranged between the outer top portion 47*a* and the motor horizontal line Cx in both the circumferential direction CD and the Y direction. The power converter 13 is located apart from the outer top portion 47*a* in the circumferential direction CD and does not protrude upward beyond the outer top portion 47*a*. The power converter 13 is located apart from the outer top portion 47*a* in the circumferential direction CD. The upper end portion of the power converter 13 is between the outer top portion 47*a* and the inner top portion 46*a* in the Y direction. In the present embodiment, the upper end portion of the power converter 13 is at the same height position as the outer top portion 47*a*.

As shown in FIG. 2, the power converter 13 is positioned closer to the motor inlet 52*a* than to the motor outlet 52*b* among the positions overlapping the motor cooling passage 52 in the radial direction RD. The power converter 13 is provided on the opposite side of the motor inlet 52*a* from the motor outlet 52*b* in both the circumferential direction CD and the X direction. The motor inlet 52*a* is positioned closer to the motor outlet 52*b* than the power converter 13 in both the circumferential direction CD and the X direction.

The power converter 13 is inclined by an angle θ with respect to the Y direction. The power converter 13 extends in the circumferential direction CD along the outer circumferential surface 47 of the motor case 45. In the motor unit 100, the β direction for the power converter 13 and the radial direction RD for the motor case 45 coincide with each other. Similarly, the α direction and the circumferential direction CD coincide with each other, and the γ direction and the axial direction AD coincide with each other. A virtual lines extending in the radial direction RD and inclined by an angle θ with respect to the motor vertical line Cy is referred to as a motor tilt line Crd. The power converter 13 is arranged at a position through which the motor tilt line Crd passes. The motor tilt line Crd extends in the β drection for the power converter 13. It should be noted that the angle θ is included in a range of larger than 0 degrees and less than or equal to 90 degrees. The angle θ is set to 45 degrees, for example.

As shown in FIGS. 2 and 3, in the power converter 13, an upper end portion 70*a* of the device case 70 is the inclined portion 74. A lower end portion 70*b* of the device case 70 is a connection portion between the second wall portion 73*b* and the floor portion 72. In the motor unit 100, the inclined portion 74 of the device case 70 is between the outer top portion 47*a* of the outer circumferential surface 47 of the motor case 45 and the inner top portion 46*a* of the inner circumferential surface 46 in the Y direction. The lower end portion 70*b* of the device case 70 is positioned lower than the inner top portion 46*a* of the inner circumferential surface 46 in the Y direction. The upper end portion 70*a* of the device case 70 is the upper end portion of the power converter 13, and the lower end portion 70*b* is the lower end portion of the power converter 13.

In the circumferential direction CD, the first wall portion 73*a* and the second wall portion 73*b* are arranged side by side. Both the first wall portion 73*a* and the second wall portion 73*b* extend in a direction orthogonal to the circumferential direction CD. In the circumferential direction CD, the first wall portion 73*a* is closer to the motor inlet 52*a* than the second wall portion 73*b*. In the Y direction, the first wall portion 73*a* is located on the upper side of the second wall portion 73*b*. Note that the first wall portion 73*a* corresponds to a wall portion extending in the radial direction RD.

In the axial direction AD, the first side wall portion 73*c* and the second side wall portion 73*d* are arranged side by side. These side wall portions 73*c* and 73*d* both extend in directions orthogonal to the axial direction AD. In the radial direction RD, the ceiling portion 71 and the floor portion 72 are arranged side by side. Both of the ceiling portion 71 and the floor portion 72 extend in directions orthogonal to the radial direction RD. In the radial direction RD, the floor portion 72 is positioned closer to the motor case 45 than the ceiling portion 71 and is fixed to the upper side surface 47*b* of the motor case 45. The inclined portion 74 extends in directions orthogonal to the Y direction. Note that the ceiling portion 71 and the floor portion 72 do not necessarily extend in the directions orthogonal to the radial direction RD, as long as the ceiling portion 71 and the floor portion 72 extend in a direction intersecting with the radial direction RD.

In the device case 70, the upper end portion of the ceiling portion 71 and the upper end portion of the first wall portion 73*a* are connected with each other via the inclined portion 74. Herein, as shown in FIG. 2, an imaginary case 70X is assumed in which the device case 70 does not have the inclined portion 74. In the imaginary case 70X, the upper end portion of the ceiling portion 71 and the upper end portion of the first wall portion 73*a* are directly connected with each other without the inclined portion 74 therebetween. Therefore, the imaginary case 70X has a height dimension in the Y direction larger than that of the device case 70, and protrudes upward beyond the motor case 45 in the Y direction. In other words, the device case 70 having the inclined portion 74 has a shape that is less likely to protrude upward than the motor case 45 compared to the imaginary case 70X that does not have the inclined portion 74.

As shown in FIGS. 2 and 3, the device cooler 80 is inclined relative to the Y direction, such that the first end 83*a* of the device cooling passage 82 is the upper end, and the second end 83*b* is the lower end. The first end 83*a* is provided below the inclined portion 74 in the device case 70. The first end 83*a* and the inclined portion 74 are arranged vertically in the Y direction. The first end 83*a* and the inclined portion 74 are arranged side by side in both the radial direction RD and the circumferential direction CD.

As described above, the height dimension of the device case 70 in the Y direction is smaller than the height dimension of the imaginary case 70X. Therefore, the distance between the upper end portion 70*a* of the device case 70 and the first end 83*a* of the device cooling passage 82 is smaller than the distance between the upper end portion of the imaginary case 70X and the first end 83*a*. That is, the first end 83*a* of the device cooling passage 82 is arranged at a position as close to the inclined portion 74 as possible in the Y direction.

Both the power module 61 and the device cooling passage 82 extend in directions orthogonal to the radial direction RD. The upper surface 61*a* of the power module 61 faces outward in the radial direction RD and faces upward in the Y direction. The lower surface 61*b* faces inward in the radial direction RD and faces downward in the Y direction.

Both the power module 61 and the device cooling passage 82 are provided at the upper positions in the internal space 75 of the device case 70. The power module 61 and the device cooling passage 82 are positioned closer to the upper end portion 70*a* of the device case 70 than to the lower end portion 70*b* in the Y direction. The shortest distance between the power module 61 and the device cooling passage 82 and the upper end portion 70*a* is smaller than the shortest distance between the power module 61 and the device cooling passage 82 and the lower end portion 70*b*.

As shown in FIG. 3, in the internal space 75 of the device case 70, the space on the side of the upper end portion 70*a* is referred to as an upper space 75*a,* and the space on the side of the lower end portion 70*b* is referred to as a lower space 75*b*. The first end 83*a* is arranged in the upper space 75*a*. The second end 83*b* of the device cooling passage 82 is arranged in the lower space 75*b*. The device cooling passage 82 vertically spans a boundary portion 75*c* between the upper space 75*a* and the lower space 75*b* in the Y direction. The first end 83*a* is positioned closer to the upper end portion 70*a* than the boundary portion 75*c* in the Y direction. The upper space 75*a* and the lower space 75*b* are spaces having the same capacity. The boundary portion 75*c* extends in the horizontal direction orthogonal to the Y direction. As for the internal space 75, the upper space 75*a* and the lower space 75*b* may be defined according to the volume of the device case 70, the center of gravity, and the like, instead of the capacity.

In the device cooling passage 82, the first extending portion 84*a* extends upward beyond the power module 61 in both the circumferential direction CD and the Y direction. That is, the first end 83*a* protrudes toward the outer top portion 47*a* of the motor case 45 in the circumferential direction CD. The second extending portion 84*b* extends downward beyond the power module 61 in both the circumferential direction CD and the Y direction. That is, the second end 83*b* protrudes toward the opposite side to the inner top portion 46*a* of the motor case 45 in the circumferential direction CD.

As shown in FIGS. 4 and 5, in the device cooling passage 82, the device inlet 82*a* and the device outlet 82*b* are aligned in the axial direction AD. Therefore, in the device cooling passage 82, the coolant flowing in from the device inlet 82*a* flows in the axial direction AD and flows out from the device outlet 82*b*. Both the device inlet 82*a* and the device outlet 82*b* are open in the axial direction AD. Therefore, in the device cooling passage 82, the coolant flowing in from the device inlet 82*a* easily flows in the axial direction AD. At a portion where the motor case 45 and the device case 70 overlap in the radial direction RD, the coolant flowing in the motor cooling passage 52 in the circumferential direction CD flows downward. Therefore, in the portion where the motor case 45 and the device case 70 overlap in the radial direction RD, the coolant flowing in the device cooling passage 82 in the axial direction AD and the coolant flowing in the motor cooling passage 52 cross each other.

As shown in FIG. 3, the control board 62 is inclined with respect to the Y direction so that the second mounted component 63*b* is arranged at the lower position than the first mounted component 63*a*. The second mounted component 63*b* is positioned lower than the first mounted component 63*a* in the Y direction. Both of these mounted components 63*a* and 63*b* are positioned lower than the upper end portion 70*a* of the device case 70. The second mounted component 63*b* is located farther from the upper end portion 70*a* of the device case 70 than the first mounted component 63*a*. The first mounted component 63*a* is arranged in the upper space 75*a*, and the second mounted component 63*b* is arranged in the lower space 75*b*. The first mounted component 63*a* is arranged side by side with the device cooling passage 82 in a direction orthogonal to the Y direction. The second mounted component 63*b* is arranged at a position lower than the device cooling passage 82 in the Y direction.

Next, a method for manufacturing the motor unit 100 will be described.

First, a method for manufacturing the power converter 13 will be described. A worker prepares at least the case body and the cover as members for manufacturing the device case 70. Then, the power module 61 and the control board 62 are installed inside the case body through the opening of the case body. After that, the device case 70 is manufactured by attaching the cover to the opening of the case body. This cover is a member that forms the floor portion 72 of the device case 70. At the time of manufacturing the power converter 13, in a state where the ceiling portion 71 of the device case 70 is positioned on the lower side, the control board 62 and the like are installed inside the device case 70 from the upper side through the opening, which is opened upward. The cover is attached to the opening from the upper side. In this case, the control board 62 is installed inside the device case 70 after the power module 61 is installed. This facilitates the work of arranging the control board 62 on the opposite side of the ceiling portion 71 with the power module 61 interposed therebetween.

Then, the power converter 13 is turned upside down, so that the power converter 13 is turned upside down relative to the position when the power converter 13 is manufactured. The device case 70 is attached to the motor case 45 in a state where the floor portion 72 of the device case 70 faces downward. In this way, when the power converter 13 is manufactured, the control board 62 is installed in the device case 70 in the state where the floor portion 72 of the device case 70 faces upward. Thus, it facilitates the work of arranging the control board 62 between the power module 61 and the floor portion 72. As a result, when the motor unit 100 is manufactured, it facilitates the work of arranging the control board 62 between the motor cooling passage 52 and the device cooling passage 82 in the radial direction RD.

A manufacturing method different from that of the present embodiment is conceivable. For example, when the power converter 13 is manufactured in a state where the floor portion 72 of the device case 70 is positioned on the lower side, the control board 62 and the like are installed inside the device case 70 through an opening that opens upward. In this manufacturing method, it is necessary to install the control board 62 inside the device case 70 before the power module 61 is installed. In this case, there is concern that a work of electrically connecting the control board 62 to another equipment such as the power module 61 would become more difficult. That is, there is a concern that a work of arranging the control board 62 between the power module 61 and the floor portion 72 and a work of arranging the control board 62 between the motor cooling passage 52 and the device cooling passage 82 in the radial direction RD would become more difficult.

The vehicle equipped with the drive system 10 is equipped with the cooling system for cooling the motor 12 and the power converter 13. This cooling system includes a heat radiating part that dissipates heat from the coolant and a driving part that circulates the coolant. The heat radiation part is includes a device such as a radiator that cools the coolant. The driving part includes a device such as a pump provided for a circulation passage through which the coolant flows. The circulation passage includes the motor passage 51 and the device passage 81. For example, an external piping that forms the circulation passage is connected to the device cooler 80 such that the external piping communicates with device inlet 82a and the device outlet 82b through the device upstream passage 85 and the device downstream passage 86.

In the present embodiment, the cooling system includes a motor cooling system and a device cooling system. The motor cooling system is a system as a motor cooler that cools coolant flowing through the motor case 45. The device cooling system is a system that cools coolant flowing through the device cooler 80. The motor cooling system and the device cooling system are independent systems from each other. Each of the motor cooling system and the device cooling system independently includes the coolant, the heat radiation part, the driving part, and the circulation passage, without commonly sharing between the motor cooling system and device cooling system. Therefore, it is not necessary to commonalize the type of coolant, the heat radiation method of the heat radiation part, the type of the driving part, and the like between the motor cooling system and the device cooling system. Therefore, the degree of freedom in designing each of the motor cooling system and the device cooling system can be enhanced.

Note that, in the cooling system, at least one of the coolant, the heat radiation part, the driving part, and the circulation passage may be commonly shared between the motor cooling system and the device cooling system. For example, a singular heat sink may cool both coolant in the motor cooling system and coolant in the device cooling system. In addition, the coolant, the heat radiation part, the driving part, and the circulation passage may be all commonly shared between the motor cooling system and the device cooling system. In this configuration, for example, in the circulation passage, the motor passage 51 and the device passage 81 are connected in series, such that one of the motor passage 51 and the device passage 81 is arranged on the upstream side of the other.

According to the present embodiment described, the device case 70 of the power converter 13 is provided at the position spaced apart from the outer top portion 47a of the motor 12 in the circumferential direction CD. Therefore, even if heat accumulates in the vicinity of the outer top portion 47a inside the motor 12, this heat is less likely to be imparted to the device case 70.

For example, as shown in FIG. 2, in the motor case 45, it is conceivable that heat generated as the motor 12 is driven accumulates in the internal space 45a. In the internal space 45a, a region in which a particularly large amount of heat is accumulated is referred to as a heat spot Hp1. This heat reservoir Hp1 is likely to arise in an upper region close to the inner top portion 46a of the motor case 45. When the heat spot Hp1 arises, it is concerned that the inner circumferential surface 46 of the motor case 45 is at a particularly high temperature near the inner top portion 46a. Thus, the outer circumferential surface 47 is at a high temperature, in particular, near the outer top portion 47a. For example, dissimilarly to the present embodiment, in a configuration in which the power converter 13 is provided at a position overlapping the outer top portion 47a in the circumferential direction CD, there is concern that the heat of the heat reservoir Hp1 may be transferred to the power converter 13 via the outer top portion 47a.

To the contrary, according to the present embodiment, the power converter 13 is distant from the outer top portion 47a in the circumferential direction CD. Therefore, even if the temperature of the outer top portion 47a of the outer circumferential surface 47 of the motor case 45 rises due to the heat of the heat reservoir Hp1, the temperature of the power converter 13 less likely rises as the temperature of the outer top portion 47a rises.

According to the present embodiment, in the power converter 13, the first end 83a that is the upper end of the device cooling passage 82 is provided at the upper space 75a of the device case 70. This configuration enables to apply the cooling effect of the device cooling passage 82 to both the power module 61 and the upper space 75a of the device case 70. Therefore, the device cooling passage 82 enables to prevent heat from accumulating in the upper space 75a of the device case 70 from the inside of the device case 70.

For example, as shown in FIG. 2, in the device case 70, it is conceivable that heat generated by driving the power module 61 accumulates in the internal space 75. In the internal space 75, a region in which a particularly large amount of heat is accumulated is referred to as a heat reservoir Hp2. This heat pool Hp2 is likely to occur in the upper space 75a of the device case 70. The heat pool Hp2 tends to extend, for example, along the inclined portion 74, which is the upper end portion 70a of the device case 70. If the heat pool Hp2 occurs in the upper space 75a, there is concern that the temperature of the power module 61 and the control board 62 would likely rise.

To the contrary, according to the present embodiment, the first end 83a of the device cooling passage 82 is arranged in the upper space 75a. In this configuration, the first end 83a of the device cooling passage 82 is arranged in the upper space 75a in the device case 70 where heat accumulation Hp2 is likely to occur. Therefore, the cooling effect of the device cooling passage 82 enables to suppress the occurrence of heat accumulation Hp2 in the internal space 75 of the device case 70. Even if the heat pool Hp2 occurs, the cooling effect of the device cooling passage 82 enables to reduce the temperature of the heat pool Hp2. Therefore, the cooling effect of the power converter 13 can be enhanced.

According to the present embodiment, the entirety of the device cooling passage 82 is provided at the upper position. In this configuration, the portion of the device cooling passage 82 that is in the upper space 75a is made as large as possible. Therefore, the cooling effect of the device cooling passage 82 for the upper space 75*a* can be enhanced.

According to the present embodiment, in the power converter 13, the device inlet 82*a* and the device outlet 82*b* of the device cooling passage 82 are arranged in the axial direction AD. In this configuration, the coolant easily flows in the axial direction AD through the device cooling passage 82. Therefore, the coolant flowing in the axial direction AD through the first end 83*a* likely continues cooling the upper space 75*a* until the coolant flows out from the device outlet 82*b*. Therefore, the coolant flowing through the first end 83*a* in the axial direction AD less likely cools the upper space 75*a* after cooling the power module 61 and less likely cools the power module 61 after cooling the upper space 75*a*. For example, it is less likely to occur that the coolant that has received a large amount of heat from the power module 61 exerts insufficient cooling effect on the upper space 75*a*. Moreover, it is less likely to occur that the coolant that has received a large amount of heat from the upper space 75*a* exerts insufficient cooling effect on the power module 61. Therefore, this configuration enables to prevent one of the cooling effect of the coolant exerted on the upper space 75*a* and the cooling effect of the coolant exerted on the power module 61 from becoming insufficient.

According to the present embodiment, in the device cooling passage 82, the first end 83*a* and the second end 83*b* extending in the axial direction AD are longer than the side ends 83*c* and 83*d* extending in the circumferential direction CD. In this configuration, the first end 83*a* is long as much as possible in the axial direction AD. Therefore, the cooling effect from the first end 83*a* can be exerted over a wide range in the axial direction AD in the upper space 75*a*. In this way, the cooling effect of the upper space 75*a* by the first end 83*a* of the device cooling passage 82 can be enhanced.

According to the present embodiment, the first end 83*a* of the device cooling passage 82 extends toward the outer top portion 47*a* of the motor case 45 beyond the power module 61 in the circumferential direction CD. That is, the device cooling passage 82 includes the first extending portion 84*a*. In this configuration, the first extending portion 84*a* is enabled to exert a cooling effect on the upper space 75*a* on both the outer side and the inner side in the radial direction RD. Therefore, the cooling effect of the device cooling passage 82 given to the upper space 75*a* can be enhanced. To the contrary, dissimilarly to the present embodiment, in a configuration in which, for example, the first end 83*a* of the device cooling passage 82 does not extend beyond the power module 61, there is a concern that the cooling effect exerted on the upper space 75*a* may be extremely low on the radially inside of the first end 83*a*.

According to the present embodiment, in the device cooling passage 82, the first side end 83*c*, which is one end in the axial direction AD, is provided with the device inlet 82*a*, and the second side end 83*d*, which is the other end portion, is provided with the device outlet 82*b*. In this configuration, in the device cooling passage 82, the device inlet 82*a* and the device outlet 82*b* are distant from each other as much as possible in the axial direction AD. Therefore, the range, in which the coolant flows in the first end 83*a* in the axial direction AD, can be made as long as possible in the axial direction AD. In other words, the range, in which the coolant flow is disturbed in the device cooling passage 82, can be minimized as much as possible in the axial direction AD. Therefore, shortage of one of the cooling effect of the coolant exerted on the upper space 75*a* and the cooling effect of the coolant exerted on the power module 61 can be suppressed more reliably.

As shown in FIG. 2, in the internal space 75 of the device case 70, the lower side of the inclined portion 74 in the upper space 75*a*, which is the upper end portion 70*a*, is a region where heat accumulation Hp2 is particularly likely to occur. On the other hand, in the imaginary case 70X, which is different from the present embodiment, in a case where a heat pool occurs below the upper end portion similarly to the device case 70, the heat pool resides at a higher position than the device case 70 due to the absence of the inclined portion 74. Therefore, in the imaginary case 70X, there is concern that the device cooling passage 82 may not reach the heat pool.

To the contrary, according to the present embodiment, the first end 83*a* of the device cooling passage 82 is provided below the inclined portion 74 that is the upper end portion 70*a* of the device case 70. In this configuration, the area in the upper space 75*a* of the device case 70, where the heat accumulation Hp2 is particularly likely to occur, is located at a lower position due to the presence of the inclined portion 74. Therefore, the first end 83*a* of the device cooling passage 82 easily reaches the area where the heat accumulation Hp2 is likely to occur. Therefore, the device cooling passage 82 enables to restrict the generation of the heat pool Hp2 from arising below the inclined portion 74. Even if the heat pool Hp2 occurs below the inclined portion 74, the cooling effect of the device cooling passage 82 enables to reduce the temperature of the heat pool Hp2.

According to the present embodiment, the first end 83*a* of the device cooling passage 82 is at a position, which is in the lower position of the inclined portion 74 and aligned with the inclined portion 74 side by side in both the radial direction RD and the circumferential direction CD in particular. With this configuration, the first end 83*a* of the device cooling passage 82 can be arranged at a position as close as possible to the inclined portion 74 in the Y direction. As a result, the first end 83*a* of the device cooling passage 82 is enabled to reliably reach the region in the device case 70 where the heat accumulation Hp2 is likely to occur.

As shown in FIG. 3, voids V may occur in the device passage 81. The voids V are bubbles of air or the like generated in the coolant as the temperature of the coolant rises, and are particularly likely to occur in the device cooling passage 82 where heat exchange with the coolant is performed. The void V has a lower thermal conductivity than the coolant. Therefore, for example, if the voids V exist between the coolant and the power modules 61, there is a concern that a heat transfer coefficient and a heat exchange efficiency between the coolant and the power modules 61 may decrease. That is, there is concern that the cooling effect of the coolant on the power module 61 may be lowered due to the voids V.

To the contrary, according to the present embodiment, the device cooling passage 82 extends along the upper surface 61*a* of the power module 61. That is, the power module 61 is located below the device cooling passage 82. In this configuration, even if the voids V occur in the device cooling passage 82, the voids V tend to move upward away from the power module 61 due to buoyancy. Therefore, the voids V hardly reside between the coolant and the power module 61. In the device cooling passage 82, this configuration enables to prevent the cooling effect of the coolant on the power module 61 from decreasing due to the voids V.

In the power converter 13 of the present embodiment, the heat-generating component, the low heat-resistant component, and the specific component are mounted as the second mounted component 63*b* on the control board 62 together with the first mounted component 63*a*. Therefore, when the temperature of the internal space 75 in the device case 70 rises, in the control board 62, abnormality is more likely to occur in the second mounted component 63b than in the first mounted component 63a. In particular, in the internal space 75 of the device case 70, heat tends to move upward toward the upper end portion 70a. Therefore, the closer the installation position of the second mounted component 63b is to the upper end portion 70a, the more abnormality is likely to occur in the second mounted component 63b.

To the contrary, according to the present embodiment, the second mounted component 63b is provided at a position lower than the first mounted component 63a in the internal space 75 of the device case 70. With this configuration, in the internal space 75 of the device case 70, the second mounted component 63b can be separated as much as possible from the area where the heat accumulation Hp2 is likely to occur. Therefore, this configuration enables to suppress occurrence of abnormality in the second mounted component 63b.

Further, when the heat pool Hp2 is generated inside the device case 70, the first mounted component 63a is more likely to receive heat from the heat pool Hp2 than the second mounted component 63b. In this case, even though the first mounted component 63a is less likely to cause abnormality by heat than the second mounted component 63b, there is concern that the first mounted component 63a may cause abnormality due to the heat from the heat reservoir Hp2. To the contrary, according to the present embodiment, the device cooling passage 82 suppresses occurrence of heat accumulation Hp2 in the device case 70. Therefore, this configuration enables to suppress the occurrence of an abnormality in the first mounted component 63a.

According to the present embodiment, the power converter 13 is provided on the outer circumferential surface 47 of the motor case 45 at a position overlapping with the motor cooling passage 52 in the radial direction RD. Therefore, the cooling effect of the coolant flowing through the motor cooling passage 52 can be exerted from the motor case 45 to the power converter 13. Moreover, the power converter 13 is provided at a position closer to the motor inlet 52a than to the motor outlet 52b. In this configuration, among the coolant flowing through the motor cooling passage 52, the coolant having a high cooling effect before receiving heat from the stator 41 and the rotor 42 is enabled to exert a cooling effect on the power converter 13. Therefore, the cooling effect exerted on the power converter 13 from the motor cooling passage 52 can be enhanced.

According to the present embodiment, the power converter 13 is provided on the upper side surface 47b of the motor case 45. Therefore, when a worker performs work on the power converter 13 from above the power converter 13 during manufacturing or maintenance of the vehicle, the work can be easily performed. Moreover, the power converter 13 does not protrude beyond the outer top portion 47a of the motor case 45. Therefore, in a vehicle in which the power converter 13 and the motor 12 are mounted as the motor unit 100, this configuration enables to realize a configuration in which the power converter 13 is less likely to come into contact with a vehicle body such as the hood. Therefore, the vehicle body and the power converter 13 can be properly protected.

According to the present embodiment, in the power converter 13, the control board 62 is provided between the power module 61 and the floor portion 72. That is, in the motor unit 100, the control board 62 is provided between the motor cooling passage 52 and the device cooling passage 82 in the radial direction RD. With this configuration, the motor cooling passage 52 is enabled to easily exert the cooling effect on the radially inner portion of the control board 62. On the other hand, the device cooling passage 82 tends to provide the cooling effect to the radially outer portion of the control board 62. In this way, the cooling effect of the coolant is exerted on both the radially inner portion and the radially outer portion of the control board 62. Therefore, the cooling effect to the control board 62 can be enhanced.

For example, dissimilarly the present embodiment, a configuration in which the control board 62 is provided between the power module 61 and the ceiling portion 71 in the power converter 13 is assumed. In this configuration, in the motor unit 100, the control board 62 is provided on the opposite side of the device cooling passage 82 from the motor cooling passage 52 in the radial direction RD. Therefore, both the cooling effect of the motor cooling passage 52 and the cooling effect of the device cooling passage 82 are likely to be exerted on the radially inner portion of the control board 62. In other words, both the cooling effect of the motor cooling passage 52 and the cooling effect of the device cooling passage 82 are less likely to be exerted on the radially outer portion of the control board 62. Therefore, there is concern that the cooling effect to the control board 62 would be reduced.

Second Embodiment

In the first embodiment described above, the device inlet 82a and the device outlet 82b are arranged side by side in the axial direction AD in the device cooling passage 82. To the contrary, in the second embodiment, the device inlet 82a is provided at a position lower than the device outlet 82b in the device cooling passage 82. Configurations, operations, and effects not specifically described in the second embodiment are the same as those in the first embodiment. In the second embodiment, differences from the first embodiment will be mainly described.

First, with reference to FIGS. 6 and 7, the configuration of the power converter 13 will be described with respect to the α direction, β drection, and γ direction for the power converter 13.

Figure 6:
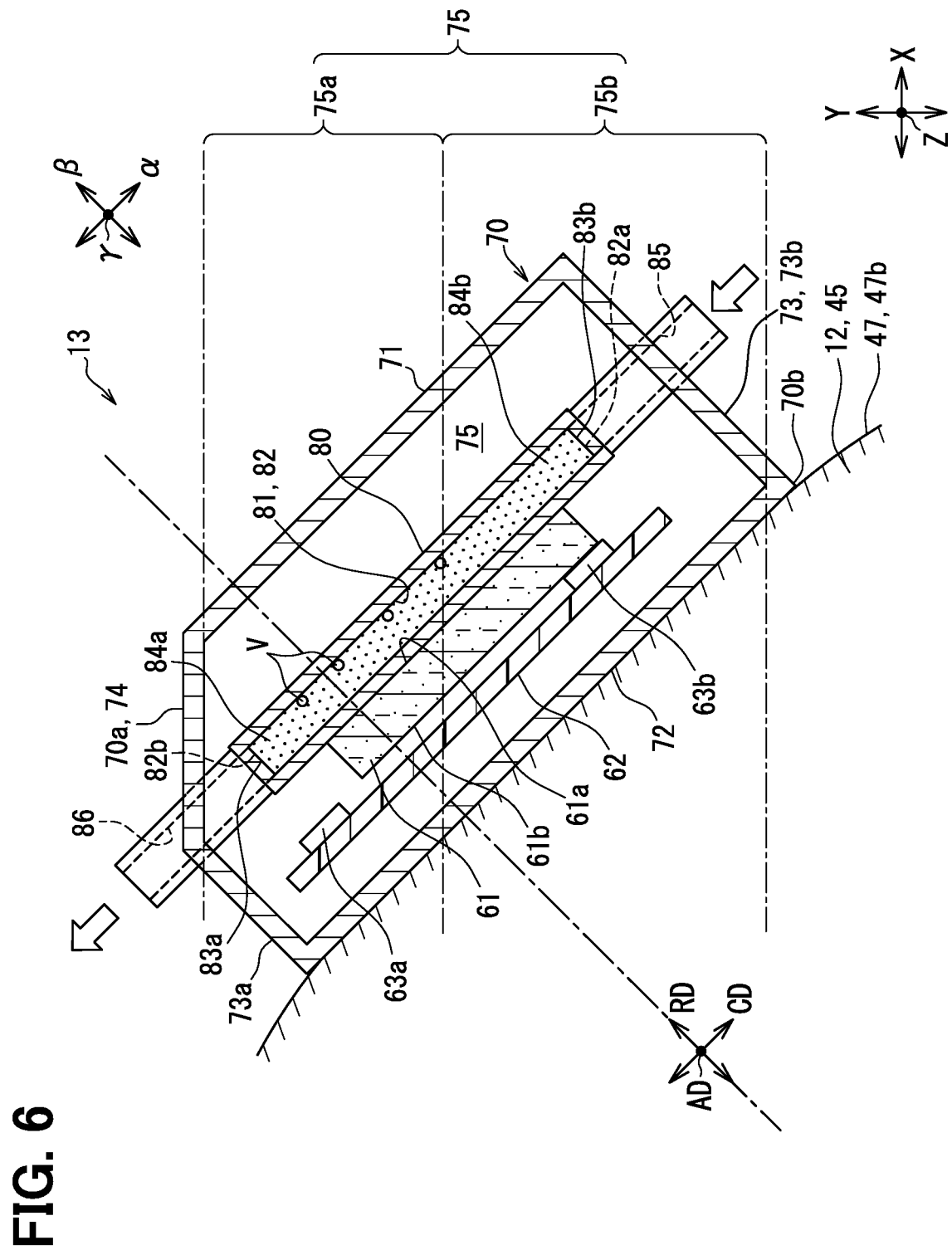
FIG. 6 is a vertical cross-sectional view showing the power converter according to a second embodiment.
Figure 7:
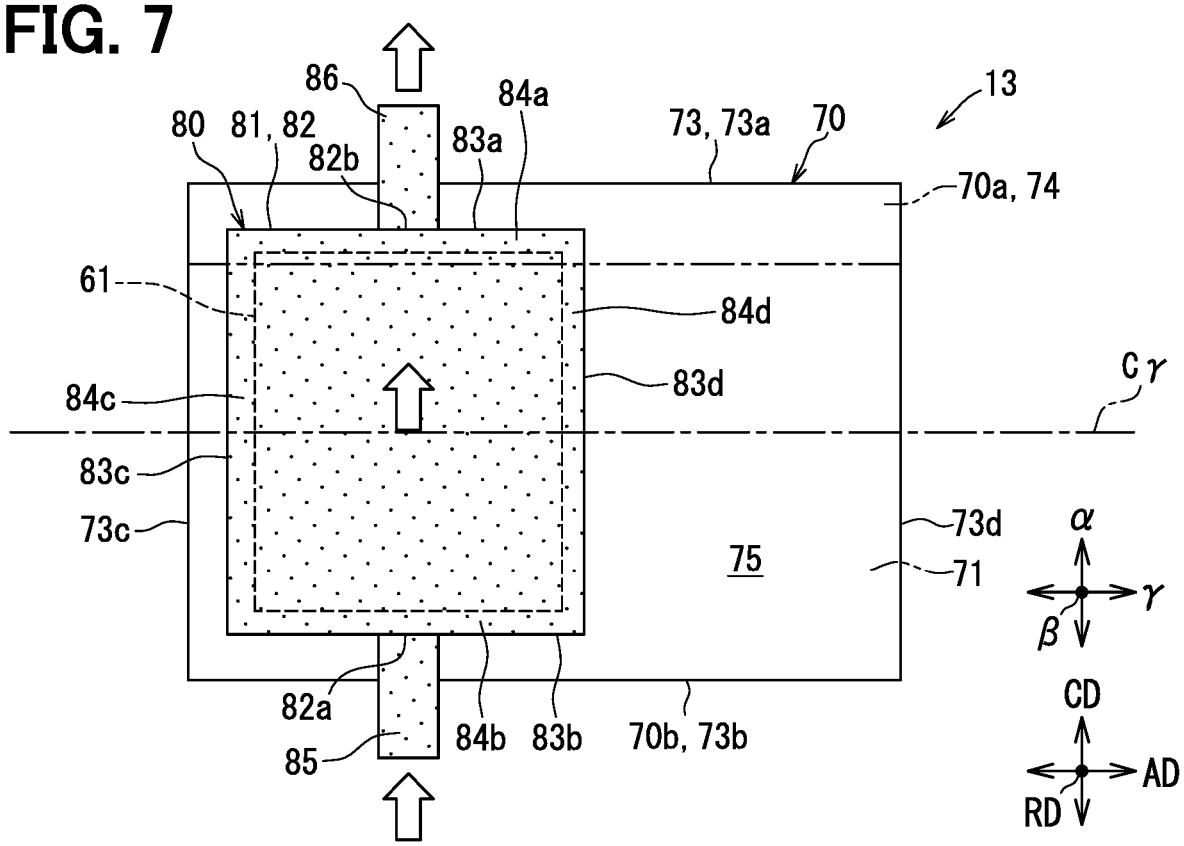
FIG. 7 is a diagram showing an internal structure of the power converter.

As shown in FIGS. 6 and 7, the power module 61 has a vertically elongated shape extending in the α direction. In the power module 61, the length dimension in the α direction is larger than the length dimension in the γ direction. In the power module 61, the long side extends in the α direction, and the short side extends in the γ direction. The power module 61 is located substantially at a center position between the first wall portion 73a and the second wall portion 73b of the device case 70 in the α direction. The power module 61 is positioned closer to the first side wall portion 73c than the second side wall portion 73d of the device case 70 in the γ direction.

In the power converter 13, the device inlet 82a is provided at the second end 83b of the device cooling passage 82. The device outlet 82b is provided at the first end 83a of the device cooling passage 82. The device inlet 82a and the device outlet 82b are arranged in the α direction and are opposed to each other. The device cooling passage 82 opens at the device inlet 82a and the device outlet 82b in directions opposite to each other in the α direction.

In the device cooling passage 82, as long as at least a part of the device inlet 82a is formed in the second end 83b, the device inlet 82a is supposed to be provided at the second end 83b. The similar is applied to the device outlet 82b. As long as at least a part of the device outlet 82b is formed in the first end 83a, the device outlet 82b is supposed to be provided at the first end 83a. In the second embodiment, the entirety of the device inlet 82a is formed in the second end 83b, and the entirety of the device outlet 82b is formed in the first end 83a.

In the device cooling passage 82, the coolant that has flowed from the device upstream passage 85 through the device inlet 82a flows upward in the α direction and flows out to the device downstream passage 86 through the device outlet 82b. This coolant flows in the device cooling passage 82 along the side ends 83c and 83d in the α direction. The device upstream passage 85 extends in the α direction from the device inlet 82a toward the device outlet 82b on the opposite side in the α direction. The device downstream passage 86 extends in the γ direction from the device inlet 82a toward the device outlet 82b on the opposite side in the γ direction. The device upstream passage 85 and the device downstream passage 86 are provided vertically side by side through the device cooling passage 82 interposed therebetween in the α direction.

The device cooling passage 82 has a vertically elongated shape and extending in the α direction. In the device cooling passage 82, the length dimensions of the first end 83a and the second end 83b are larger than the length dimensions of the side ends 83c and 83d. The side ends 83c and 83d are long sides longer than the first end 83a and the second end 83b. The first end 83a and the second end 83b are short sides.

The device cooling passage 82 is provided at a position closer to the first side wall portion 73c than the second side wall portion 73d of the device case 70 in the γ direction. The device inlet 82a and the device outlet 82b are provided at substantially center positions between the first side end 83c and the second side end 83d of the device cooling passage 82 in the γ direction. The device inlet 82a and the device outlet 82b are positioned closer to the first side wall portion 73c than to the second side wall portion 73d of the device case 70 in the γ direction. As long as the device cooling passage 82, the device inlet 82a, and the device outlet 82b are between the first side wall portion 73c and the second side wall portion 73d, the device cooling passage 82, the device inlet 82a, and the device outlet 82b need not be located at the positions closer to the first side wall portion 73c than to the second side wall portion 73d.

The device cooling passage 82 is provided at a substantially center position between the first wall portion 73a and the second wall portion 73b of the device case 70 in the α direction. In the device cooling passage 82, the device inlet 82a is located between the device horizontal line Cγ and second wall portion 73b of the device case 70 and is at a position closer to second wall portion 73b than the device horizontal line Cγ. The device outlet 82b is located between the device horizontal line Cγ and the first wall portion 73a of the device case 70 and is at a position closer to the first wall portion 73a than the device horizontal line Cγ.

In the device cooling passage 82, the device inlet 82a is provided at the second extending portion 84b, and the device outlet 82b is provided at the first extending portion 84a.

Next, the configuration of the power converter 13 will be described with reference to the X direction, the Y direction, the Z direction, the axial direction AD, the circumferential direction CD, and the radial direction RD for the motor 12.

For the power module 61, the length dimension in the circumferential direction CD is larger than the length dimension in the axial direction AD. The power module 61 is located substantially at a center position between the upper end portion 70a and the lower end portion 70b of the device case 70 in the Y direction. The device cooling passage 82 is located closer to the upper end portion 70a than to the lower end portion 70b in the device case 70. The first end 83a of the device cooling passage 82 is provided at the upper space 75a of the device case 70. The first end 83a is located closer to the upper end portion 70a of the device case 70 than the boundary portion 75c in the Y direction. The second end 83b of the device cooling passage 82 is provided at the lower space 75b of the device case 70. The second end 83b is located closer to the lower end portion 70b of the device case 70 than the boundary portion 75c in the Y direction.

The device outlet 82b is provided at the first end 83a, which is the upper end of the device cooling passage 82. Thus, in the device case 70, the device outlet 82b is below the inclined portion 74, which is the upper end portion 70a. The device outlet 82b and the inclined portion 74 are arranged at positions aligned side by side in the Y direction. The device downstream passage 86 extends from the device outlet 82b toward the outer top portion 47a of the motor 12 in the circumferential direction CD. The device inlet 82a is provided at the second end 83b that is the lower end of the device cooling passage 82. A portion of the device cooler 80 that forms the device downstream passage 86 protrudes through the inclined portion 74 and the first wall portion 73a of the device case 70 to the outside of the case. A portion forming the device upstream passage 85 protrudes through the second wall portion 73b of the device case 70 to the outside of the case.

In the device cooling passage 82, the length dimension in the circumferential direction CD is larger than the length dimension in the axial direction AD. In the device cooling passage 82, the device inlet 82a and the device outlet 82b are arranged in the circumferential direction CD. The device inlet 82a is located at a lower position than the device outlet 82b in the Y direction. Therefore, in the device cooling passage 82, the coolant flowing in from the device inlet 82a flows upward in the circumferential direction CD and flows out from the device outlet 82b. Both the device inlet 82a and the device outlet 82b are open in the circumferential direction CD. Therefore, in the device cooling passage 82, the coolant flowing in from the device inlet 82a easily flows upward in the circumferential direction CD. In a portion where the motor case 45 and the device case 70 overlap in the radial direction RD, coolant, which flows upward in the device cooling passage 82 in the circumferential direction CD, and coolant, which flows downward in the motor cooling passage 52 in the circumferential direction CD, flow in opposite directions.

According to the second embodiment, the device case 70 of the power converter 13 is provided at the position spaced apart from the outer top portion 47a of the motor 12 in the circumferential direction CD. Therefore, the same effects as those of the first embodiment can be produced.

According to the second embodiment, in the device cooling passage 82 of the power converter 13, the coolant flowing in from the device inlet 82a flows upward and flows out from the device outlet 82b. Therefore, even if the voids V occur in the device cooling passage 82 as shown in FIG. 6, the voids V, which are air bubbles, tend to move upward. Therefore, the voids V easily move upward together with the coolant and flow out from the device outlet 82b. In this way, the voids V hardly remain in the device cooling passage 82. Therefore, this configuration enables to prevent the cooling effect of the coolant from lowering due to the voids V in the device cooling passage 82. Thus, the cooling effect of the power converter 13 can be enhanced similarly to the first embodiment.

Assuming if the voids V remain in the device cooling passage 82, it is conceivable that the coolant in the device cooling passage 82 may decrease by the amount of the voids V that have accumulated. In this case, there is a concern that the cooling effect produced by the coolant flowing through the device cooling passage 82 would be reduced.

According to the second embodiment, in the power converter 13, the device inlet 82*a* and the device outlet 82*b* of the device cooling passage 82 are arranged in the circumferential direction CD. In this configuration, the coolant is enabled to easily flow upward in the device cooling passage 82 along the circumferential direction CD. Therefore, even if the voids V are generated in the device cooling passage 82, the voids V tend to flow upward in the circumferential direction CD together with the coolant. Thus, the voids V generated in the device cooling passage 82 can be promoted to flow out from the device outlet 82*b* together with the coolant.

According to the second embodiment, in the device cooling passage 82, the length dimension in the circumferential direction CD is larger than the length dimension in the axial direction AD. In this configuration, the device inlet 82*a* and the device outlet 82*b* can be separated as much as possible in the circumferential direction CD. Therefore, even if disturbance occurs in the flow of the coolant when flowing into the device cooling passage 82 from the device inlet 82*a*, the turbulence in the flow of the coolant tends to be reduced, while the coolant flows a sufficiently long distance in the circumferential direction CD to reach the device outlet 82*b*. Therefore, in the device cooling passage 82, it is possible to avoid a state in which the voids V hardly flow out from the device outlet 82*b* due to the turbulence of the coolant flow. That is, this configuration enables to prevent the voids V from staying in the device cooling passage 82 due to the turbulence of the coolant flow.

In the device cooling passage 82, it is conceivable that the flow of the coolant is disturbed around the device outlet 82*b* through which the coolant flows out. In this case, in the vicinity of the device outlet 82*b*, the flow of the voids V is disturbed, as the flow of the coolant is disturbed. Therefore, there is a concern that the voids V may remain.

To the contrary, according to the second embodiment, the first extending portion 84*a* of the device cooling passage 82 is provided with the device outlet 82*b*. In the device cooling passage 82, even if the voids V stay in the region around the device outlet 82*b* due to the turbulence of the coolant flow, the voids V tend to stay in the first extending portion 84*a*. In this way, even if the voids V stay around the device outlet 82*b* of the first extending portion 84*a*, which does not overlap with the power module 61 in the radial direction RD, this configuration enables to prevent the cooling effect of the coolant on the power module 61 from lowering due to the voids V. Moreover, the first extending portion 84*a* provided with the device outlet 82*b* enables to exert the cooling effect to the upper space 75*a* on both the outer side and the inner side in the radial direction RD.

According to the second embodiment, the device inlet 82*a* is provided at the second end 83*b*, which is the lower end of the device cooling passage 82. In addition, the device outlet 82*b* is provided to the first end 83*a*, which is the upper end of the device cooling passage 82. In this configuration, in the device cooling passage 82, the device inlet 82*a* and the device outlet 82*b* can be arranged at positions farthest from each other in the circumferential direction CD. Therefore, even if the flow of the coolant is disturbed when flowing into the device cooling passage 82 from the device inlet 82*a*, the coolant flows the longest distance in the circumferential direction CD until the coolant reaches the device outlet 82*b*. Thus, turbulence in the flow of coolant can be reduced more reliably.

According to the second embodiment, the first end 83*a* of the device cooling passage 82 is located on the lower side of the inclined portion 74 that is the upper end portion 70*a* of the device case 70. Therefore, the same effects as those of the first embodiment can be produced. Moreover, in the second embodiment, the device downstream passage 86 extends from the device outlet 82*b* at the first end 83*a*. Therefore, in the internal space 75 of the device case 70, the cooling effect is exhibited by the device downstream passage 86 in addition to the device cooling passage 82 at the position below the inclined portion 74. Thus, the occurrence of the heat accumulation Hp2 in the device case 70 can be suppressed not only by the device cooling passage 82 but also by the device downstream passage 86.

According to the embodiment, the first end 83*a* of the device cooling passage 82 is at the position, which is at the lower position of the inclined portion 74, and aligned with the inclined portion 74 side by side in both the radial direction RD and the circumferential direction CD in particular. Therefore, the same effects as those of the first embodiment can be produced. Moreover, in the second embodiment, in addition to the first end 83*a*, at least a portion of the device downstream passage 86 is positioned side by side with the inclined portion 74 in both the radial direction RD and the circumferential direction CD. Therefore, the cooling effect of the device downstream passage 86 enables to more reliably suppress the occurrence of the heat accumulation Hp2 in the device case 70.

According to the second embodiment, the device cooling passage 82 extends along the upper surface 61*a* of the power module 61. Therefore, the same effects as those of the first embodiment can be produced. Moreover, in the second embodiment, in the device cooling passage 82, the coolant flowing in from the device inlet 82*a* flows upward toward the device outlet 82*b*. Therefore, even when the voids V pass through a position of the device cooling passage 82 close to the power module 61, the voids V are less likely to stay at a position close to the power module 61. Therefore, in the device cooling passage 82, this configuration enables to more reliably prevent the cooling effect of the coolant on the power module 61 from decreasing due to the voids V.

According to the second embodiment, in the internal space 75 of the device case 70, the second mounted component 63*b* is positioned lower than the first mounted component 63*a*. Therefore, the same effects as those of the first embodiment can be produced. In addition, in the second embodiment, the device inlet 82*a* is provided at a position lower than the device outlet 82*b* in the device cooling passage 82. Therefore, in the device cooling passage 82, not the coolant flowing out from the device outlet 82*b*, which has decreased in cooling capacity, but the coolant with high cooling capacity flowing in from the device inlet 82*a* tends to exert a cooling effect to the second mounted component 63*b*. Therefore, this configuration enables to more reliably suppress occurrence of an abnormality in the second mounted component 63*b* due to heat.

According to the second embodiment, the power converter 13 is provided on the outer circumferential surface 47 of the motor case 45 at a position overlapping with the motor cooling passage 52 in the radial direction RD. Therefore, the same effects as those of the first embodiment can be produced. Moreover, in the second embodiment, the coolant flows upward in the device cooling passage 82, thereby suppressing the deterioration of the cooling effect of the coolant due to the voids V. Therefore, this configuration enables to prevent the cooling effect exerted from the coolant flowing through the motor cooling passage 52 on the coolant flowing through the device cooling passage 82 from decreasing due to the voids V in the device cooling passage 82.

According to the present embodiment, the power converter 13 is provided on the upper side surface 47b of the motor case 45. Therefore, the same effects as those of the first embodiment can be produced. In the second embodiment, the device inlet 82a is positioned lower than the device outlet 82b in the device cooling passage 82. For this reason, for example, maintenance work for an external piping leading to the device inlet 82a may be more difficult than an external piping leading to the device outlet 82b. In this respect, the power converter 13 is provided on the upper side surface 47b of the motor case 45. Therefore, this configuration enables to lower difficulty of the work for the external piping leading to the device inlet 82a.

Third Embodiment

In the second embodiment, the device inlet 82a is provided at a position lower than the device outlet 82b in the device cooling passage 82. To the contrary, in the third embodiment, the vertical relationship between the device inlet 82a and the device outlet 82b is reversed from that in the second embodiment. That is, in the third embodiment, the device inlet 82a is provided at a position higher than the device outlet 82b. The configurations, operations, and effects which are not particularly described in the third embodiment are the same as those in the first and second embodiments. In the third embodiment, differences from the first and second embodiments will be mainly described.

First, with reference to FIGS. 8 and 9, the configuration of the power converter 13 will be described with respect to the α direction, β drection, and γ direction for the power converter 13.

Figure 8:
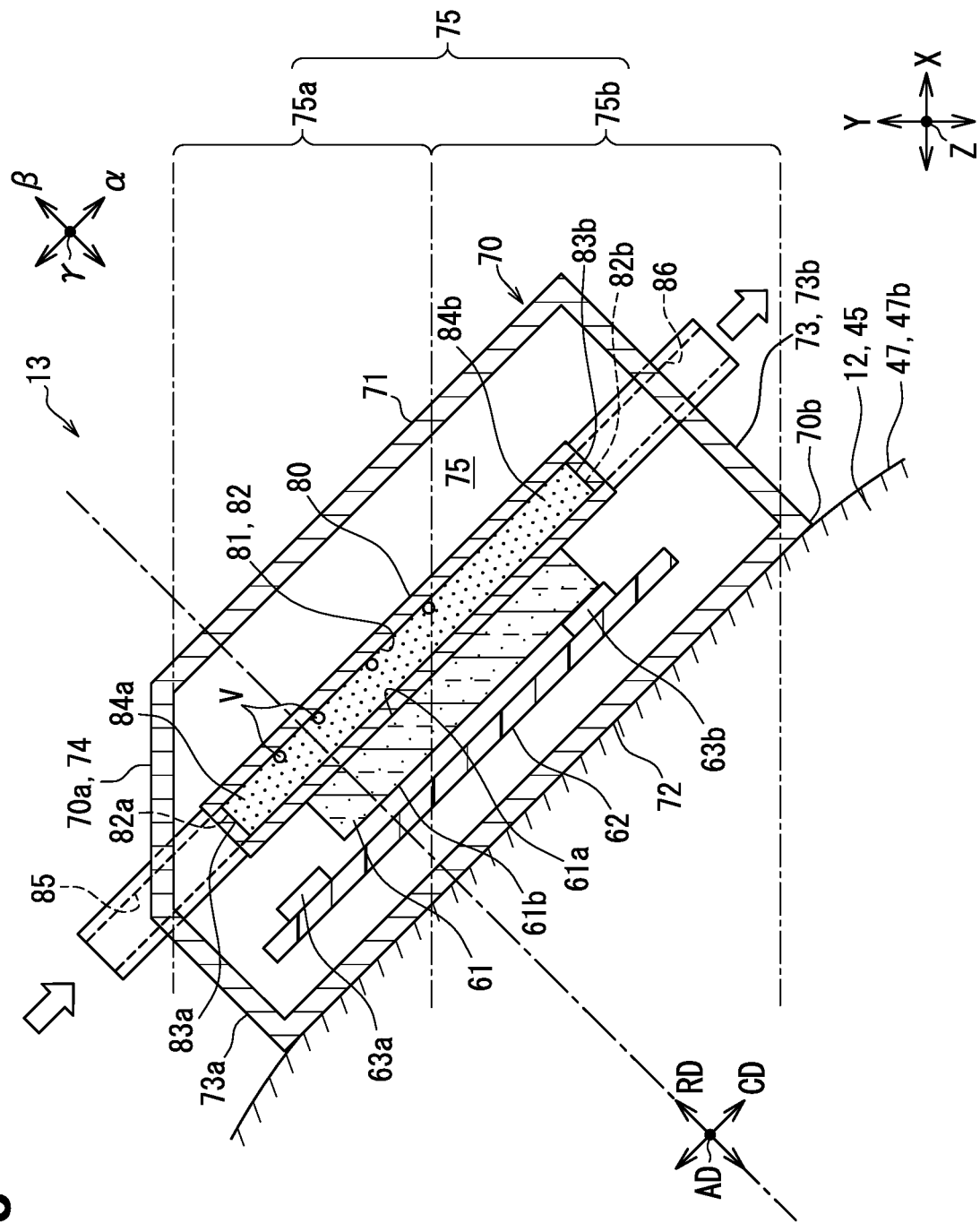
FIG. 8 is a vertical cross-sectional view showing a power converter according to a third embodiment.
Figure 9:
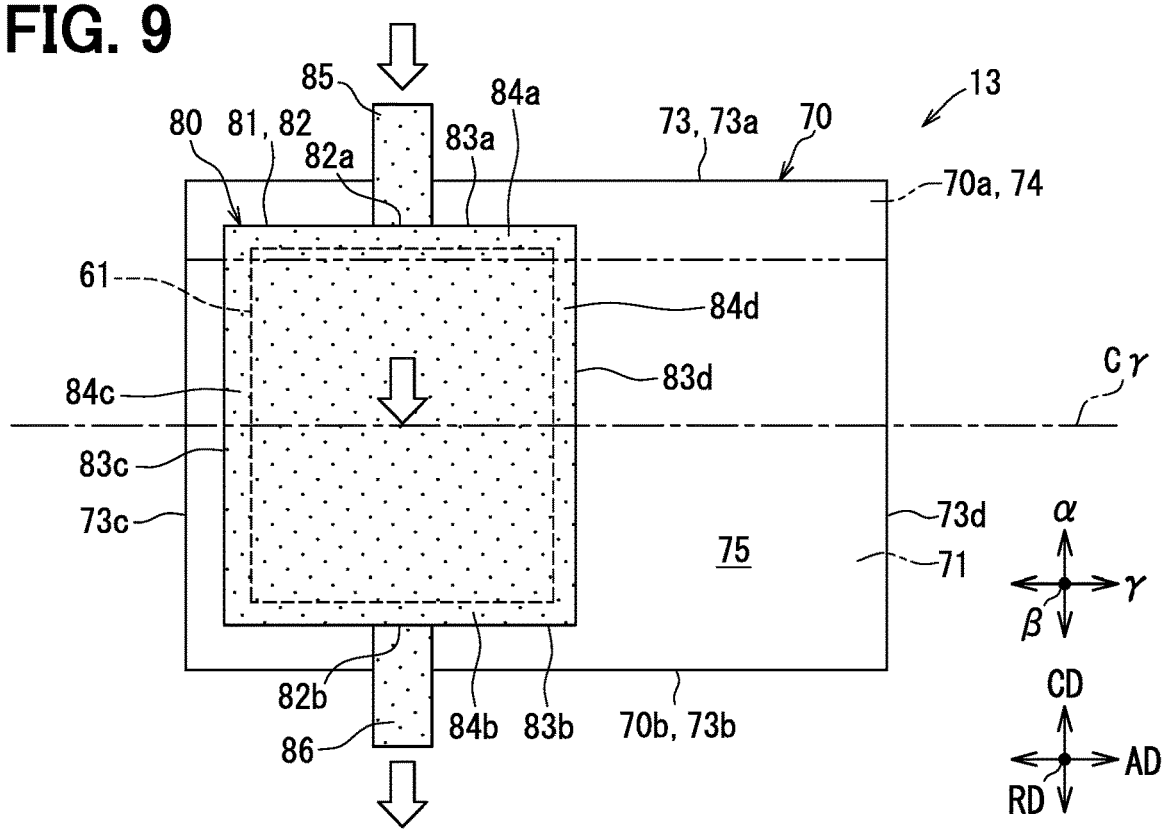
FIG. 9 is a diagram showing an internal structure of the power converter.

As shown in FIGS. 8 and 9, the power module 61 has a configuration similar to that of the second embodiment. For example, the power module 61 has a vertically elongated shape extending in the α direction.

In the third embodiment, the arrangement of the device inlet 82a and the device outlet 82b is opposite to that of the second embodiment in the α direction. The device inlet 82a is provided at the first side end 83a of the device cooling passage 82. Further, the device inlet 82a is provided at the first extending portion 84a. The device outlet 82b is provided at the second end 83b of the device cooling passage 82. Further, the device outlet 82b is provided at the second extending portion 84b. In the third embodiment as well, the device inlet 82a and the device outlet 82b are arranged in the α direction and opposed to each other, and open the device cooling passages 82 in opposite directions in the α direction.

In the device cooling passage 82, as long as at least a part of the device inlet 82a is formed in the first end 83a, the device inlet 82a is supposed to be provided in the first end 83a. The similar is applied to the device outlet 82b. As long as at least a part of the device outlet 82b is formed in the second end 83b, the device outlet 82b is supposed to be provided at the second end 83b. In the third embodiment, the entirety of the device inlet 82a is formed in the first end 83a, and the entirety of the device outlet 82b is formed in the second end 83b.

In the third embodiment, the arrangement of the device upstream passage 85 and the device downstream passage 86 is opposite to that of the second embodiment in the α direction. In this configuration, as well, the device upstream passage 85 and the device downstream passage 86 are provided vertically side by side through the device cooling passage 82 interposed therebetween in the α direction.

Next, the configuration of the power converter 13 will be described with reference to the X direction, the Y direction, the Z direction, the axial direction AD, the circumferential direction CD, and the radial direction RD for the motor 12.

In the third embodiment, dissimilarly to the second embodiment, the device inlet 82a is positioned higher than the device outlet 82b in the Y direction. Therefore, in the device cooling passage 82, the coolant flowing in from the device inlet 82a flows downward in the circumferential direction CD and flows out from the device outlet 82b. In the third embodiment, both the device inlet 82a and the device outlet 82b are open in the circumferential direction CD, similarly to the second embodiment. Further, the device inlet 82a and the device outlet 82b are arranged in the circumferential direction CD. Therefore, in the device cooling passage 82, the coolant flowing in from the device inlet 82a easily flows downward in the circumferential direction CD. In a portion where the motor case 45 and the device case 70 overlap in the radial direction RD, coolant, which flows downward in the device cooling passage 82 in the circumferential direction CD, and coolant, which flows downward in the motor cooling passage 52 in the circumferential direction CD, flow in same direction.

The device inlet 82a is provided at the first end 83a that is the upper end of the device cooling passage 82. Thus, in the device case 70, the device outlet 82b is below the inclined portion 74, which is the upper end portion 70a. The device inlet 82a and the inclined portion 74 are arranged at positions aligned side by side in the Y direction. The device upstream passage 85 extends from the device inlet 82a toward the outer top portion 47a of the motor 12 in the circumferential direction CD. The device outlet 82b is provided at the second end 83b that is the lower end of the device cooling passage 82. A portion of the device cooler 80 that forms the device upstream passage 85 protrudes through the inclined portion 74 and the first wall portion 73a of the device case 70 to the outside of the case. A portion forming the device downstream passage 86 protrudes through the second wall portion 73b of the device case 70 to the outside of the case.

According to the third embodiment, the device case 70 of the power converter 13 is provided at the position spaced apart from the outer top portion 47a of the motor 12 in the circumferential direction CD. Therefore, the same effects as those of the first embodiment can be produced.

According to the third embodiment, in the device cooling passage 82 of the power converter 13, the coolant flowing in from the device inlet 82a flows downward and flows out from the device outlet 82b. This coolant exerts the cooling effect on the power module 61 after flowing into the device cooling passage 82 from the device inlet 82a. Therefore, in the internal space 75 of the device case 70, the air around the device inlet 82a can be cooled in the internal space 75 not by the coolant, which has lowered in the cooling capacity due to cooling the power module 61 but by the coolant which has a high cooling capacity. For this reason, the device inlet 82a is positioned higher than the device outlet 82b. Therefore, this configuration enables to prevent the temperature from rising at the higher position in the internal space 75 of the device case 70. That is, this configuration enables to suppress occurrence of the heat accumulation Hp2 in the internal space 75 of the device case 70 with the coolant having a high cooling capacity. Thus, the cooling effect of the power converter 13 can be enhanced similarly to the first embodiment.

According to the third embodiment, the device inlet 82a and the device outlet 82b of the device cooling passage 82 are arranged in the circumferential direction CD. In this configuration, the coolant is enabled to easily flow downward in the device cooling passage 82 along the circumferential direction CD. Therefore, even when the voids V are generated in the device cooling passage 82, the coolant tends to push the voids V downward toward the device outlet 82b against the buoyancy of the voids V. Therefore, this configuration enables to prevent the voids V from remaining in the device cooling passage 82 and prevent lowering the cooling effect of the coolant with respect to the power module 61 and the internal space 75 due to the voids V.

According to the third embodiment, in the device cooling passage 82, the length dimension in the circumferential direction CD is larger than the length dimension in the axial direction AD. In this configuration, similarly to the second embodiment, this configuration enables to prevent the voids V from remaining in the device cooling passage 82 due to turbulence in the coolant flow. In particular, in the third embodiment, the voids V easily return to the device inlet 82a due to the buoyancy. Therefore, reducing in the turbulence of the coolant flow is effective to promoting the voids V to flow out from the device outlet 82b.

In the device cooling passage 82, it is conceivable that the flow of the coolant is disturbed around the device inlet 82a into which the coolant flows. In this case, in the vicinity of the device inlet 82a, the flow of the voids V is disturbed, as the flow of the coolant is disturbed. Therefore, there is a concern that the voids V may remain.

To the contrary, according to the third embodiment, the first extending portion 84a of the device cooling passage 82 is provided with the device inlet 82a. In the device cooling passage 82, even if the voids V stay in the region around the device inlet 82a due to the turbulence of the coolant flow, the voids V tend to stay in the first extending portion 84a. In this way, even if the voids V stay around the device inlet 82a of the first extending portion 84a, which does not overlap with the power module 61 in the radial direction RD, this configuration enables to prevent the cooling effect of the coolant on the power module 61 from lowering due to the voids V. Moreover, the first extending portion 84a provided with the device inlet 82a enables to exert the cooling effect on the upper space 75a on both the outer side and the inner side in the radial direction RD.

According to the third embodiment, the device inlet 82a is provided at the first end 83a, which is the upper end of the device cooling passage 82, and the device outlet 82b is provided at the second end 83b, which is the lower end of the device cooling passage 82. In this configuration, similarly to the second embodiment, in the device cooling passage 82, the device inlet 82a and the device outlet 82b can be arranged at positions farthest from each other in the circumferential direction CD. Therefore, turbulence in the flow of coolant can be reduced more reliably.

According to the third embodiment, the first end 83a of the device cooling passage 82 is provided on the lower side of the inclined portion 74 of the device case 70. Therefore, the same effects as those of the first embodiment can be produced. Moreover, in the third embodiment, the device upstream passage 85 extends from the device inlet 82a at the first end 83a. Therefore, in the internal space 75 of the device case 70, the cooling effect is exhibited by the device upstream passage 85 in addition to the device cooling passage 82 at the position below the inclined portion 74. Thus, the occurrence of the heat accumulation Hp2 in the device case 70 can be suppressed not only by the device cooling passage 82 but also by the device upstream passage 85.

According to the embodiment, the first end 83a of the device cooling passage 82 is at the position, which is at the lower position of the inclined portion 74, and aligned with the inclined portion 74 side by side in both the radial direction RD and the circumferential direction CD in particular. Therefore, the same effects as those of the first embodiment can be produced. Moreover, in the third embodiment, in addition to the first end 83a, at least a portion of the device upstream passage 85 is positioned side by side with the inclined portion 74 in both the radial direction RD and the circumferential direction CD. Therefore, the cooling effect of the device upstream passage 85 enables to more reliably suppress the occurrence of the heat accumulation Hp2 in the device case 70.

According to the third embodiment, the device cooling passage 82 extends along the upper surface 61a of the power module 61. Therefore, the same effects as those of the first embodiment can be produced. Moreover, in the third embodiment, in the device cooling passage 82, the coolant flowing in from the device inlet 82a flows downward toward the device outlet 82b. Therefore, among the coolant flowing in from the device inlet 82a, the coolant that still has a high cooling capacity flows through the lower position in the device cooling passage 82. This configuration facilitates the cooling effect to be exerted on the power module 61.

According to the third embodiment, in the internal space 75 of the device case 70, the second mounted component 63b is positioned lower than the first mounted component 63a. Therefore, the same effects as those of the first embodiment can be produced. In addition, in the third embodiment, the device inlet 82a is provided at a position higher than the device outlet 82b in the device cooling passage 82. Therefore, even if the heat accumulation Hp2 arises in the device case 70, the coolant with the high cooling capacity flowing in from the device inlet 82a enables to suppress abnormality from occurring in the first mounted component 63a due to the heat from the heat reservoir Hp2.

According to the third embodiment, the power converter 13 is provided on the outer circumferential surface 47 of the motor case 45 at the position overlapping with the motor cooling passage 52 in the radial direction RD. Therefore, the same effects as those of the first embodiment can be produced. Further, in the third embodiment, the device inlet 82a is positioned higher than the device outlet 82b in the device cooling passage 82. Thus, the coolant having the high cooling capacity suppresses occurrence of the heat accumulation Hp2 in the device case 70. Therefore, the device cooling passage 82 enables to further suppress occurrence of the heat accumulation Hp2 in the device case 70 with the cooling capacity exerted on the device case 70 from the coolant flowing through the motor cooling passage 52.

According to the third embodiment, the power converter 13 is provided on the upper side surface 47b of the motor case 45. Therefore, the same effects as those of the first embodiment can be produced. In the third embodiment, the device outlet 82b is positioned lower than the device inlet 82a in the device cooling passage 82. For this reason, for example, maintenance work for an external piping leading to the device outlet 82b may be more difficult than an external piping leading to the device inlet 82a. In this respect, the power converter 13 is provided on the upper side surface 47b of the motor case 45. Therefore, this configuration enables to lower difficulty of the work for the external piping leading to the device outlet 82*b*.

Fourth Embodiment

In the first embodiment, the device cooler 80 of the power converter 13 has the one device cooling passage 82. To the contrary, in the fourth embodiment, the device cooler 80 includes three types of the device cooling passages 82. The configurations, operations, and effects which are not particularly described in the fourth embodiment are the same as those in the first to third embodiments. In the fourth embodiment, differences from the first to third embodiments will be mainly described.

In the fourth embodiment, the configuration of the power converter 13 will be described with reference to the X direction, the Y direction, the Z direction, the axial direction AD, the circumferential direction CD, and the radial direction RD for the motor 12.

Figure 10:
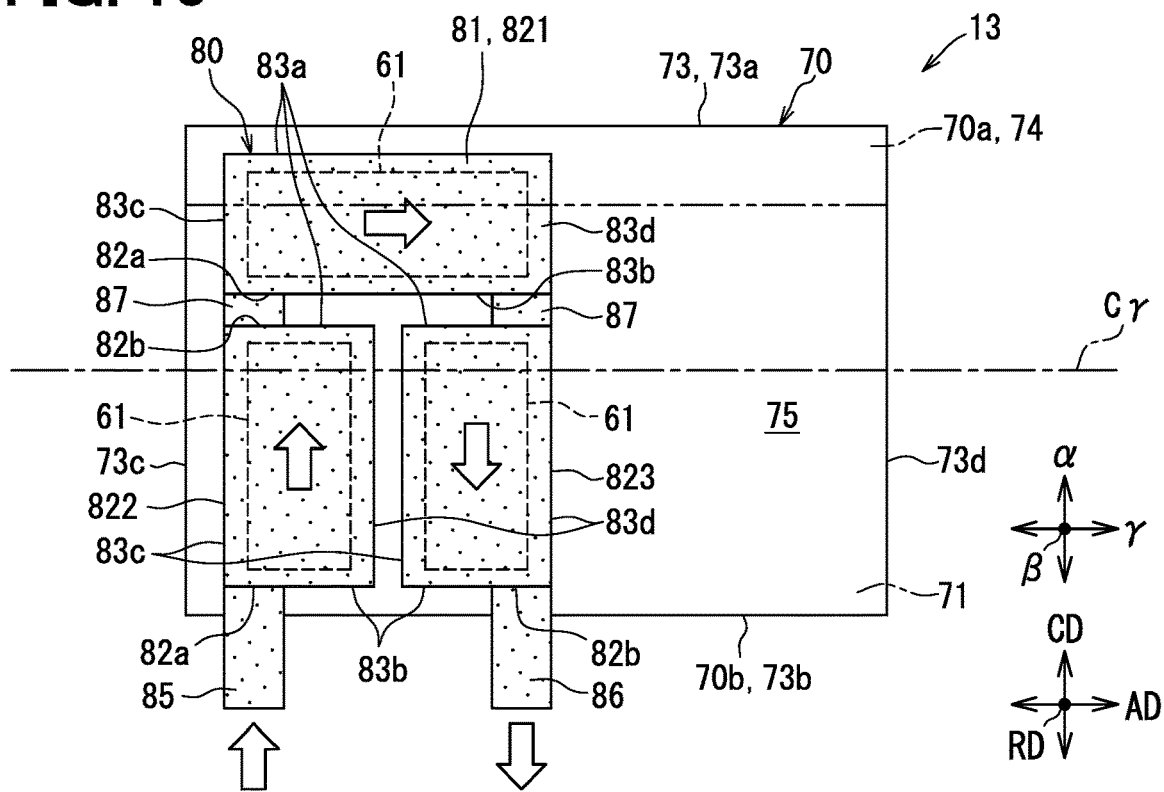
FIG. 10 is a diagram showing an internal structure of a power converter according to a fourth embodiment.

As shown in FIG. 10, the device cooler 80 has a first device cooling passage 821, a second device cooling passage 822 and a third device cooling passage 823. These device cooling passages 821 to 823 are the three types of the device cooling passages 82. In the first device cooling passage 821, the positional relationship between the device inlet 82*a* and the device outlet 82*b* is the same as that of the device cooling passage 82 of the first embodiment. In the first device cooling passage 821, the device inlet 82*a* and the device outlet 82*b* are arranged in the axial direction AD. In the second device cooling passage 822, the positional relationship between the device inlet 82*a* and the device outlet 82*b* is the same as that of the device cooling passage 82 of the second embodiment. In the second device cooling passage 822, the device inlet 82*a* is provided at a position lower than the device outlet 82*b*. In the third device cooling passage 823, the positional relationship between the device inlet 82*a* and the device outlet 82*b* is the same as that of the device cooling passage 82 of the third embodiment. In the third device cooling passage 823, the device inlet 82*a* is provided at a position higher than the device outlet 82*b*.

The device cooling passages 821 to 823 are included in the device passage 81 and arranged in series in the upstream to downstream direction in the device passage 81. The upstream to downstream direction is a direction in which the upstream end and the downstream end of the device passage 81 are arranged. The coolant flows in the upstream to downstream direction in the device passage 81 as a whole. In the device passage 81, among the device cooling passages 821 to 823, the second device cooling passage 822 is provided on the most upstream side, and the third device cooling passage 823 is provided on the most downstream side. The device upstream passage 85 is connected to the second device cooling passage 822, and the device downstream passage 86 is connected to the third device cooling passage 823. The first device cooling passage 821 is provided between the second device cooling passage 822 and the third device cooling passage 823 in the upstream to downstream direction.

The device cooler 80 has connection passages 87 that connect the device cooling passages 821-823 therebetween. The connection passages 87 are included in the device passage 81 and connect adjacent device cooling passages among the device cooling passages 821 to 823 in the upstream to downstream direction. The connection passage 87 is provided between the second device cooling passage 822 and the first device cooling passage 821 in the upstream to downstream direction and connects these device cooling passages 822 and 821. Further, the connection passage 87 is provided between the first device cooling passage 821 and the third device cooling passage 823 in the upstream to downstream direction and connects these device cooling passages 821 and 823.

In the device case 70, the first device cooling passage 821 is provided at an upper position, and the second device cooling passage 822 and the third device cooling passage 823 are provided at a lower position. Similarly to the first embodiment, the first device cooling passage 821 is provided at a position closer to the first wall portion 73*a* than the second wall portion 73*b* in the circumferential direction CD. The first device cooling passage 821 is between the first wall portion 73*a* and the device horizontal line Cγ. In the first device cooling passage 821, similarly to the first embodiment, at least the first end 83*a* is located in the upper space 75*a* (see FIG. 3) of the device case 70.

In the first device cooling passage 821, similarly to the first embodiment, one of the side ends 83*c* and 83*d* is provided with the device inlet 82*a*, and the other is provided with the device outlet 82*b*. These device inlet 82*a* and the device outlet 82*b* are both open in the circumferential direction CD, dissimilarly to the first embodiment. In the first device cooling passage 821, the same configuration as the device cooling passage 82 of the first embodiment produces the same effects as the first embodiment.

Both the second device cooling passage 822 and the third device cooling passage 823 are provided between the first device cooling passage 821 and the second wall portion 73*b* in the circumferential direction CD. These device cooling passages 822 and 823 are positioned across the device horizontal line Cγ in the circumferential direction CD. In the device cooling passages 822, 823, similarly to the first and second embodiments, at least the first end 83*a* is located in the upper space 75*a* (see FIGS. 6, 8) of the device case 70.

In the second device cooling passage 822, similarly to the second embodiment, the device inlet 82*a* is provided at the second end 83*b*, which is the lower end, and the device outlet 82*b* is provided at the first end 83*a*, which is the upper end. These device inlet 82*a* and the device outlet 82*b* are open in the circumferential direction CD, similarly to the second embodiment. In the second device cooling passage 822, the same configuration as the device cooling passage 82 of the second embodiment produces the same effects as the second embodiment.

In the third device cooling passage 823, similarly to the third embodiment, the device inlet 82*a* is provided at the first end 83*a*, which is the upper end, and the device outlet 82*b* is provided at the second end 83*b*, which is the lower end. These device inlet 82*a* and the device outlet 82*b* are open in the circumferential direction CD, similarly to the third embodiment. In the third device cooling passage 823, the same configuration as the device cooling passage 82 of the third embodiment produces the same effects as the third embodiment.

In the fourth embodiment, the power converter 13 includes a plurality of power modules 61. For example, the device case 70 accommodates three power modules 61. Each of these power modules 61 constitutes the arm circuit 31 for one phase. The device cooling passages 821 to 823 are stacked on one of the power modules 61, respectively.

As long as the device cooler 80 includes the three types of the device cooling passages 821 to 823, the arrangement of the device cooling passages 821 to 823 inside the device case 70, the arrangement of the device cooling passages 821 to 823 in the upstream/downstream direction, the number of the device cooling passages 821 to 823, and the like may be different from those described in the fourth embodiment. For example, inside the device case 70, the device cooling passages 821 to 823 may be arranged side by side in the axial direction AD. Further, the device cooling passages 821 to 823 may be arranged in parallel rather than in series in the upstream to downstream direction of the device passage 81. Furthermore, at least one type of the device cooling passages 821 to 823 may be provided as a plurality of device cooling passages.

Fifth Embodiment

In the fourth embodiment, the device cooler 80 includes three types of the device cooling passages 82. To the contrary, in the fifth embodiment, the device cooler 80 includes two types of the device cooling passages 82. The configurations, operations, and effects which are not particularly described in the fifth embodiment are the same as those in the first to fourth embodiments. In the fifth embodiment, differences from the fourth embodiment will be mainly described.

Figure 11:
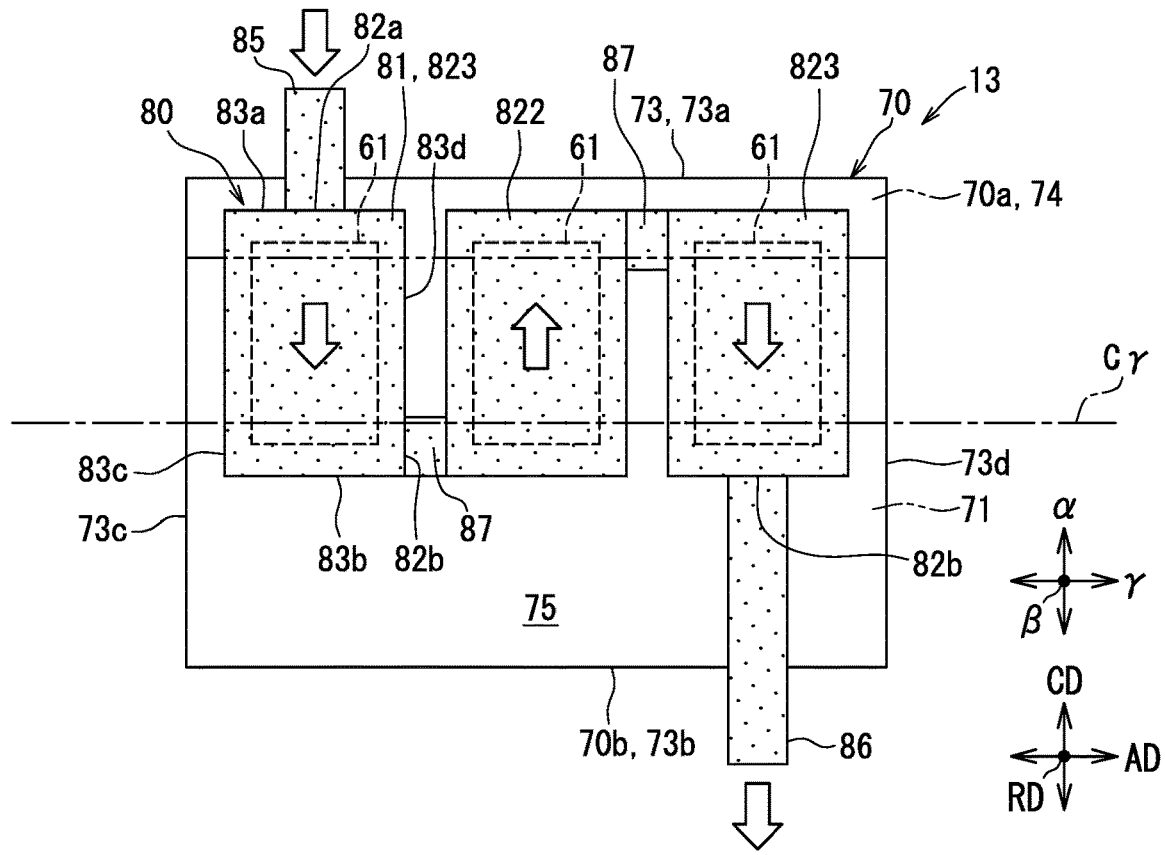
FIG. 11 is a diagram showing an internal structure of a power converter according to a fifth embodiment.

As shown in FIG. 11, the device cooler 80 includes the second device cooling passage 822 and the third device cooling passage 823 among the device cooling passages 821 to 823 exemplified in the fourth embodiment. These device cooling passages 822, 823 are the two types of the device cooling passages 82. The device cooler 80 includes three device cooling passages 82. The three device cooling passages 82 are arranged in series in the upstream to downstream direction in the device passage 81. For example, the device cooler 80 includes one second device cooling passage 822 and two third device cooling passages 823. In the device passage 81, one of the two third device cooling passages 823 is provided most upstream, and the other is provided most downstream. The second device cooling passage 822 is provided between the two third device cooling passages 823 in the upstream to downstream direction. The device upstream passage 85 is connected to the third device cooling passage 823 at the most upstream, and the device downstream passage 86 is connected to the third device cooling passage 823 at the most downstream. The second device cooling passage 822 and the third device cooling passage 823 are connected with each other via the connection passage 87.

Inside the device case 70, the device cooling passages 822 and 823 are arranged in the axial direction AD. For example, two third device cooling passages 823 are arranged in the axial direction AD, and one second device cooling passage 822 is provided between these third device cooling passages 823. Both of these device cooling passages 822 and 823 are provided at upper positions.

The two third device cooling passages 823 are provided with, similarly to the third and fourth embodiments, the device inlet 82*a* at the first end 83*a*, which is the upper end, and the device outlet 82*b* at the second end 83*b*, which is the lower end, respectively. Among the two third device cooling passages 823, in the third device cooling passage 823 at the most upstream, the device inlet 82*a* is open in the circumferential direction CD, and the device outlet 82*b* is open in the axial direction AD. In the third device cooling passage 823 at the most downstream, the device outlet 82*b* is open in the circumferential direction CD, while the device inlet 82*a* is open in the axial direction AD. In the third device cooling passage 823, the same configuration as the device cooling passage 82 of the third embodiment produces the same effects as the third embodiment.

In the one second device cooling passage 822, similarly to the third and fourth embodiments, the device inlet 82*a* is provided to the first end 83*a*, which is the upper end, and the device outlet 82*b* is provided to the second end 83*b*, which is the lower end. In this second device cooling passage 822, dissimilarly to the second and fourth embodiments, both the device inlet 82*a* and the device outlet 82*b* are open in the axial direction AD. In the second device cooling passage 822, the same configuration as the device cooling passage 82 of the second embodiment produces the same effects as the second embodiment.

As long as the device cooler 80 includes the two types of the device cooling passages 82 among the device cooling passages 821 to 823, the arrangement of the two types of the device cooling passages 82 inside the device case 70, the arrangement of the two types of the device cooling passages 82 in the upstream to downstream direction, the number of the two types of the device cooling passages 82, and the like may be different from those in the fifth embodiment. For example, inside the device case 70, two types of the device cooling passages 82 may be arranged side by side in the circumferential direction CD. Further, two types of the device cooling passages 82 may be arranged not in series but in parallel in the upstream to downstream direction of the device passage 81. Furthermore, two or four or more of the two types of the device cooling passages 82 may be provided in total.

Other Embodiments

The disclosure in the present specification is not limited to the illustrated embodiments. The disclosure encompasses the illustrated embodiments and variations thereof by those skilled in the art. For example, the disclosure is not limited to the combinations of components and elements shown in the embodiments, and various modifications and implementations can be performed. The disclosure may be implemented in various combinations. The disclosure may have additional portions that may be added to the embodiments. The disclosure encompasses the omission of parts and elements of the embodiments. The disclosure encompasses the replacement or combination of components, elements between one embodiment and another. The disclosed technical scope is not limited to the description of the embodiments. It should be understood that some disclosed technical ranges are indicated by description of claims, and includes every modification within the equivalent meaning and the scope of description of claims.

In the first embodiment, the device inlet 82*a* and the device outlet 82*b* may not be open in the axial direction AD. For example, at least one of the device inlet 82*a* and the device outlet 82*b* may be open not in the axial direction AD but in the circumferential direction CD or in the radial direction RD.

In the first embodiment, as long as the device inlet 82*a* and the device outlet 82*b* are arranged in the axial direction AD, at least one of the device inlet 82*a* and the device outlet 82*b* may not be provided at the end of the device cooling passage 82. That is, the device inlet 82*a* may be provided at a position distant from the first side end 83*c* toward the second side end 83*d*. The device outlet 82*b* may be provided at a position separated from the second side end 83*d* toward the first side end 83*c*. Further, as long as the device inlet 82*a* and the device outlet 82*b* are aligned in the axial direction AD, the device inlet 82*a* and the device outlet 82*b* may be provided at positions shifted in the circumferential direction CD or the radial direction RD.

In the first embodiment, as long as the first end 83a is arranged in the upper space 75a of the device case 70, the device cooling passage 82 may not be located in the upper part of the device case 70. For example, in the device case 70, the distance between the device cooling passage 82 and the upper end portion 70a may be larger than the distance between the device cooling passage 82 and the lower end portion 70b. Further, the device cooling passage 82 may be arranged on the upper side of the boundary portion 75c between the upper space 75a and the lower space 75b. That is, the entirety of the device cooling passage 82 may be arranged in the upper space 75a.

In the first embodiment, the device cooling passage 82 may not has the horizontally elongated shape. For example, in the device cooling passage 82, the first end 83a and the second end 83b may be short sides shorter than the side ends 83c and 83d, and the side ends 83c and 83d may be long sides.

In the first embodiment, the device cooler 80 may have the plurality of device cooling passages 82. For example, the power converter 13 may include a plurality of power modules 61, and one device cooling passage 82 may be provided for each of these power modules 61. The configuration in which the plurality of device cooling passages 82 are provided in the first embodiment is the same as the configuration in which the plurality of first device cooling passages 821 are provided in the fourth embodiment.

Figure 12:
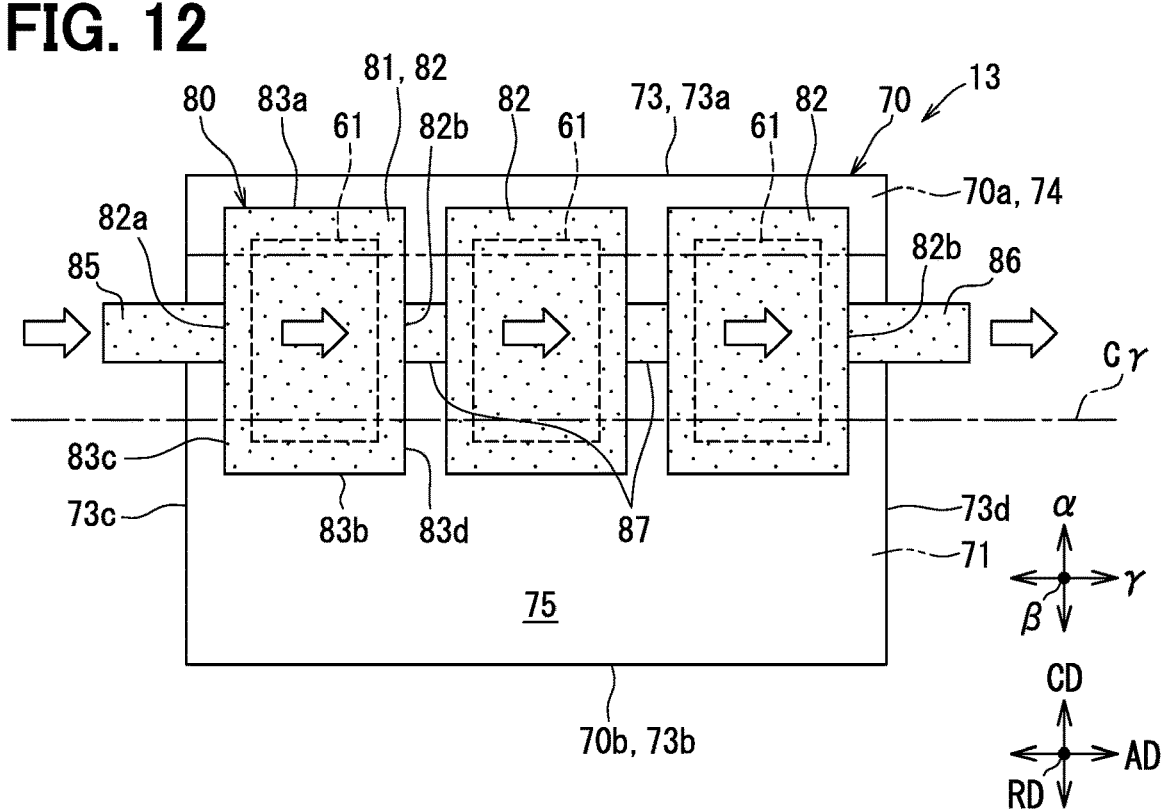
FIG. 12 is a diagram showing an internal structure of a power converter according to another of the first embodiment.

For example, as shown in FIG. 12, in the device cooler 80 of the first embodiment, the plurality of device cooling passages 82 are arranged together with the plurality of power modules 61 in the axial direction AD. In FIG. 12, the device cooling passages 82 adjacent in the upstream to downstream direction of the device passage 81 are connected with each other via the connection passages 87. Among the plurality of device cooling passages 82, the device cooling passage 82 at the most upstream is connected to the device upstream passage 85, and the device cooling passage 82 at the most downstream is connected to the device downstream passage 86. In any of these device cooling passages 82, one of the side ends 83c and 83d is provided with the device inlet 82a, and the other is provided with the device outlet 82b. Therefore, coolant flows in the same axial direction AD in any one of the plurality of device cooling passages 82.

Figure 13:
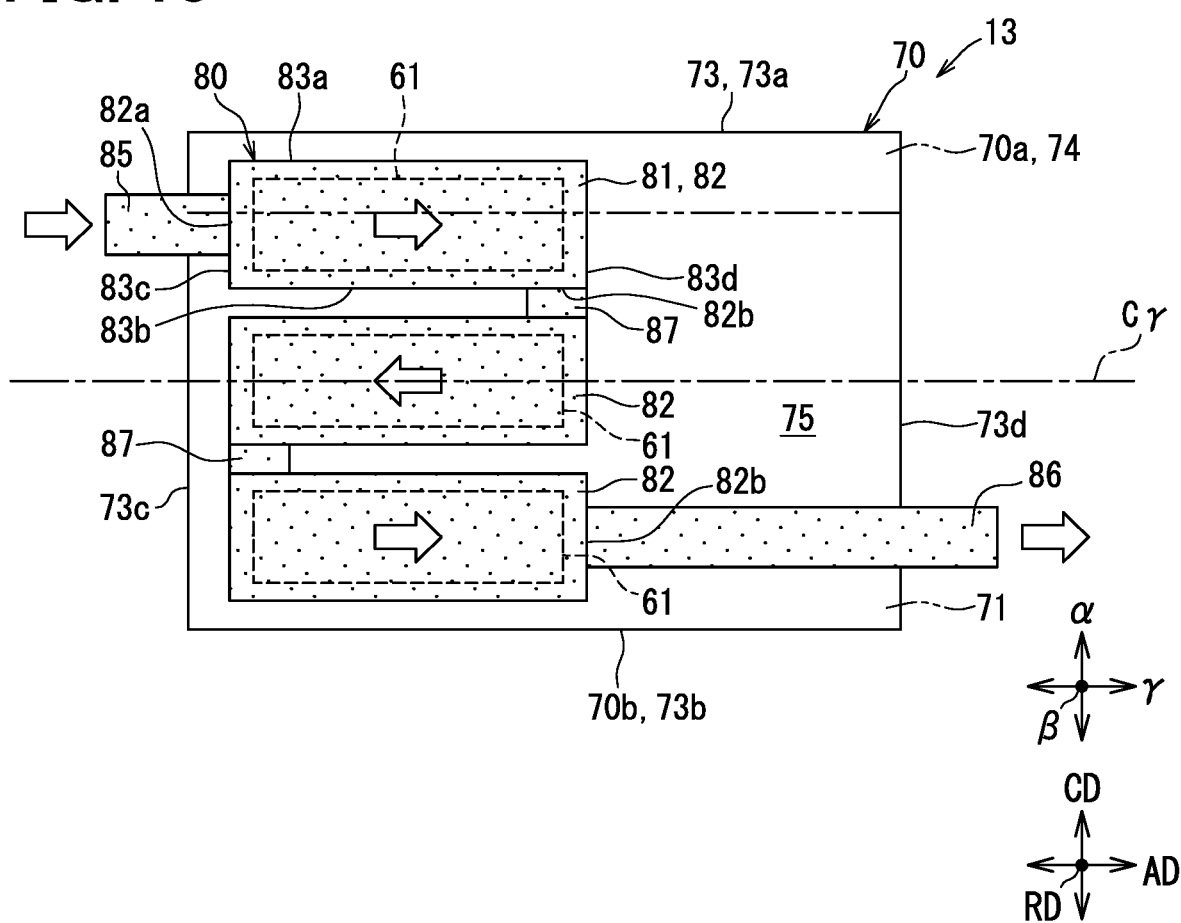
FIG. 13 is a diagram showing an internal structure of a power converter according to another of the first embodiment.

As shown in FIG. 13, the plurality of device cooling passages 82 are arranged in the circumferential direction CD. In FIG. 13, the plurality of device cooling passages 82 includes the device cooling passage 82 having the device inlet 82a in the first side wall portion 73c and the device cooling passage 82 having the device inlet 82a not in the first side wall portion 73c but in the second side wall portion 73d. For example, among the device cooling passages 82 adjacent in the upstream to downstream direction of the device passage 81, in one of the device cooling passages 82, the coolant flows from the first side wall portion 73c toward the second side wall portion 73d, and in the other of the device cooling passages 82, the coolant flows from the second side wall portion 73d toward the first side wall portion 73c. At least one device cooling passage 82 of the plurality of device cooling passages 82 has the first end 83a, which is the upper end, in the upper space 75a of the device case 70.

In the second embodiment, at least one of the device inlet 82a and the device outlet 82b may be open not in the circumferential direction CD but in the axial direction AD or in the radial direction RD.

Figure 14:
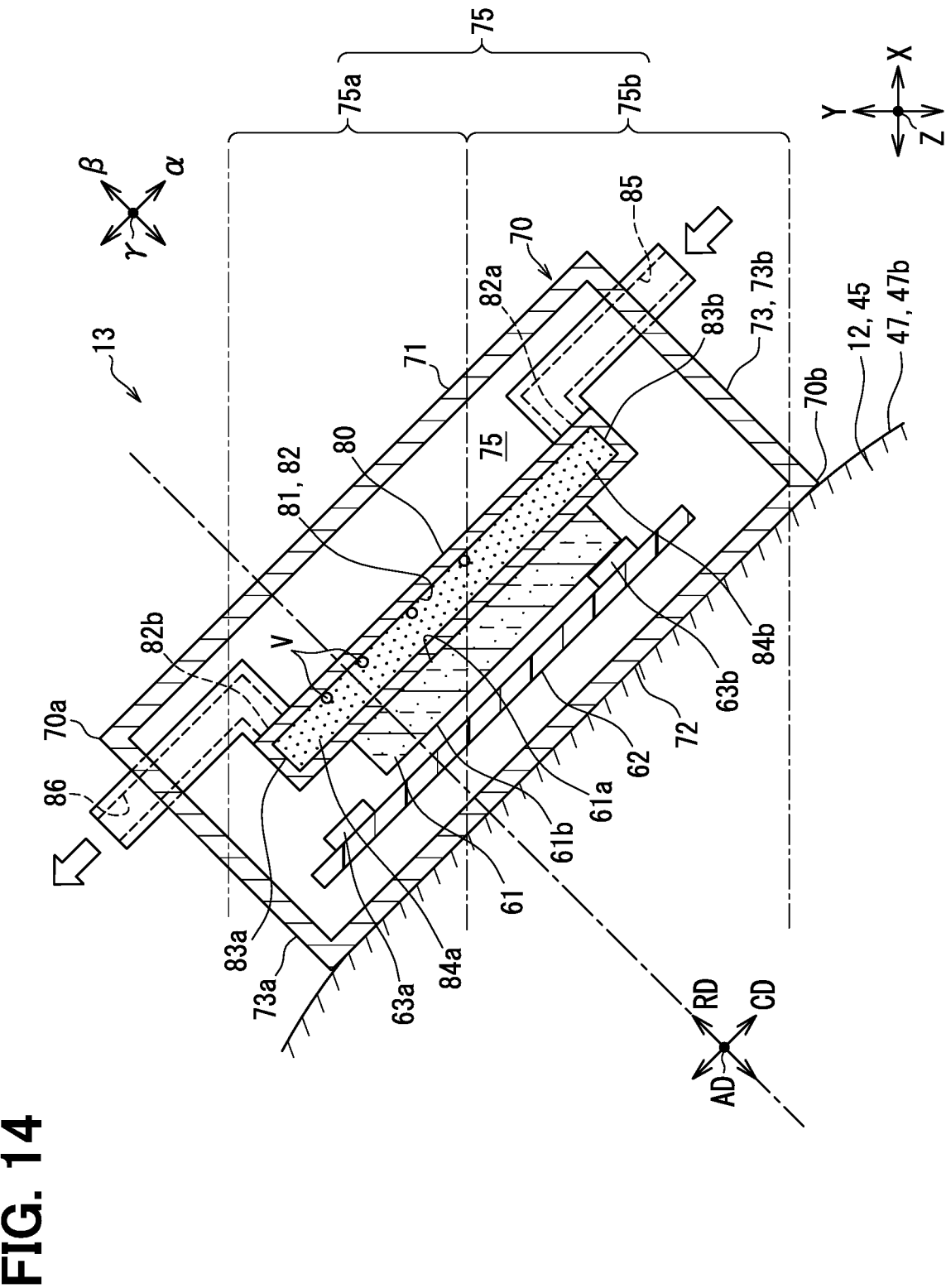
FIG. 14 is a longitudinal cross-sectional view showing a power converter according to another of the second embodiment.

For example, as shown in FIG. 14, both the device inlet 82a and the device outlet 82b are open in the radial direction RD. In FIG. 14, the device upstream passage 85 has a portion extending outward in the radial direction RD from the device inlet 82a and a portion extending toward the second wall portion 73b in the circumferential direction CD. The device downstream passage 86 has a portion extending outward in the radial direction RD from the device outlet 82b and a portion extending toward the first wall portion 73a in the circumferential direction CD. For example, the device case 70 is not provided with the inclined portion 74, and the device downstream passage 86 extends upward from the device case 70 through the first wall portion 73a. The device upstream passage 85 extends downward from the device case 70 through the second wall portion 73b.

In the second embodiment, as long as the device inlet 82a is positioned lower than the device outlet 82b, at least one of the device inlet 82a and the device outlet 82b may be located between the first end 83a and the second end 83b of the device cooling passage 82. That is, the device inlet 82a may be provided at a position distant from the second end 83b toward the first end 83a. The device outlet 82b may be provided at a position distant from the first end 83a toward the second end 83b. Further, as long as the device inlet 82a is positioned lower than the device outlet 82b, the device inlet 82a and the device outlet 82b may be shifted in the axial direction AD or in the radial direction RD.

In the second embodiment, as long as the device inlet 82a is positioned lower than the device outlet 82b, the device cooling passage 82 may not have the vertically elongated shape. For example, in the device cooling passage 82, the first end 83a and the second end 83b may be long sides longer than the side ends 83c and 83d, and the side ends 83c and 83d may be short sides.

In the second embodiment, the device cooler 80 may have the plurality of device cooling passages 82. The configuration in which the plurality of device cooling passages 82 are provided in the second embodiment is the same as the configuration in which the plurality of second device cooling passages 822 are provided in the fourth and fifth embodiment.

Figure 15:
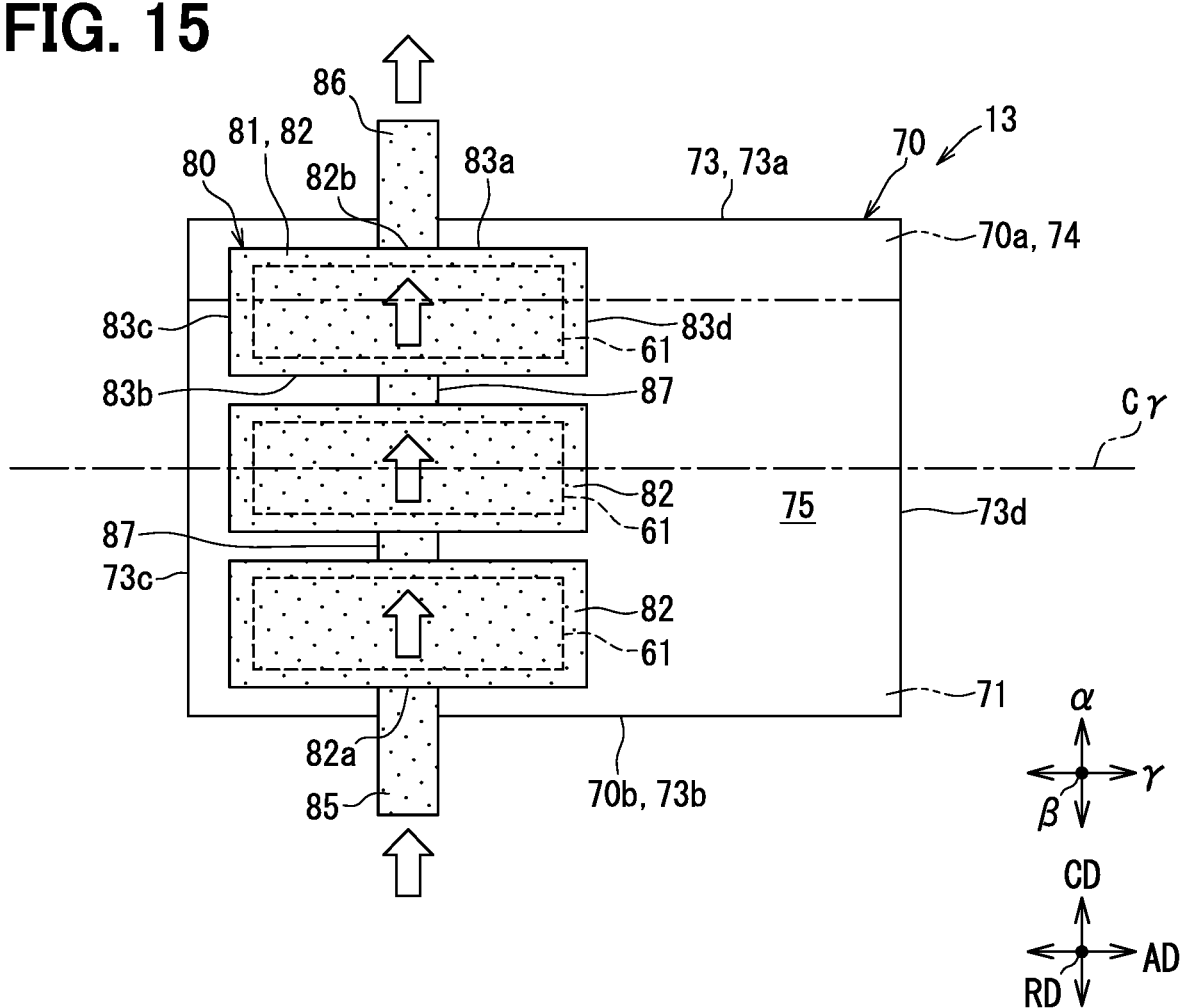
FIG. 15 is a diagram showing an internal structure of a power converter according to another of the second embodiment.

For example, as shown in FIG. 15, in the device cooler 80 of the second embodiment, the plurality of device cooling passages 82 are arranged together with the plurality of power modules 61 in the circumferential direction CD. In FIG. 15, the device cooling passages 82 adjacent in the upstream to downstream direction of the device passage 81 are connected with each other via the connection passages 87. Among the plurality of device cooling passages 82, the device cooling passage 82 at the most upstream is located closest to the second wall portion 73b in the device case 70 and is connected to the device upstream passage 85. On the other hand, the device cooling passage 82 at the most downstream is located closest to the first wall portion 73a in the device case 70 and is connected to the device downstream passage 86. In any of these device cooling passages 82, the device inlet 82a is provided at the second end 83b, and the device outlet 82b is provided at the first end 83a. Therefore, the coolant flows upward as a whole in any one of the plurality of device cooling passages 82.

In the third embodiment, at least one of the device inlet 82a and the device outlet 82b may be open not in the circumferential direction CD but in the axial direction AD or in the radial direction RD.

Figure 16:
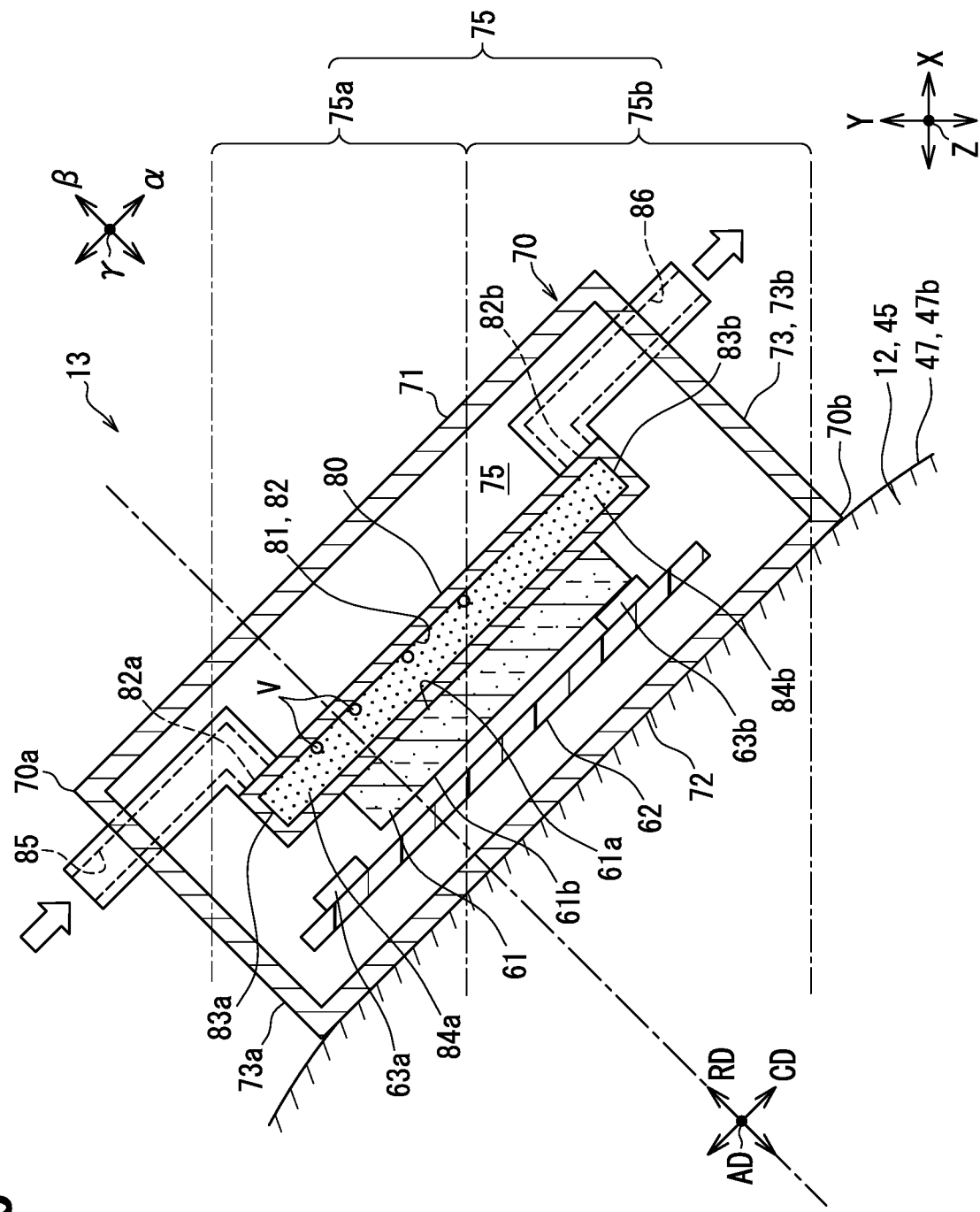
FIG. 16 is a longitudinal cross-sectional view showing a power converter according to another of the third embodiment.

For example, as shown in FIG. 16, both the device inlet 82a and the device outlet 82b are open in the radial direction RD. In FIG. 16, the device upstream passage 85 has a portion extending outward in the radial direction RD from the device inlet 82a and a portion extending toward the first wall portion 73a in the circumferential direction CD. The device downstream passage 86 has a portion extending outward in the radial direction RD from the device outlet 82b and a portion extending toward the second wall portion 73b in the circumferential direction CD. For example, the device case 70 is not provided with the inclined portion 74, and the device upstream passage 85 extends upward from the device case 70 through the first wall portion 73a. The device downstream passage 86 extends downward from the device case 70 through the second wall portion 73b.

In the third embodiment, as long as the device inlet 82a is positioned higher than the device outlet 82b, at least one of the device inlet 82a and the device outlet 82b may be located between the first end 83a and the second end 83b of the device cooling passage 82. That is, the device inlet 82a may be provided at a position distant from the first end 83a toward the second end 83b. The device outlet 82b may be provided at a position distant from the second end 83b toward the first end 83a. Further, as long as the device inlet 82a is positioned higher than the device outlet 82b, the device inlet 82a and the device outlet 82b may be shifted in the axial direction AD or in the radial direction RD.

In the third embodiment, as long as the device inlet 82a is positioned higher than the device outlet 82b, the device cooling passage 82 may not have the vertically elongated shape.

In the third embodiment, the device cooler 80 may have the plurality of device cooling passages 82. The configuration in which the plurality of device cooling passages 82 are provided in the third embodiment is the same as the configuration in which the plurality of third device cooling passages 823 are provided in the fourth and fifth embodiment.

Figure 17:
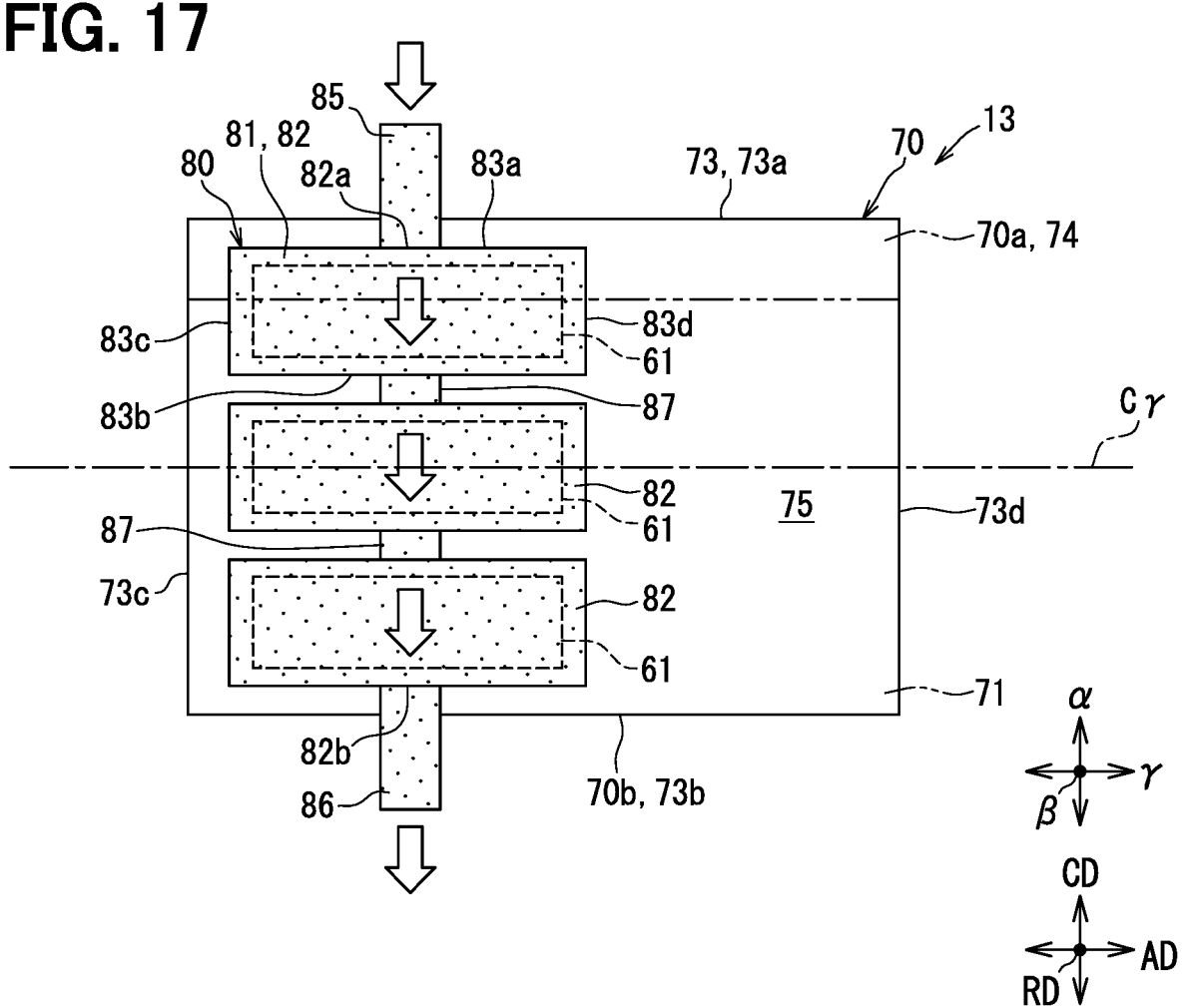
FIG. 17 is a diagram showing an internal structure of a power converter according to another of the third embodiment.

For example, as shown in FIG. 17, in the device cooler 80 of the third embodiment, the plurality of device cooling passages 82 are arranged together with the plurality of power modules 61 in the circumferential direction CD. In FIG. 17, the device cooling passages 82 adjacent in the upstream to downstream direction of the device passage 81 are connected with each other via the connection passages 87. Among the plurality of device cooling passages 82, the device cooling passage 82 at the most upstream is located closest to the first wall portion 73a in the device case 70 and is connected to the device upstream passage 85. On the other hand, the device cooling passage 82 at the most downstream is located closest to the second wall portion 73b in the device case 70 and is connected to the device downstream passage 86. In any of these device cooling passages 82, the device inlet 82a is provided at the first end 83a, and the device outlet 82b is provided at the second end 83b. Therefore, the coolant flows downward as a whole in any one of the plurality of device cooling passages 82.

In each of the above embodiments, an extension dimension of the first extending portion 84a from the power module 61 may be larger than an extension dimension of the second extending portion 84b from the power module 61. In the first embodiment, the cooling effect is exerted on the upper space 75a of the device case 70 from the first extending portion 84a. Therefore, the extension dimension of the first extending portion 84a is enlarged as much as possible. This configuration enables to enhance the cooling effect of the first extending portion 84a for the upper space 75a.

In each of the above embodiments, only a portion of the device cooling passage 82 may extend outside the power module 61 in the direction orthogonal to the radial direction RD. Further, the device cooling passage 82 may not extend outside the power module 61 in the direction orthogonal to the radial direction RD. For example, at least a part of the power module 61 may extend outside the device cooling passage 82 in the direction orthogonal to the radial direction RD.

In each of the embodiments, the inclined portion 74 of the device case 70 may not extend in the direction orthogonal to the Y direction. For example, the inclined portion 74 may extend in a direction inclined with respect to the horizontal direction. Further, the inclined portion 74 need not be extended straight and may be curved so as to bulge upward or downward in the Y direction. Furthermore, the device case 70 may not be provided with the inclined portion 74. For example, an imaginary case 70X (see FIG. 2) that does not have the inclined portion 74 may be, as the device case 70, attached to the motor case 45.

In each of the embodiments, the device cooling passage 82 may be provided further inside than at least one of the power module 61 and the control board 62 in the radial direction RD. For example, the device cooling passage 82 is stacked under the lower surface 61b of the power module 61. In this configuration, the device cooling passages 82 extend along the lower surface 61b. Further, the device cooling passage 82 may be provided between the power module 61 and the control board 62 in the radial direction RD.

In each of the embodiments, the device cooling passage 82 in the device case 70 may be in an installation mode that enables to exert the cooling effect on the power module 61. For example, the device cooling passage 82 may be accommodated in only one of the upper space 75a and the lower space 75b in the device case 70. Further, the device cooling passage 82 may not extend in the direction orthogonal to the radial direction RD and may extend in a direction orthogonal to the circumferential direction CD or orthogonal to the axial direction AD.

In each of the above embodiments, the numbers of power modules 61 and the device cooling passages 82 may be different from each other. For example, a configuration in which the plurality of device cooling passages 82 are provided for one power module 61 may be adopted. In this configuration, one power module 61 spans the plurality of device cooling passages 82. Alternatively, the plurality of power modules 61 are provided for one device cooling passage 82. In this configuration, one device cooling passage 82 spans the plurality of power modules 61.

Figure 18:
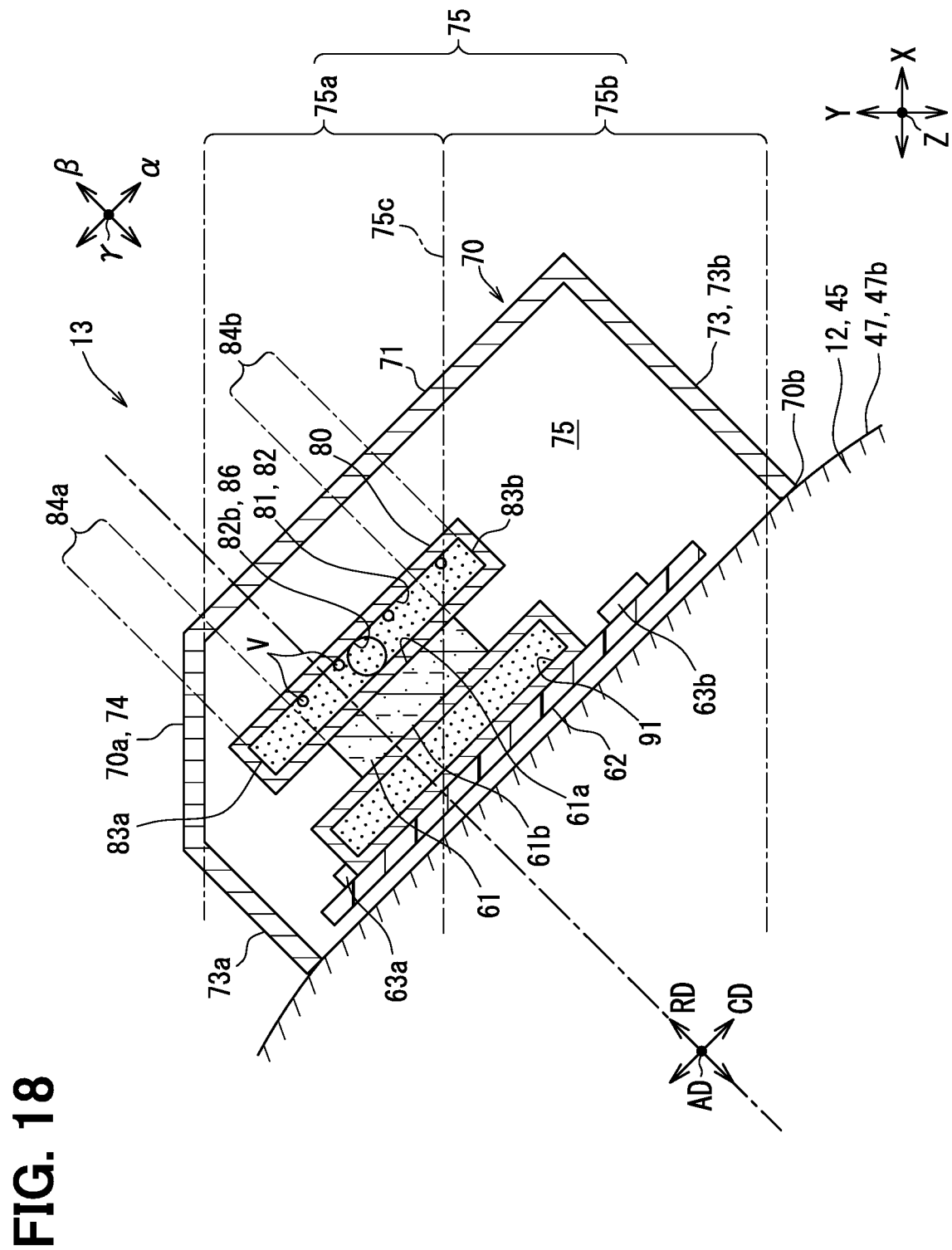
FIG. 18 is a longitudinal cross-sectional view showing a power converter according to another of the first embodiment.
Figure 19:
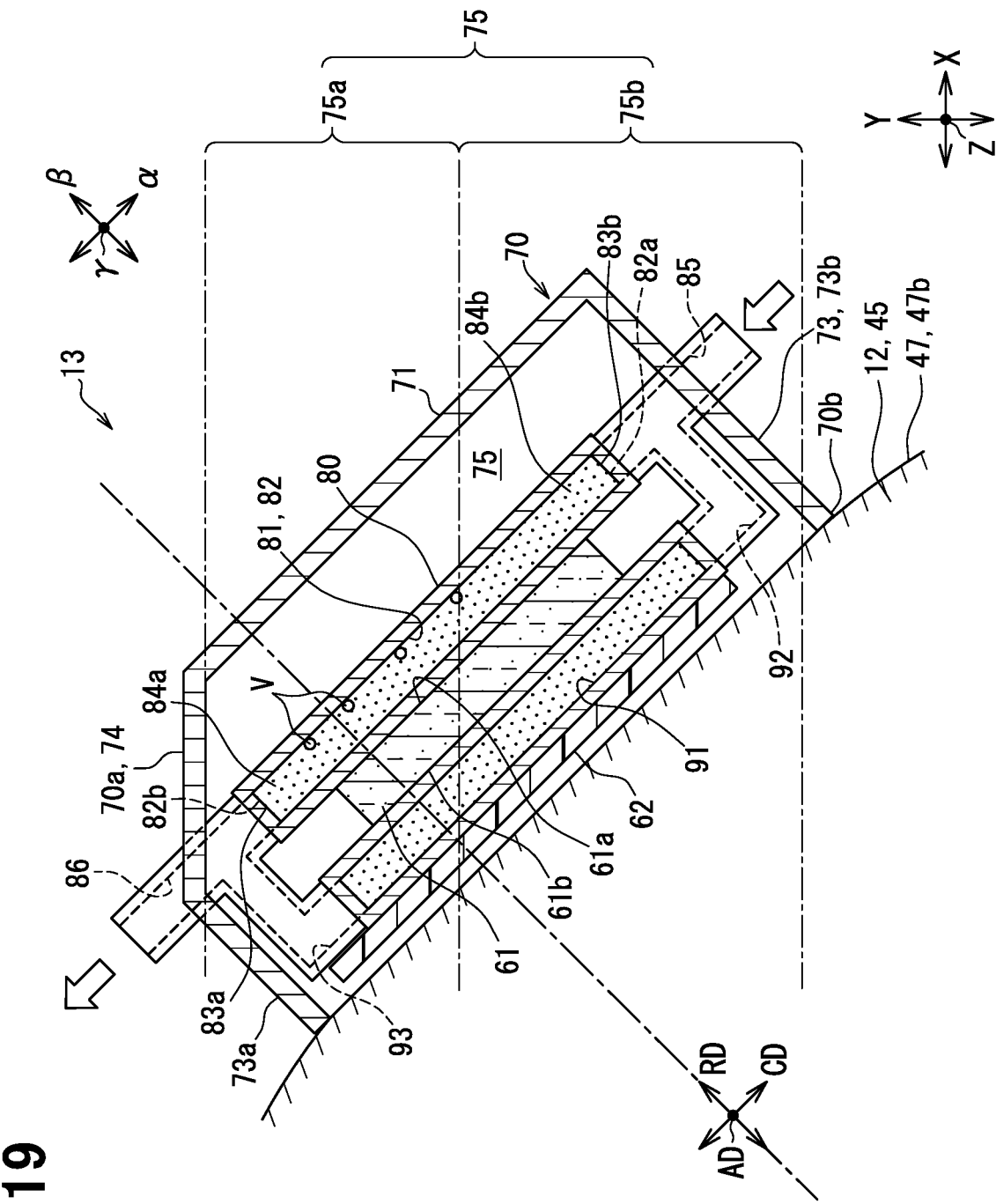
FIG. 19 is a longitudinal cross-sectional view showing a power converter according to another of the second embodiment.
Figure 20:
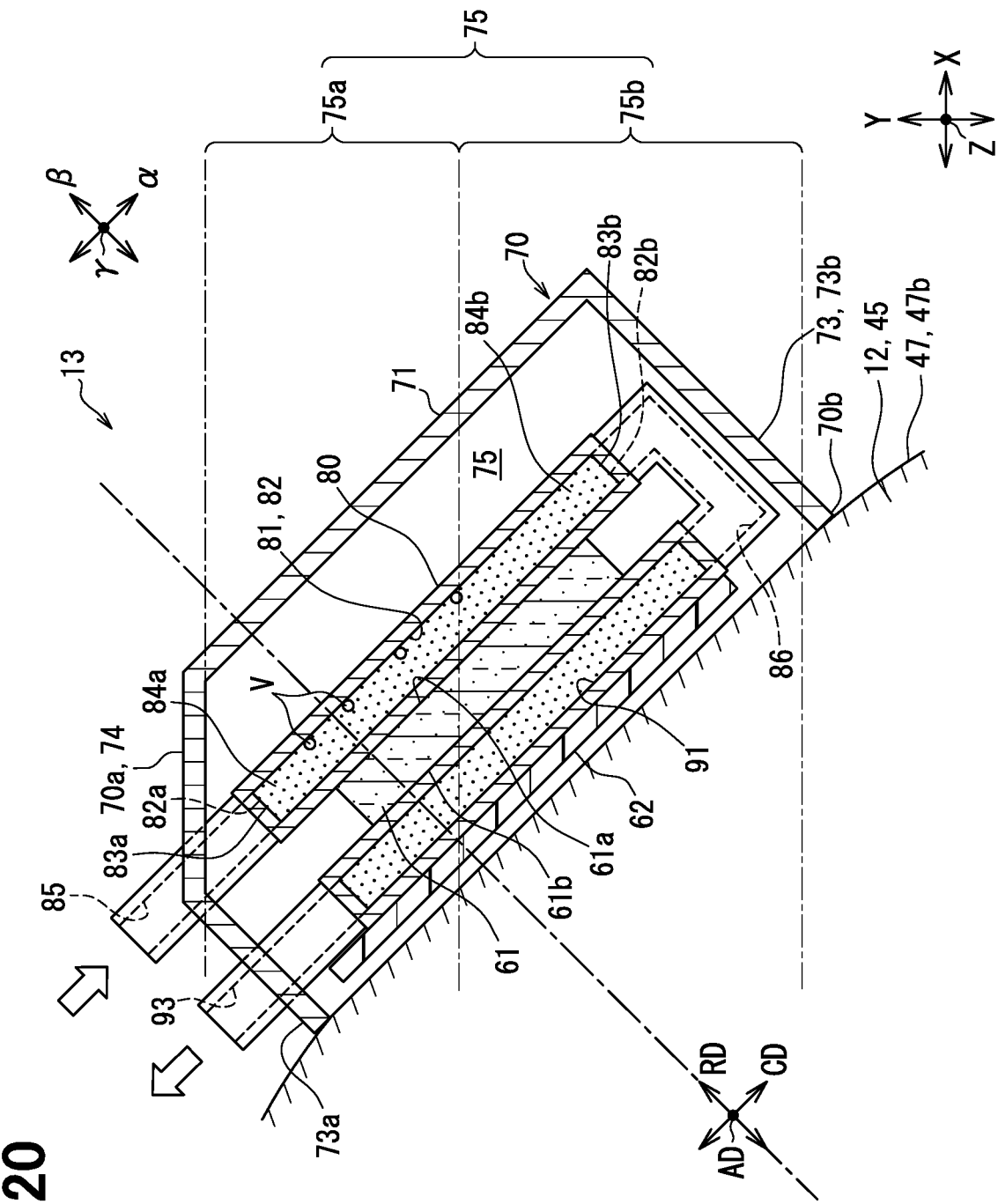
FIG. 20 is a longitudinal cross-sectional view showing a power converter according to another of the third embodiment.

In each of the above embodiments, as shown in FIGS. 18 to 20, the device cooler 80 may include an opposed cooling passage 91 that faces the device cooling passage 82 via the power module 61 The opposed cooling passage 91 is included in the device passage 81 together with the device cooling passage 82 and extends along with the device cooling passage 82 in a direction orthogonal to the radial direction RD. The opposed cooling passage 91 overlaps one of the upper surface 61a and the lower surface 61b of the power module 61 that is an opposite side of the power module 61 from the device cooling passage 82. For example, in case where the device cooling passage 82 overlaps the upper surface 61a of the power module 61, the opposed cooling passage 91 overlaps the lower surface 61b of the power module 61. In the device cooler 80, double-sided cooling is performed in which the device cooling passage 82 and the opposed cooling passage 91 exert cooling effects on both the upper surface 61a and the lower surface 61b of the power module 61.

For example, as shown in FIGS. 18 to 20, the opposed cooling passage 91 is provided between the power module 61 and the control board 62 in the radial direction RD. The opposed cooling passage 91 enables to provide the cooling effect to both the power module 61 and the control board 62. As shown in FIG. 18, the opposed cooling passage 91 may be provided between the power module 61 and the control board 62 in the first embodiment. As shown in FIG. 19, the opposed cooling passage 91 may be provided between the power module 61 and the control board 62 in the second embodiment. As shown in FIG. 20, the opposed cooling passage 91 may be provided between the power module 61 and the control board 62 in the third embodiment.

In the device cooler 80, a portion connecting the device cooling passage 82 with the opposed cooling passage 91 may be provided inside the device case 70 and may be provided outside the device case 70. In the device cooler 80, the device cooling passage 82 and the opposed cooling passage 91 may be arranged in series or in parallel in the upstream to downstream direction of the device passage 81.

For example, as shown in FIG. 19, in the second embodiment, the device cooling passage 82 and the opposed cooling passage 91 are connected in parallel with each other. In this configuration, the device cooler 80 has, in addition to the opposed cooling passage 91, an opposed upstream passage 92 and a downstream passage 93. The opposed upstream passage 92 is provided upstream of the device cooling passage 82 in the device passage 81 and branches off from the device upstream passage 85. A branching portion of the opposed upstream passage 92 from the device upstream passage 85 is provided inside the device case 70. The opposed downstream passage 93 is provided downstream of the device cooling passage 82 in the device passage 81 and merges with the device downstream passage 86. A merge portion of the opposed downstream passage 93 with the device downstream passage 86 is provided inside the device case 70. In the device cooler 80, the coolant flowing through the device upstream passage 85 branches into the device cooling passage 82 and the opposed cooling passage 91 and merges with each other again in the device downstream passage 86.

For example, as shown in FIG. 20, in the third embodiment, the device cooling passage 82 and the opposed cooling passage 91 are connected in series with each other. In this configuration, one of the device cooling passage 82 and the opposed cooling passage 91 is arranged downstream of the other in the device passage 81. For example, in the device passage 81, the opposed cooling passage 91 is arranged downstream of the device cooling passage 82. The device cooling passage 82 is connected to the opposed cooling passage 91 via the device downstream passage 86. The device downstream passage 86 is a portion that connects the device cooling passage 82 with the opposed cooling passage 91 and is provided inside the device case 70. In the device passage 81, the opposed downstream passage 93 is provided downstream of the opposed cooling passage 91. In the device cooler 80, the coolant flowing from the device upstream passage 85 into the device cooling passage 82 passes through the device downstream passage 86 and flows out from the opposed cooling passage 91 to the opposed downstream passage 93.

The device cooling passage 82 and the opposed cooling passage 91 may have the same coolant flow direction as a whole or may have the different coolant flow directions. In a configuration, in which the device cooling passage 82 and the opposed cooling passage 91 have the different coolant flow directions, the directions of coolant flow are opposite from each other, or the directions of coolant flow intersect with each other.

For example, as shown in FIG. 19, in the second embodiment, the device cooling passage 82 and the opposed cooling passage 91 have the same coolant flow direction as a whole. In this configuration, in the opposed cooling passage 91, the inlet of the coolant is provided at a position lower than the outlet of the coolant. In this way, the vertical relationship between the inlet and the outlet of the opposed cooling passage 91 is the same as the vertical relationship between the device inlet 82a and the device outlet 82b of the device cooling passage 82.

For example, as shown in FIG. 20, in the third embodiment, the device cooling passage 82 and the opposed cooling passage 91 have the reversed coolant flow directions as a whole. In this configuration, the device inlet 82a of the device cooling passage 82 is positioned higher than the device outlet 82b, whereas the inlet of the opposed cooling passage 91 is positioned lower than the outlet of the opposed cooling passage 91. In this way, the vertical relationship between the inlet and the outlet of the opposed cooling passage 91 is opposite to the vertical relationship between the device inlet 82a and the device outlet 82b of the device cooling passage 82.

In each of the above embodiments, as shown in FIGS. 18 to 20, the device case 70 may not have the floor portion 72. In this configuration, the floor portion 72 is not provided between the power module 61 or the control board 62 and the motor cooling passage 52 in the radial direction RD. Therefore, the cooling effect of the motor cooling passage 52 is likely to be exerted on the power module 61 and the control board 62. Thus, the cooling effect of the motor cooling passage 52 for the power module 61 and the control board 62 can be enhanced.

In each of the embodiments, in the power converter 13, in addition to the power module 61, a capacitor unit, a terminal portion, a bus bar, and the like may be cooled, as electric components for converting power, by the device cooling passage 82. For example, the capacitor unit includes a capacitor such as the smoothing capacitor 21 electrically connected to a switching element such as the arm switch 32. The terminal portion includes an input terminal portion and an output terminal portion. The input terminal portion is a terminal portion electrically connected to the battery 11 via a bus bar or the like. The output terminal portion is a terminal portion electrically connected to the motor 12 via a bus bar or the like. The control board 62 may be cooled, as an electric component, by the device cooling passage 82.

In each of the embodiments, the switching element that constitutes the arm switch 32 is not limited to IGBTs. For example, a MOSFET or the like may be used for the switching element.

In each of the above embodiments, the device case 70 may be made of a resin material or the like instead of the metal material. Similarly, the motor case 45 may be made of a resin material instead of a metal material.

In each of the embodiments, the device case 70 and the motor case 45 may be integrally manufactured by integral molding or the like instead of being assembled to each other after being manufactured independently.

Figure 21:
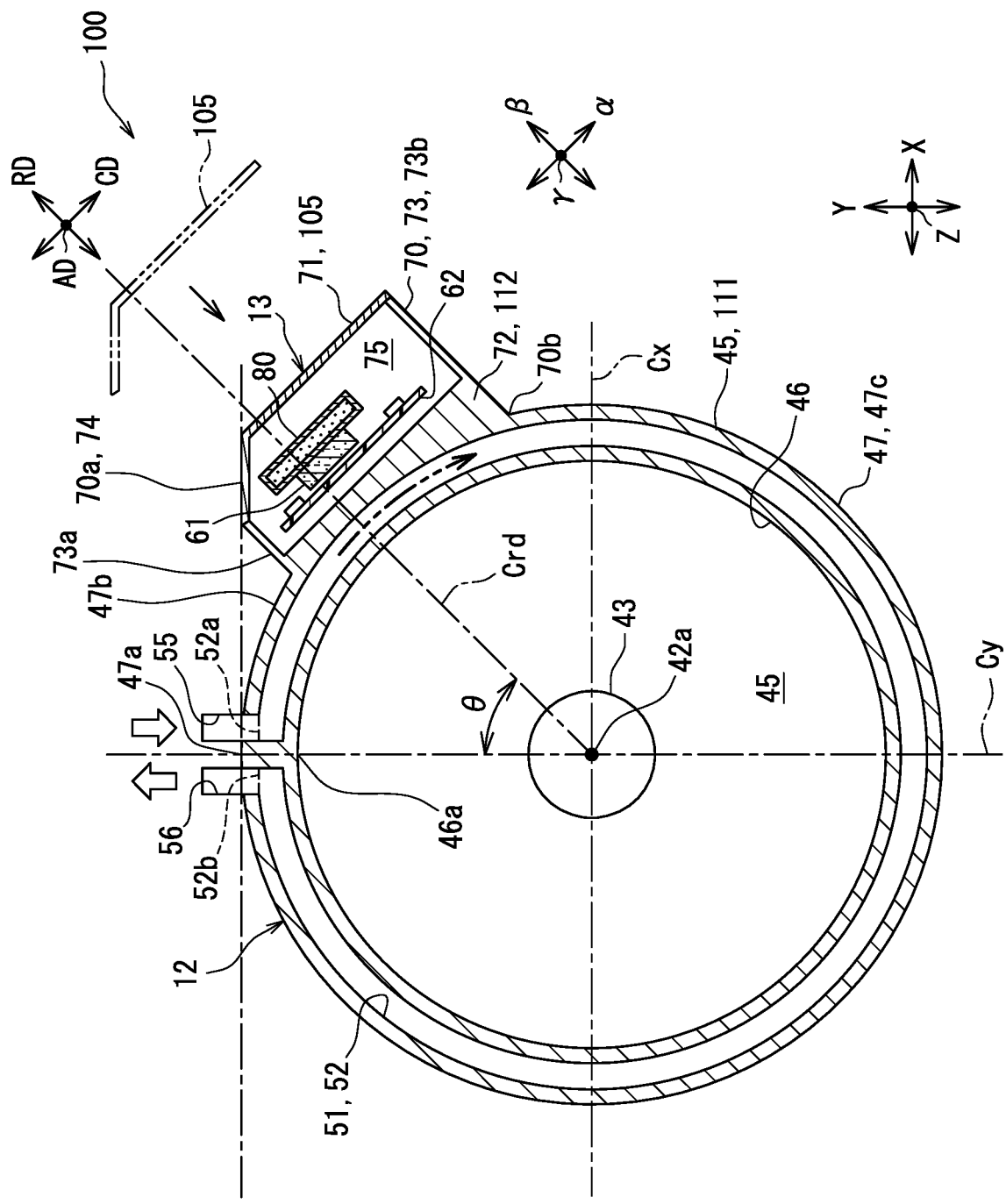
FIG. 21 is a schematic longitudinal cross-sectional view showing a configuration of another motor unit.
Figure 22:
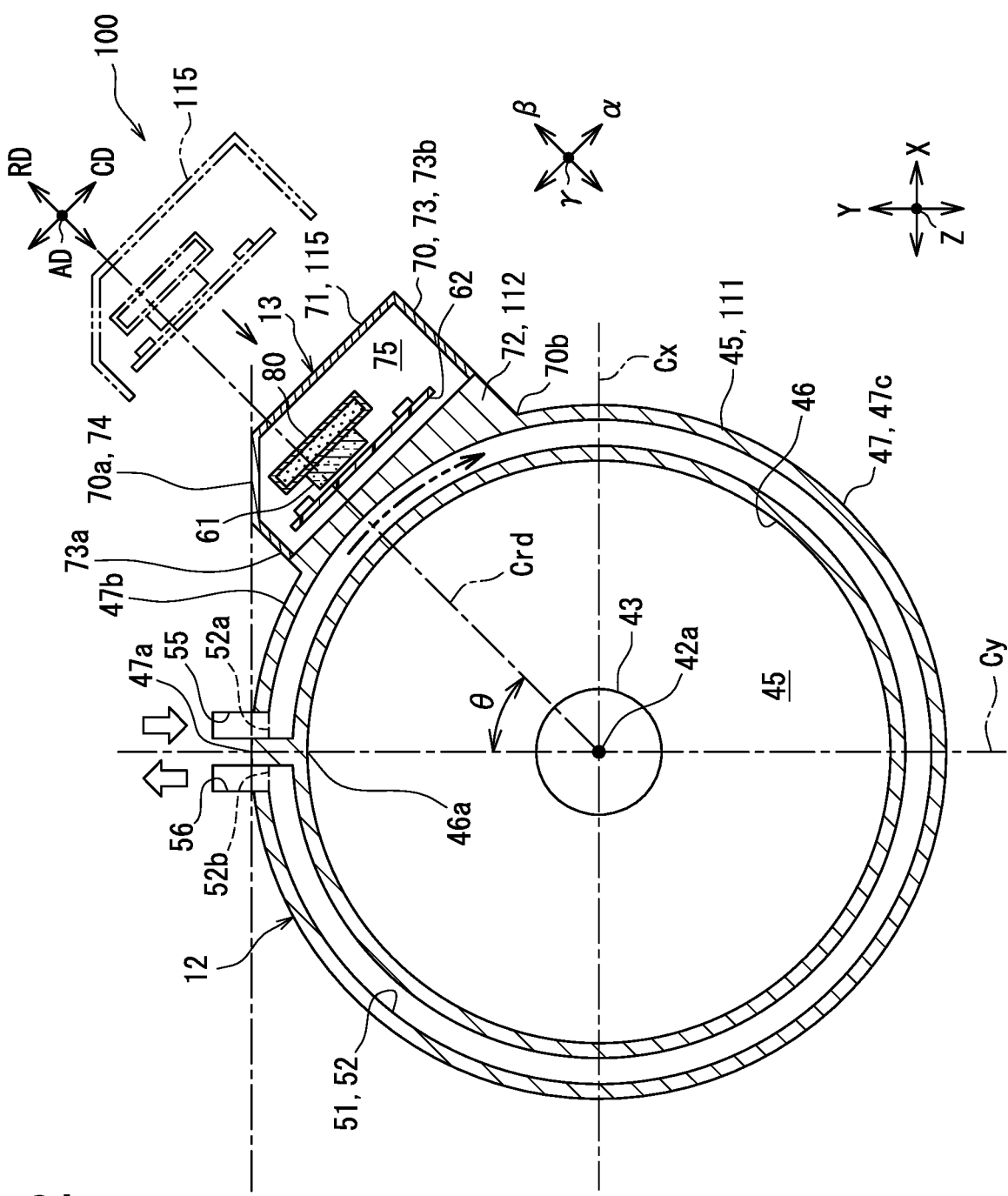
FIG. 22 is a schematic longitudinal cross-sectional view showing a configuration of another motor unit.

In each of the above embodiments, a part of the motor case 45 may serve as at least a part of the device case 70. For example, as shown in FIGS. 21 and 22, the motor case 45 may include a main body portion 111 and a common portion 112. The main body portion 111 defines the inner circumferential surface 46 and the outer circumferential surface 47 in the motor case 45 and accommodates the stator 41 and the rotor 42. The main body portion 111 has the motor passage 51 and corresponds to an electric machine cooling portion.

The common portion 112 forms a part of the device case 70 and is a part of the device case 70. For example, as shown in FIG. 21, the common portion 112 may form the floor portion 72 and the outer wall 73 of the device case 70. As shown in FIG. 22, the common portion 112 may form the floor portion 72 of the device case 70.

A part of the common portion 112 is provided between the motor cooling passage 52 and the internal space 75 of the device case 70 in the radial direction RD. A part of the common portion 112 forms both the motor cooling passage 52 and the internal space 75 of the device case 70.

In the configuration in which the motor case 45 includes the main body portion 111 and the common portion 112, the motor unit 100 includes a device cover 105. The device cover 105 is attached to the motor case 45 and forms the device case 70 together with the common portion 112 of the motor case 45. In the configuration in which the common portion 112 of the motor case 45 forms a part of the device case 70, the device cover 105 forms the remaining portion of the device case 70. As shown in FIG. 21, in the configuration in which the common portion 112 forms the floor portion 72 and the outer wall 73 of the device case 70, the device cover 105 forms the remaining ceiling portion 71 and the inclined portion 74. As shown in FIG. 22, in the configuration in which the common portion 112 forms the floor portion 72 of the device case 70, a device cover 115 forms the remaining ceiling portion 71, the outer wall 73, and the inclined portion 74.

As a method of manufacturing the motor unit 100, at least one of the power module 61, the control board 62, and the device cooler 80 may be attached to the device cover 115. For example, as shown in FIG. 22, all of the power module 61, the control board 62, and the device cooler 80 may be attached to the device cover 115. In this manufacturing method, the power module 61, the control board 62, and the device cooler 80 are attached to the motor case 45 together with the device cover 115. Alternatively, all of the power module 61, the control board 62, and the device cooler 80 may be attached to the motor case 45. In this manufacturing method, the device cover 105 is attached to the motor case 45 so that the device cover 105 covers the power module 61, the control board 62, and the device cooler 80. In either manufacturing method, the device cover 105 and 115 is attached to the motor case 45. In this way, the device case 70 is manufactured of the common portion 112 and the device cover 105 and 115.

Note that the motor unit 100 may not have the device cover 105 and 115. In this configuration, the device case 70 of the power converter 13 does not include the device cover 105 and 115 but is formed of the common portion 112 of the motor case 45. Therefore, the common portion 112 of the motor case 45 also serves as the device case 70 as a whole.

In the configuration in which the common portion 112 of the motor case 45 also serves as at least a part of the device case 70, the cooling effect of the motor cooling passage 52 is exerted on the power converter 13 via the common portion 112. Therefore, the shape and the size of the common portion 112 are set so that the cooling effect of the motor cooling passage 52 is likely exerted on the internal space 75 of the device case 70. Thus, the cooling effect of the motor cooling passage 52 for the power converter 13 can be enhanced.

In each of the embodiments, the motor case 45 may not form the motor passage 51, and a member other than the motor case 45 may form at least a portion of the motor passage 51. Note that another member that is integrally provided with the motor case 45 such as by being attached to the motor case 45 corresponds to a device housing together with the motor case 45.

In each of the above embodiments, the device case 70 may form the entirety of the device passage 81, or a member other than the device case 70 may form the entirety of the device passage 81.

Figure 23:
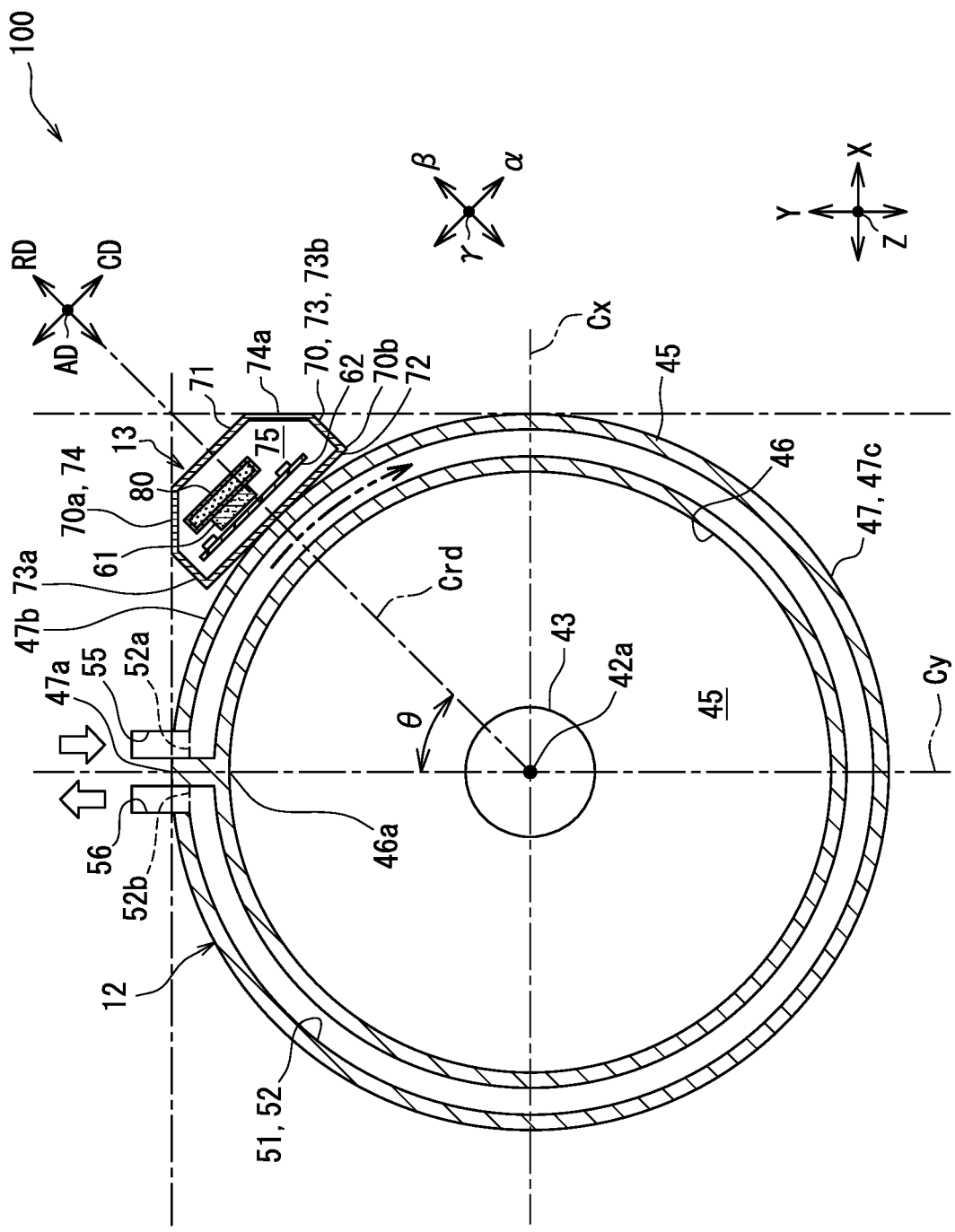
FIG. 23 is a schematic longitudinal cross-sectional view showing a configuration of another motor unit.

In each of the embodiments, the power converter 13 may be provided at a position such that the power converter 13 does not protrude laterally from the motor case 45. For example, as shown in FIG. 23, the power converter 13 is provided at a position such that the power converter 13 does not protrude from the motor case 45 both upwardly and laterally. In this configuration, the device case 70 of the power converter 13 has an inclined portion 74a bridging between the ceiling portion 71 and the second wall portion 73b. The inclined portion 74a is formed by chamfering the corners of the ceiling portion 71 and the second wall portion 73b. In the device case 70, the configuration, in which the ceiling portion 71 and the second wall portion 73b are indirectly connected with each other via the inclined portion 74a, has a shape that is less likely to protrude laterally from the motor case 45, compared with a configuration in which the ceiling portion 71 and the second wall portion 73b are directly connected with each other.

The inclined portion 74a is provided at a position lower than the inclined portion 74 via the ceiling portion 71. The inclined portion 74a on the lower side is arranged on the opposite side of the ceiling portion 71 from the inclined portion 74 on the upper side in the circumferential direction CD. At least a part of the inclined portion 74a on the lower side is located lower than the inclined portion 74 on the upper side. The inclined portion 74a on the lower side extends, for example, in a direction orthogonal to the X direction.

In each of the above embodiments, the power converter 13 may be provided at a position to protrude upward beyond the outer top portion 47a of the motor case 45, as long as the power converter 13 is distant from the outer top portion 47a of the motor case 45 in the circumferential direction CD. For example, the inclined portion 74 of the device case 70 may be provided at a position higher than the outer top portion 47a of the motor case 45. The inclined portion 74 may be provided at a position lower than the inner top portion 46a of the motor case 45. Furthermore, the power converter 13 may be provided to the lower side surface 47c of the motor case 45.

Figure 24:
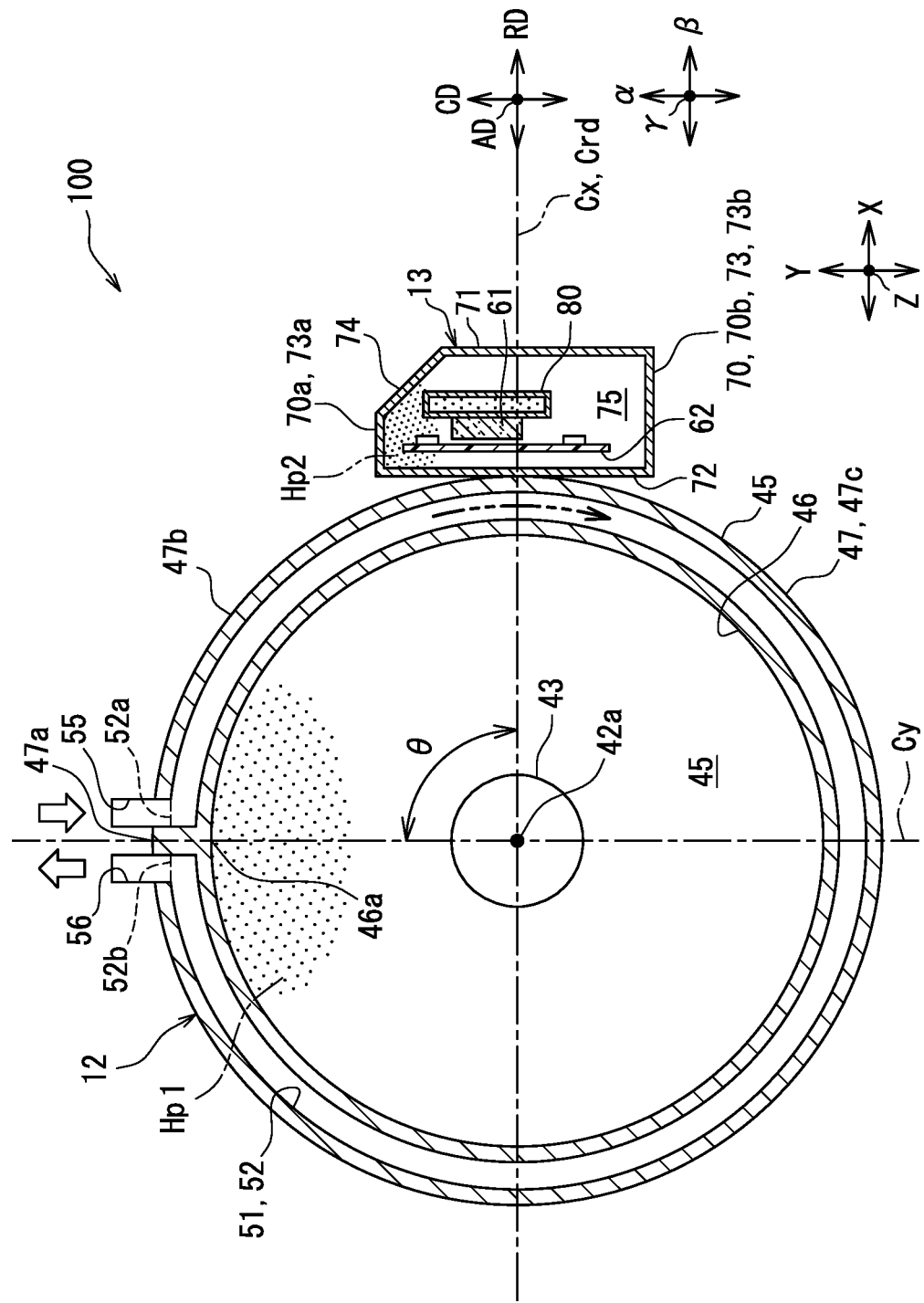
FIG. 24 is a schematic longitudinal cross-sectional view showing a configuration of another motor unit.

In each of the above embodiments, the power converter 13 may be positioned across the motor horizontal line Cx in the Y direction. For example, as shown in FIG. 24, a configuration is adopted such that an angle θ at which the power converter 13 is inclined with respect to the Y direction is 90 degrees. In this configuration, the motor tilt line Crd coincides with the motor horizontal line Cx. The β direction, the α direction, and the γ direction for the power converter 13 coincide with the X direction, the Y direction, and the Z direction for the motor unit 100. In the device case 70 of the power converter 13, the first wall portion 73a is the upper end portion 70a, and the second wall portion 73b is the lower end portion 70b.

When the heat pool Hp2 is generated in the internal space 75 of the device case 70, the heat pool Hp2 tends to extend along, for example, the first wall portion 73a, which is the upper end portion 70a of the device case 70. In addition, in the device case 70, the closer to the first wall portion 73a in the Y direction, the less the distance between the floor portion 72 and the inclined portion 74. For this reason, the heat pool Hp2 tends to spread downward in the Y direction, compared to, for example, a configuration without the inclined portion 74. As a result, even in the power converter 13 in which the angle θ is 90 degrees, the inclined portion 74 allows the first end 83*a* of the device cooling passage 82 to easily reach the region where heat accumulation Hp2 is likely to occur.

In each of the above embodiments, the power converter 13 may not extend in the circumferential direction CD along the outer circumferential surface 47 of the motor case 45. For example, the power converter 13 may be inclined with respect to the Y direction so that the motor tilt line Crd, which is at the tilt angle θ same as the tilt angle θ of the power converter 13, passes above or below the power converter 13.

In each of the above embodiments, the installation position of the power converter 13 may not be closer to the motor inlet 52*a* than the motor outlet 52*b* in the circumferential direction CD. For example, the power converter 13 may be provided at a position closer to the motor outlet 52*b* than the motor inlet 52*a* in the circumferential direction CD.

Figure 25:
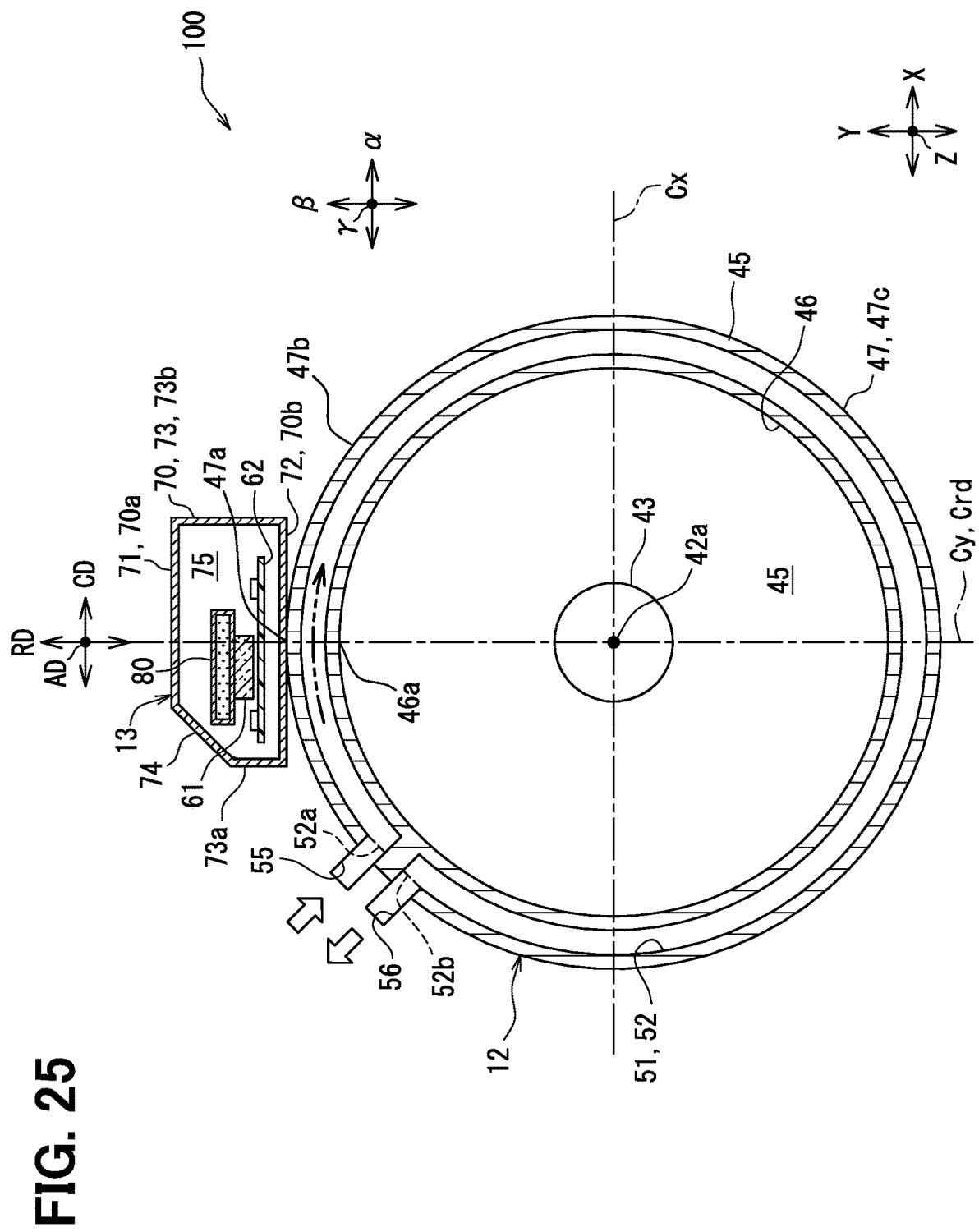
FIG. 25 is a schematic longitudinal cross-sectional view showing a configuration of another motor unit.

In each of the above embodiments, the power converter 13 may be positioned across the motor vertical line Cy in the X direction. Further, the power converter 13 may not be tilted with respect to the Y direction. For example, as shown in FIG. 25, the power converter 13 is provided on the outer top portion 47*a* of the motor case 45 and is not tilted with respect to the Y direction. In this configuration, the inclination angle θ of the power converter 13 with respect to the Y direction is 0 degree, and the motor inclination line Crd coincides with the motor vertical line Cy. The α direction, the β drection, and the γ direction for the power converter 13 coincide with the X direction, the Y direction, and the Z direction for the motor unit 100. In the device case 70 of the power converter 13, the ceiling portion 71 is the upper end portion 70*a,* and the floor portion 72 is the lower end portion 70*b*. In the motor 12, the motor upstream passage 55 and the motor downstream passage 56 are distant from the power converter 13 in the circumferential direction CD.

In each of the embodiments, regarding the cooling system, the cooling medium passage and the circulation passage may be shared between the motor cooling system and the device cooling system. For example, in the circulation passage, the device passage 81 is provided upstream of the motor passage 51. When this configuration is adopted in the second embodiment, the device downstream passage 86 of the device passage 81 extends toward the motor upstream passage 55 of the motor case 45 in the circumferential direction CD. Therefore, in the second embodiment, the configuration is convenient from the viewpoint of connecting the device downstream passage 86 with the motor upstream passage 55 in the circulation passage of the cooling system.

In each of the embodiments, vehicles equipped with the motor unit 100 include passenger cars, buses, construction vehicles, agricultural machinery vehicles, and the like. A vehicle is one type of a moving object, and examples of moving objects on which the motor unit 100 is mounted include trains, airplanes, and the like, in addition to vehicles. The power converter 13 may be, for example, an inverter device or a converter device. Examples of a converter include a power supply device for AC input/DC output, a power supply device for DC input/DC output, a power supply device for AC input/AC output, and the like.

What is claimed is:

1. A rotary electric machine unit comprising:
    a rotary electric machine in which a rotor is configured to rotate relative to a stator;
    a power converter provided outside the rotary electric machine and configured to convert an electric power, which is in a form of a direct current and to be supplied to the rotary electric machine, into an alternating current; and
    a control board extending along a device cooling passage and configured to control an electric current flowing in the rotary electric machine, wherein
    the rotary electric machine is provided such that a rotary shaft of the rotor extends in a direction orthogonal to a vertical direction,
    the power converter includes
        an electric component configured to convert the electric power,
        a device housing accommodating the electric component, and
        a device cooling portion defining the device cooling passage inside the device housing to cause coolant to flow therethrough to cool the electric component with the coolant,
    the device housing is provided at a position distant from a top portion of the rotary electric machine in a circumferential direction of the rotary shaft,
    the device housing is inclined relative to a vertical direction,
    one end and an other end of the device cooling passage in the circumferential direction are an upper end and a lower end,
    the device cooling passage includes a device inlet, which is to cause coolant to flow therethrough into the device cooling passage, and a device outlet, which is to cause coolant to flow therethrough from the device cooling passage,
    the device inlet is at a position lower than the device outlet,
    the control board is mounted with a first mounted component and a second mounted component,
    the second mounted component is provided at a position lower than the first mounted component, and
    the second mounted component has at least one of
        a characteristic to generate heat on energization more than the first mounted component or
        a characteristic of heat resistance lower than the first mounted component.

2. The rotary electric machine unit according to claim 1, wherein
    the device housing includes
        a ceiling portion extending in a direction orthogonal to a radial direction of the rotary shaft,
        a wall portion extending in the radial direction, and
        an inclined portion forming an upper end portion of the device housing,
    the inclined portion is inclined relative to both the ceiling portion and the wall portion,
    the inclined portion connects the ceiling portion with the wall portion, and
    the upper end of the device cooling passage is at a position lower than the inclined portion.

3. The rotary electric machine unit according to claim 2, wherein
    the upper end of the device cooling passage is provided side by side with the inclined portion in both the radial direction and the circumferential direction.

4. The rotary electric machine unit according to claim 1, wherein the electric component has an upper surface, which faces upward, and a lower surface, which faces downward, and the device cooling passage extends along the upper surface of the electric component.

5. The rotary electric machine unit according to claim 1, wherein the device inlet and the device outlet are arranged in the circumferential direction.

6. The rotary electric machine unit according to claim 1, wherein a length dimension of the device cooling passage in the circumferential direction is larger than a length dimension of the device cooling passage in an axial direction in which the rotary shaft extends.

7. The rotary electric machine unit according to claim 1, wherein the device cooling passage includes an extending portion extending toward the top portion of the rotary electric machine beyond the electric component in the circumferential direction, and the device outlet is provided to the extending portion.

8. The rotary electric machine unit according to claim 1, wherein the device inlet is provided to the lower end of the device cooling passage, and the device outlet is provided to the upper end of the device cooling passage.

9. A rotary electric machine unit comprising:

a rotary electric machine in which a rotor is configured to rotate relative to a stator; and a power converter provided outside the rotary electric machine and configured to convert an electric power, which is in a form of a direct current and to be supplied to the rotary electric machine, into an alternating current, wherein the rotary electric machine is provided such that a rotary shaft of the rotor extends in a direction orthogonal to a vertical direction, the power converter includes an electric component configured to convert the electric power, a device housing accommodating the electric component, and a device cooling portion defining a device cooling passage inside the device housing to cause coolant to flow therethrough to cool the electric component with the coolant, the device housing is provided at a position distant from a top portion of the rotary electric machine in a circumferential direction of the rotary shaft, the device housing is inclined relative to the vertical direction, one end and an other end of the device cooling passage in the circumferential direction are an upper end and a lower end, the device cooling passage includes a device inlet, which is to cause coolant to flow therethrough into the device cooling passage, and a device outlet, which is to cause coolant to flow therethrough from the device cooling passage, the device inlet is at a position lower than the device outlet, the rotary electric machine includes an electric machine housing that accommodates the stator and the rotor and extends in the circumferential direction on an outside of the stator and the rotor, the electric machine housing forms an electric machine cooling passage to cause coolant to flow therethrough to cool the stator and the rotor with coolant flowing through the electric machine cooling passage, the power converter is provided at a position, at which the power converter overlaps with the electric machine cooling passage in a radial direction of the rotary shaft, the power converter is provided at a position closer to an electric machine inlet, which is to cause coolant to flow into the electric machine cooling passage, than an electric machine outlet, which is to cause coolant to flow from the electric machine cooling passage, the rotary electric machine further comprises a control board extending along the device cooling passage and configured to control an electric current flowing in the rotary electric machine, the control board is mounted with a first mounted component and a second mounted component, the second mounted component is provided at a position lower than the first mounted component, and the second mounted component has at least one of a characteristic to generate heat on energization more than the first mounted component or a characteristic of heat resistance lower than the first mounted component.

10. The rotary electric machine unit according to claim 9, wherein the power converter is provided to an upper side surface of the electric machine housing, such that the power converter does not to protrude beyond the top portion of the electric machine housing.

11. The rotary electric machine unit according to claim 9, wherein a part of the electric machine housing also serves as at least a part of the device housing.

\* \* \* \* \*